US009078463B2

(12) United States Patent
Huber et al.

(10) Patent No.: US 9,078,463 B2
(45) Date of Patent: Jul. 14, 2015

(54) POTATO PRODUCTS WITH ENHANCED RESISTANT STARCH CONTENT AND MODERATED GLYCEMIC RESPONSE AND METHODS THEREOF

(75) Inventors: Kerry C. Huber, Moscow, ID (US); Wei Chen Yu, Etobicoke (CA)

(73) Assignee: University of Idaho, Moscow, ID (US)

( * ) Notice: Subject to any disclaimer, the term of this patent is extended or adjusted under 35 U.S.C. 154(b) by 0 days.

(21) Appl. No.: 13/437,516

(22) Filed: Apr. 2, 2012

(65) Prior Publication Data

US 2012/0189744 A1 Jul. 26, 2012

Related U.S. Application Data

(63) Continuation of application No. 12/896,542, filed on Oct. 1, 2010.

(60) Provisional application No. 61/248,350, filed on Oct. 2, 2009.

(51) Int. Cl.
*A23K 1/00* (2006.01)
*A23L 1/0522* (2006.01)
*A23L 1/2165* (2006.01)
*A23L 1/216* (2006.01)

(52) U.S. Cl.
CPC ............ *A23L 1/05223* (2013.01); *A23L 1/216* (2013.01); *A23L 1/2165* (2013.01)

(58) Field of Classification Search
CPC ... A23L 1/0522; A23L 1/2163; A23L 1/2165; A23L 1/216
USPC .......................................... 425/637
See application file for complete search history.

(56) References Cited

U.S. PATENT DOCUMENTS

| 2,482,844 | A | | 9/1949 | Finlayson |
| 3,951,948 | A | | 4/1976 | Bond et al. |
| 3,968,260 | A | | 7/1976 | Shatila et al. |
| 3,987,210 | A | * | 10/1976 | Cremer .......................... 426/550 |
| 4,117,222 | A | * | 9/1978 | Holst et al. ....................... 536/50 |
| 4,369,308 | A | | 1/1983 | Trubiano et al. |
| 5,059,435 | A | * | 10/1991 | Sloan et al. ................... 426/102 |
| 5,707,671 | A | | 1/1998 | Beck et al. |
| 5,718,770 | A | | 2/1998 | Shah et al. |
| 5,750,168 | A | * | 5/1998 | Woerman et al. ............. 426/102 |

(Continued)

FOREIGN PATENT DOCUMENTS

| WO | 9203063 | 3/1992 |
| WO | 99/64508 | 12/1999 |

(Continued)

OTHER PUBLICATIONS

Bjorck: A Study of Native and Chemically Modified Potato Starch: Part II: Digestibility in the Rat Intestinal Tract; Starch/Stärke, vol. 41, Issue 4, (1989) Nr. 4, S. 128-134.*

(Continued)

*Primary Examiner* — Patricia George
(74) *Attorney, Agent, or Firm* — Lathrop & Gage LLP

(57) ABSTRACT

This application relates to compositions comprising whole-tissue potato products with enhanced resistant starch (RS) content and reduced estimated glycemic index values. Methods of preparing and using whole-tissue potato products with enhanced resistant starch (RS) content and glycemic index values are also disclosed.

19 Claims, 15 Drawing Sheets

(56) References Cited

U.S. PATENT DOCUMENTS

| | | | |
|---|---|---|---|
| 5,855,946 A * | 1/1999 | Seib et al. | 426/549 |
| 6,703,065 B2 * | 3/2004 | Villagran et al. | 426/637 |
| 2002/0142085 A1 | 10/2002 | Villagran et al. | |
| 2005/0271793 A1 | 12/2005 | Carmosino | |
| 2008/0233260 A1 | 9/2008 | Woo | |

FOREIGN PATENT DOCUMENTS

| | | |
|---|---|---|
| WO | 01/19404 | 3/2001 |
| WO | 2005/111085 | 11/2005 |
| WO | 2006/089239 | 8/2006 |
| WO | 2008087164 A2 | 7/2008 |

OTHER PUBLICATIONS

Chung: In vitro starch digestibility and estimated glycemic index of chemically modified corn starches; Food Research International 41 (2008) 579-585.*

Hui: Preparation and properties of octenyl succinic anhydride modified potato starch; Food Chemistry.*

Reeve: Suggested improvements for microscopic measurement of cells and starch granules in fresh potatoes; American Potato Journal; Feb. 1967, vol. 44, Issue 2, pp. 41-50.*

Reeve: Suggested improvements for microscopic measurement of cells and starch granules in fresh potatoes; American Potato Journal, Feb. 1967, vol. 44, Issue 2, pp. 41-50.*

Plant Cell at http://en.wikipedia.org/wiki/Plant_cell]; printed Aug. 7, 2014.*

Woo K S Et al. "Cross Linked Resistant Starch: Preparation and Properties." Nov. 2002, Cereal Chemistry, AACC International, St. Paul, MN, US, pp. 819-825, XP001132662 ISSN: 0009-0352.

Gotlieb: Starch Derivatization: Fascinating and Unique Industrial Opportunities; Wageningen Academic Pub, 2005; 158 pages.

Kooijman: Experimental Studies on the Carboxymethylation of Arrowroot Starch in Isopropanol—Water Media; Starch/Starke 55 (2003) 495-503 DOI 10.1002/star.200300217.

Kim: Evaluation of degradability of hydroxypropylated potato starch/polyethylene blend films; Carbohydrate Polymers 54 (2003) 173-181.

Chui: Waxy potato starch stabilised via hydroxypropylation; EP 1229049B1; Publication date Jul. 20, 2005.

Garcia-Alonso A. et al. 'Effect of Processing on Potato Starch: In vitro Availability and Glycaemic Index'. Starke-Starch, Wiley-VCH Verlag, Weinheim, DE, vol. 52, No. 2/3 2000 pp. 81-84.

European Search Report for Application No. EP10821348. Dated Feb. 24, 2014. 9 pages.

UC Davis GeoWiki: by University of California, Davis; UC Davis ChemWiki: The Dynamic Chemistry E-textbook >Inorganic Chemistry> Descriptive Chemistry> p-Biock Elements > Group 17: The Halogens; printed Apr. 28, 2014. Accessed Aug. 6, 2014.

United States Office Action for U.S. Appl. No. 12/896,542, dated May 7, 2014.

Mitch, "Potatoe Starch: Production and Uses," Starch 2nd Edition, Chapter XIV, pp. 479-490, 1983.

Notice of Allowance corresponding to U.S. Appl. No. 12/896,542, mailed Mar. 24, 2015.

* cited by examiner

POTATO PRODUCTS WITH ENHANCED RESISTANT STARCH CONTENT AND MODERATED GLYCEMIC RESPONSE AND METHODS THEREOF

RELATED APPLICATIONS

This application is a continuation of U.S. application Ser. No. 12/896,542 Oct. 1, 2010, which claims the benefit of priority to U.S. Provisional Application No. 61/248,350, filed Oct. 2, 2009.

ACKNOWLEDGEMENT OF GOVERNMENT SUPPORT

This invention was made with Government support under Grant No. 2003-01730, awarded by the United States Department of Agriculture, National Research Initiative Competitive Grants Program. The Government has certain rights to this invention.

FIELD OF THE DISCLOSURE

The present invention relates compositions comprising potato products with enhanced resistant starch (RS) and/or slowly-digestible starch (SDS) content, method of using same, and methods of making same.

BACKGROUND OF THE DISCLOSURE

There is increasing scientific evidence supporting a potential link between the glycemic response of foods (rather than simply their carbohydrate content) and risk for obesity and human disease (type II diabetes, heart disease, etc.) (Fernandes et al., 2005; Tahvonen et al., 2006). Generally, findings from epidemiological studies support the notion that a low glycemic diet may afford positive health benefits and help minimize risk for development of chronic disease (Collier et al., 1988; Jenkins et al., 1988; Salmeron et al., 1997a, 1997b; Fung et al., 2002). Both specific commodities and food categories have been identified and implicated as potential contributors to a high dietary glycemic response.

Potatoes, which are a primary carbohydrate source in the diet of modern western civilizations, exhibit a per capita consumption of greater than 118 lbs. per year in the U.S. (USDA, 2008). From an economic perspective, potatoes provide roughly $3 billion in annual cash receipts to U.S. farmers, while potato production worldwide stands at 293 million tons per annum (FAOSTAT, 1998). However, potatoes generally exhibit a relatively high glycemic response after being subjected to heating or cooking (Susan and Englyst, 1993; Fernandes et al., 2005; Tahvonen et al., 2006) as a function of their significant starch content (Susan and Englyst, 1993; Soh and Brand-Miller, 1999). Though potatoes do afford diverse nutritional benefits to consumers (Camire et al., 2009), they are perceived as problematic due to their association with a high glycemic response.

There is a need for potato products with moderated glycemic response. Such products would allow U.S. potato growers and processors to expand and diversify into market areas that are presently inaccessible. Of the various types of potato products on the market, dehydrated granules or flakes represent perhaps the most satisfactory vehicle for creating a product that is not only nutritionally and organoleptically adequate, but remains so over an extended storage period (Hadziyev and Steele, 1979). Dehydrated mashed potato products themselves are an important segment of potato-based convenience foods for both individual households and for catering institutions, and also represent an ideal and versatile product form for use as a food ingredient.

With the ability to produce potato-based products with moderated glycemic response, the potato industry will be better positioned to respond to increasing consumer demands for healthier foods, both from a food ingredient and/or a consumer end-product standpoint. This type of product diversification will allow U.S. potato processors to remain competitive in domestic and global markets.

As potatoes represent an important source of carbohydrate in the human diet, there is potential benefit in producing potato-based products with an enhanced RS content and a moderated glycemic response. Such an approach could help counter the negative consumer perception associated with potatoes, and encourage consumers to continue to take advantage of the many positive nutritional benefits afforded by potato products (e.g. vitamin C content, high quality protein, etc.).

The foregoing description of related art is not intended in any way as an admission that any of the documents described therein, including pending United States patent applications, are prior art to embodiments of the present disclosure. Moreover, the description herein of any disadvantages associated with the described products, methods, and/or apparatus, is not intended to limit the disclosed embodiments. Indeed, embodiments of the present disclosure may include certain features of the described products, methods, and/or apparatus without suffering from their described disadvantages.

This application references a number of different publications as indicated throughout the specification. A list of these different publications can be found below in the section entitled "References." Each of these publications is incorporated by reference herein.

SUMMARY OF THE DISCLOSURE

One aspect of the present invention is the development of a multifunctional potato granule ingredient with enhanced RS content and moderated rates of starch digestibility for utilization in food systems (snack foods, extruded French fries/potato pieces, dehydrated mashed potato products, bakery products, etc.). The present invention provides methods described by which potato products are chemically modified to yield novel potato-based food products/ingredients. Under the described processing conditions, potato material is treated with chemical modifying agents (substitution and/or cross-linking agents) approved to modify starch for use in food.

It is one aspect of the present invention to modify (chemically) a whole-tissue potato substrate (cell wall constituents and/or starch within intact potato cells) using food approved reagents to produce novel modified products with enhanced RS content and moderated rates of starch digestibility. Preferably, whole-tissue potato substrates have an enhanced content type 4 resistant starch (RS4) through chemical modification of starch within cell wall constituents and/or starch within intact potato cells.

In some embodiments, reactions are carried out under basic pH conditions within an aqueous isopropanol ethanol slurry. Because of the pattern of chemical substituent groups incorporated onto starch polymers, a portion of the starch (amount varies according to reaction conditions used) within potato material becomes resistant to full digestion by amylolytic enzymes. Thus, the generated potato products/ingredients represent a source of resistant starch (RS) (type 4), and also exhibit a reduced extent of enzyme hydrolysis (i.e., reduced glycemic attribute) compared to unreacted controls.

In some embodiments, the potato products/ingredients of the present invention have uses in food products including, but not limited to existing applications of commercial potato ingredients (e.g., granules, flakes, flours, etc.) with the added advantage of contributing an enhanced RS content and/or a moderated glycemic response to such food products. Thus, the unique attributes (moderation of glycemic response and increased RS content) of these novel potato ingredients/products also make them suitable for formulation of specialty food products, including those intended for diabetics or formulated to enhance colonic health. Additionally, the methods described for processing the novel potato ingredients/products may also prove useful for enhancement of traditional mashed potato and potato flake, flour and/or granule processing. In some embodiments, the modified potato ingredients/products exhibit benefits similar to those of chemically modified starches (e.g., reduced starch retrogradation).

According to some embodiments, there is provided a method of preparing potato products with enhanced resistant starch (RS) content comprising: contacting a whole-tissue potato substrate with an aqueous solution of an etherifying agent at a temperature between 22° C. and 70° C.; and/or contacting the potato substrate with an esterifying agent, thereby increasing the RS content of the potato product.

According to some embodiments, there is provided a method of modifying potato cell wall constituents and/or starch within intact potato cells, to increase the enhanced resistant starch (RS) therein, comprising: contacting a whole-tissue potato substrate with an aqueous solution of an etherifying agent at a temperature between 22° C. and 70° C.; and/or contacting the potato substrate with an esterifying agent, thereby modifying the potato cell wall constituents and/or starch within intact potato cells.

According to some embodiments, there is provided a method of increasing resistance of modified potato products to starch retrogradation comprising contacting a whole-tissue potato substrate with an aqueous solution of an etherifying agent at a temperature between 22° C. and 70° C.; and/or contacting the potato substrate with an esterifying agent, thereby increasing the resistance of modified potato products to starch retrogradation.

According to some embodiments, there is provided a method for reducing the glycemic response values of a whole-tissue potato product comprising: contacting a whole-tissue potato substrate with an aqueous solution of an etherifying agent at a temperature between 22° C. and 70° C.; and/or contacting the potato substrate with an esterifying agent, thereby reducing the glycemic response value of the potato product.

A potato product with enhanced resistant starch (RS) content comprising a potato ingredient made by the process of contacting a whole-tissue potato substrate with an aqueous solution of an etherifying agent at a temperature between 22° C. and 70° C. and/or contacting the potato substrate with an esterifying agent.

In some embodiments, the potato substrate is a dehydrated potato substrate. In some embodiments, potato substrate is a flake, granule, or flour. In some embodiments, the potato substrate is in the form of peeled potatoes, potato slices, potato cubes, potato dices, potato shreds, potato wedges, or potato sticks.

The temperature for the etherifying step may be from between 22° C. and 70° C. For example, the temperature for the etherifying step may be from between 30° C. and 55° C., between 40° C. and 50° C., or between 45° C. and 50° C.

The temperature for the esterifying step may be from between 22° C. and 70° C. For example, the temperature for the esterifying step may be from between 30° C. and 55° C., between 40° C. and 50° C., or between 45° C. and 50° C.

In some embodiments, the etherifying agent may be selected from one or more of the following: propylene oxide, acrolein, epichlorohydrin, epichlorohydrin and propylene oxide, epichlorhydrin and acetic anhydride, and epichlorohydrin and succinic anhydride and mixtures and combinations thereof. The amount of etherifying agent used is between 0.5% and 35% [w/w] based on potato substrate dry weight.

The etherifying step may be conducted under acidic or basic conditions. Basic conditions are preferred. For example, the etherifying step may performed at a pH between 8 and 14 (e.g. between 10 and 14).

In some embodiments, the esterifying agent may be selected from one or more of the following: trimetaphosphate (STMP), sodium tripolyphosphate (STPP), phosphorus oxychloride, and epichlorohydrin. In some embodiments, the esterifying agent may be selected from one or more of the following: acetic anhydride, adipic anhydride, adipic anhydride and acetic anhydride, vinyl acetate, monosodium orthophosphate, 1-octenyl succinic anhydride, succinic anhydride, phosphorus oxychloride, phosphorus oxychloride and vinyl acetate, phosphorus oxychloride and acetic anhydride, sodium trimetaphosphate and sodium tripolyphosphate, sodium tripolyphosphate, and sodium trimetaphosphate. The amount of esterifying agent used is between 0.5% and 35% [w/w] based on potato substrate dry weight.

The esterifying step may be conducted under acidic or basic conditions. Basic conditions are preferred. For example, the esterifying step may performed at a pH between 8 and 14 (e.g. between 10 and 14).

In some embodiments, the methods of the present embodiments comprise contacting a whole-tissue potato substrate with an aqueous alcohol solution of an etherifying agent at a temperature between 22° C. and 70° C. In some embodiments, the methods of the present embodiments comprise contacting a whole-tissue potato substrate with an aqueous alcohol solution of an etherifying agent under basic conditions at a temperature between 22° C. and 70° C. The alcohol may be one or more of an alkyl alcohol including, but not limited to, methanol, ethanol, propanol, isopropanol, and butanol. In some embodiments, the potato substrate is heated to a temperature of between 30° C. and 70° C. in the presence of aqueous isopropanol or ethanol.

According to some embodiments, there is provided a composition comprising a whole tissue potato product having a RS content of 8% to 70%. In some embodiments, there is provided a composition comprising a whole tissue potato product having a type 4 resistant starch (RS4) content of 8% to 70%. The potato product may be a potato flake, potato granule, or potato flour. The potato product may be dehydrated. In some embodiments, the potato product is in the form of peeled potatoes, potato slices, potato cubes, potato dices, potato shreds, potato wedges, or potato sticks. The potato product may be a medicinal food potato product having an RS content of 8% to 70%. The potato product may be a medicinal food potato product having an RS4 content of 8% to 70%. In some embodiments, the glycemic response value of the potato product is below 70 (e.g. between 40 and 70 such as below 65, below 60, below 55, below 50, below 45). In some embodiments, the glycemic response value of the medicinal food potato product is below 70 (e.g., between 40 and 70 such as below 65, below 60, below 55, below 50, below 45).

DETAILED DESCRIPTION OF THE INVENTION

Figure 1:
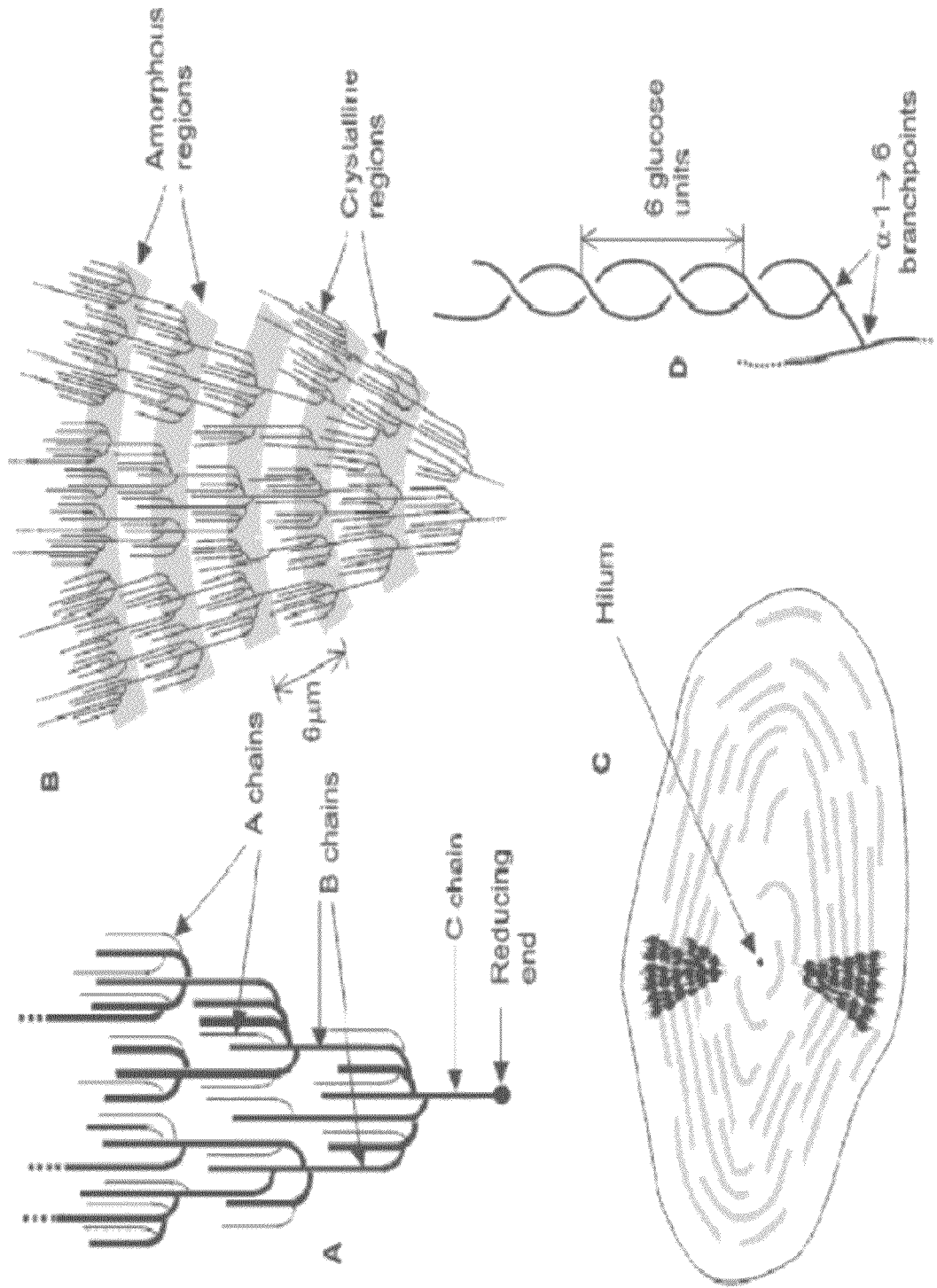
FIG. 1 provides a diagram of starch molecular and granule structure (From Chaplin, 2010).

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Significance of the Glycemic Response

Foods are commonly grouped according to their ability to alter blood glucose levels following consumption, which phenomenon is defined as the "glycemic response". By definition, glycemic response is the change in blood glucose concentration induced by ingesting a food (FAO/WHO, 1998). Otto et al. (1973) first brought attention to the different glycemic effects of various foods, while the concept that a slower rate of glucose absorption afforded positive metabolic benefits in relation to diabetes and coronary heart diseases risk originated with Burkitt and Trowell (1977). Jenkins et al. (1985) utilized the glycemic response as a tool for dietary management of type I diabetes and, later, dyslipidemia. This concept is widely accepted as a tool for numeric classification of carbohydrate-containing foods in situations where glucose tolerance is impaired (Jenkins et al., 2002). The observation of a cluster of diseases related to central adiposity and intraabdominal fat mass with attendant insulin resistance has further defined the need for glycemic classification of foods (Baley et al., 1973; Landin et al., 1990; Vague and Raccah, 1992; Gerald, 2000).

According to some embodiments, methods are provided to minimize risk for coronary heart disease, diabetes and obesity comprising administering to a subject in need thereof the potato products of the present embodiments.

According to some embodiments, methods are provided for promoting weight loss in a subject, comprising administering to a subject in need thereof the potato products of the present embodiments.

According to some embodiments, methods are provided for reducing postprandial blood glucose and insulin responses in a subject, comprising administering to a subject in need thereof the potato products of the present embodiments.

According to some embodiments, methods are provided for increasing the period of satiety between meals, comprising administering to a subject in need thereof the potato products of the present embodiments.

According to some embodiments, methods are provided for increasing the colonic health of a subject comprising administering to a subject in need thereof the potato products of the present embodiments.

Starch Structure and Chemistry in Relation to Glycemic Response

Starch is one of the primary forms of dietary carbohydrates, and is a significant contributor to both caloric intake and glycemic response. Starchy foods are derived from plant sources such as potatoes and cereal products (e.g. breads, pasta). Nevertheless, the glycemic effects of these starch-based products are largely dependent on the physical state of the starch within foods. A brief overview of starch structure and chemistry will be provided to provide insight into the factors influencing starch availability and digestibility.

In its simplest form, starch consists exclusively of α-D-glucan, and is made up of two primary polymers, amylose and amylopectin. Amylose is predominantly a linear molecule containing ~99% α-(1→4) and ~1% α-(1→6) glycosidic bonds with a molecular weight of ~$10^5$-$10^6$ (Bertoft, 2000). On average, amylose molecules possess a degree of polymerization (DP) of approximately 1000 anhydroglucose units (AGU), though DP varies according to botanical source. Amylopectin (molecular weight ~$10^7$-$10^8$) is a much larger molecule than that of amylose, and is more heavily branched with ~95% α-(1→4) and ~5% α-(1→6) glycosidic linkages (Bertoft, 2000). The chains of amylopectin range from ~12 to 120 AGU in length (Rutenberg and Solarek, 1984), and may be classified as either A, B, or C chains (FIG. 1A). The A chains are the outer or terminal branches, which themselves do not give further rise to other branch chains. In contrast, B chains are inner chains that give rise to one or more additional branch chains, while C chains house the only reducing end (free anomeric carbon) of the amylopectin molecule. Amylopectin molecules may contain upwards of two million glucose residues, and exhibit a compact branch-on-branch structure (Parker and Ring, 2001).

In plants, starch molecules are synthesized to form semicrystalline aggregates, termed granules, which provide a means of storing carbohydrate in an insoluble and tightly packed manner (Imberty et al., 1991). The size (1-100 μm) and shape (spherical, polygonal, ellipsoidal, etc.) of starch granules varies among plant species, and also within cultivars of the same species (Baghurst et al., 1996). Starch granules consist of concentric growth rings of alternating hard and soft shells. While the structure of the soft shells is not precisely known due to their amorphous nature, the hard shells consist of an alternating 6 nm crystalline (comprising double-helical structures of amylopectin branch chains) and a 3 nm amorphous (comprising amylopectin branch point regions) repeat structure (FIGS. 1B and 1D). Amylopectin molecules, which are predominantly responsible for the native crystalline structure of starch granules, are oriented radially within granules with their non-reducing ends facing outward toward the granule exterior (FIG. 1C). Granule crystallinity limits the accessiblity of starch chains to amylolytic enzymes, as native starch granules are digested (i.e. hydrolyzed) very slowly. Amylose molecules are thought to be concentrated in the amorphous regions of starch granules, though their exact granular locale remains a subject of debate.

When starch granules are subjected to heat treatment in the presence of excess water, they undergo a process termed gelatinization (55-130° C. depending on the source of the starch), which involves a loss of granular crystallinity and molecular order, as well as a disruption of the granule structure. Over the course of gelatinization, intermolecular hydrogen bonds between starch molecules are disrupted, allowing greater interaction between starch and water. This penetration of water increases the randomness in the granular structure, and facilitates melting of the native crystalline structure (Donald, 2000). Upon cooling, retrogradation begins as the linear segments of polymer chains begin to reassociate in limited fashion to form a three-dimensional gel structure (Wu and Sarko, 1978). Once gelatinization has occurred, starch molecules become more susceptible to enzymatic hydrolysis, which was initially restricted by the crystalline nature of the native granule structure. Though some limited intermolecular reassociation (i.e., retrogradation) may take place, starch molecules do not regain the original molecular order of native granules (Donald, 2000).

Resistant Starch (RS)/Slowly Digestible Starch (SDS)

The term "resistant starch" describes a small fraction of starch that was resistant to hydrolysis by exhaustive α-amylase and pullulanase treatment in vitro. However, from an in vivo perspective, resistant starch (RS) is scientifically defined as starch material escaping digestion by human enzymes present within the small intestine (Asp, 2001), leading to physiological benefits as it passes into the colon. It may be classified into four primary types (RS1, RS2, RS3 and RS4) based on the specific mode of resistance to digestion (Table 1) (Nugent, 2005).

TABLE 1

Primary Types and Characteristics of Resistant Starch (RS)

| Resistant Starch Type/Nature of Resistance | Food Example Type | Limitations |
|---|---|---|
| RS1: Starch physically shielded or protected from enzymes by a physical barrier (e.g. intact cell wall) | Whole kernel grains | Resistance to digestion may diminish with heating or processing due to loss of integrity of the physical barrier (e.g., cooked potatoes). |
| RS2: Native crystalline starch (amylopectin double helical structures) within ungelatinized starch granules | Raw vegetables | Loses resistance to digestion with heating sufficient bring about gelatinization. |
| RS3: Retrograded or re-crystallized starch molecules (primarily amylose or linear starch chains) formed by re-association following gelatinization | Resistant starch ingredients | Stable to high temperatures above 100° C., but does not contribute a significant physical function (contributes primarily bulking properties). |
| RS4: Bulky chemical groups incorporated onto starch chains physically impede enzyme degradation | Chemically modified food starches | Must be labeled as modified starch. Contributes enhanced physical function in accordance with the nature of modification. Resistance generally not lost upon heating. |

Type 1 resistant starch (RS1) represents starch that remains undigested due to it being in a physically inaccessible form or being physically shielded from hydrolytic enzymes. Examples include partially milled grains and seeds and very dense processed starchy foods. Some grains or seeds remain intact after cooking due to a fibrous shell that continues to protect starch from enzyme digestion (Englyst and Cummings, 0.1987; Brown et al., 2001). However, most RS1 containing foods remain resistant only in the raw or uncooked state, as cooking can dramatically reduce the effectiveness of physical barriers that protect starch from hydrolytic enzymes (Asp, 1996).

Resistant starch, type 2, consists of native starch granules (ungelatinized starch), which exhibit a semi-crystalline structure that resists enzyme digestion. With the exception of high-amylose starches, most RS2 materials lose virtually all of their resistant characteristics when heated in excess water (i.e., gelatinized) (Englyst and Cummings, 1987; Englyst and kingman, 1990).

Type 3 resistant starches (RS3) consist of retrograded linear starch fractions (primarily amylose) comprised of double helical structures, and are formed by cooling and recrystallization of gelatinized starch chains (Englyst et al., 1992;

Haralampu, 2000). Retrograded starch is highly resistant to digestion by pancreatic amylase, and retains its resistance to temperatures as high as 140-160° C. (Haralampu, 2000). However, the water holding capacity of RS3 can be relatively reduced due to extensive starch-starch interactions inherent to this type of RS (Sajilata et al., 2006).

Type 4 resistant starch (RS4) employs chemical modification, which introduces bulky substituent groups onto starch chains, increasing steric hindrance to enzyme hydrolysis. RS4 generally retains its resistance to digestion following heat processing, and may further contribute enhanced starch properties for food applications in accordance with the specific type of modification employed (Brown et al., 2001; Sajilata et al., 2006; Xie et al., 2006).

Much of the interest surrounding RS has to do with its potential physiological roles. Because RS escapes digestion in the small intestine, it serves as a source of fermentable carbohydrate for the bacterial microflora of the colon. As these microorganisms metabolize the carbohydrate material via fermentation, the colonic pH is lowered and short-chain fatty acids such as acetate, propionate, and butyrate, are released. Of these secondary metabolites, butyrate yield from RS is relatively high, and has been implicated in promoting colonic health (Van Munster et al., 1994; Baghurst et al., 1996; Johnson and Gee, 1996; Kendall et al., 2004). The presence of fermentable substrate helps prevent inflammatory bowel disease and maintains the metabolic requirements of the colonic mucosal cells. Johnson and Gee (1996) reported that butyrate decreases the proliferation/turnover of colonic mucosal cells, and may aid in suppressing the emergence of tumor cells. These factors are believed to contribute to a reduced risk of colon cancer. Results from rat feeding trials suggest that RS has a cholesterol-lowering function due to enhanced levels of hepatic SR-B1 (scavenger receptor class B1) and cholesterol 7α-hydroxylase mRNA (Han et al., 2003). Resistant starch also has a prebiotic function, reduces gall stone formation, inhibits fat accumulation, and aids adsorption of minerals (Sajilata et al., 2006; Sharma et al., 2008).

Another potentially beneficial category of starch material is termed, slowly-digestible starch (SDS), which is generally fully degraded to glucose and absorbed during passage through the human small intestine, but at a moderated or reduced rate (Englyst et al., 1992; Bryan et al., 1999). In contrast to RS, slowly digestible starch contributes directly to blood glucose levels, but has a favorable impact on blood glucose homeostasis due to its prolonged time of digestion and gradual absorption within the small intestine (Englyst et al., 1992). Zhang and Hamaker (2009) indicated SDS can be impacted by the fine structure of amylopectin, especially the weight ratio of short to long starch chains. They further suggested that SDS is favored by either crystalline development among long linear branch chains during retrogradation or the preponderance of highly branched short chains (i.e., an increasing number of branch points slows digestion). Zhang and Hamaker (2009) reviewed potential benefits of SDS, associated with a slower the entry of glucose into the bloodstream and a moderated insulin response. Specific beneficial metabolic responses, which include moderated postprandial glucose levels, reduced episodes of hypoglycemia (i.e., overcompensation in response to a hyperlglycemic state), improved insulin response, and lower concentrations of glycosylated hemoglobin, are thought to provide improved satiety and mental performance.

As previously described, foods containing significant amounts of RS and SDS also have the potential to moderate the rate of glucose hydrolysis/uptake for control of glycemic response. The metabolism of RS takes place 5 to 7 hours after consumption, in comparison to normally cooked starch, which is digested almost immediately (Sajilata et al., 2006).

This phenomenon reduces postprandial glycemia and insulinemia and has potential for increasing the period of satiety between meals (Raben et al., 1994; Reader et al., 1997). Thus, in addition to the benefits RS contributes to colonic health, the same approach would also appear to be useful for moderation of the glycemic response of starch-containing foods.

Generally, RS is measured by enzymatic methods, which involve digestion of rapidly digestible starch, and quantitation of the indigestible starch residue. The fundamental step of any RS determination method for food must first remove all digestible starch from the sample using thermostable α-amylases or pancreatin enzymes (Englyst et al., 1992; McCleary and Rossiter, 2004; Shin et al., 2004). At present, two general strategies have been proposed to determine RS (Berry, 1986; Englyst et al., 1992). The in vitro RS determination of Englyst et al. (1992) has the advantage of having been correlated to actual human physiological conditions (in vivo), and is therefore able to determine both RS and SDS via the same assay Potato Granules as a Vehicle for a Whole-Tissue RS Food Ingredient To date, virtually all commercial RS products have utilized isolated starch as the vehicle for generating RS/SDS starch materials, with little, if any, emphasis directed toward a whole food strategy. Dehydrated potato products (i.e., potato granules) would appear to represent a potential vehicle for development of a potato tissue-based RS ingredient (i.e., whole-tissue approach) due to their versatility as a food ingredient, excellent shelf-stability, cost-effective transportability, and existing commercial presence within existing markets.

Native potato tissue is generally comprised of two principal regions: the cortex and the pith. The cortex is made up of vascular storage parenchyma cells, which house vast amounts of starch granules. The pith tissue, which is located in the central region of the tuber, also consists of parenchyma cells, but contains a slightly lower density of starch (Jadhav and Kadam, 1998). Parenchyma primary cell wall structures are comprised primarily of cellulose, hemicellulose (e.g., xyloglucans, heteromannans, heteroxylans), and pectic substances (Parker et al., 2001). Pectic substances, which are located in the middle lamellae (intercellular space), play a major role in intercellular adhesion, and also contribute to the mechanical strength of the cell wall (Van Marle et al., 1997). Within the native tissue, potato starch granules (ungelatinized state) are extremely resistant to human digestion due to their native crystalline structure.

Potato granules were primarily developed as an instant mashed potato product (requiring only the addition of hot water), though they are also used as an ingredient in breads and snack foods. They are commercially produced as a dehydrated product via the add-back process (Hadziyev and Steele, 1979). Basic production steps for potato granules include: peeling, slicing, precooking/blanching, cooking, mashing-mixing (with about two parts of recycled dry granules), conditioning, remixing, drying, and cooling (Hadzivev and Steele, 1979). Additional process technologies reported by Griffon (1969), Willard (1966), Shatila and Terrell (1976) and Ooraikul (1977, 1978) include use of a continuous cook in a tunnel-type boiler, use of a simultaneous cooking and mashing step, and incorporation of a freeze-thaw process to omit precooking and cooling steps.

Figure 2:
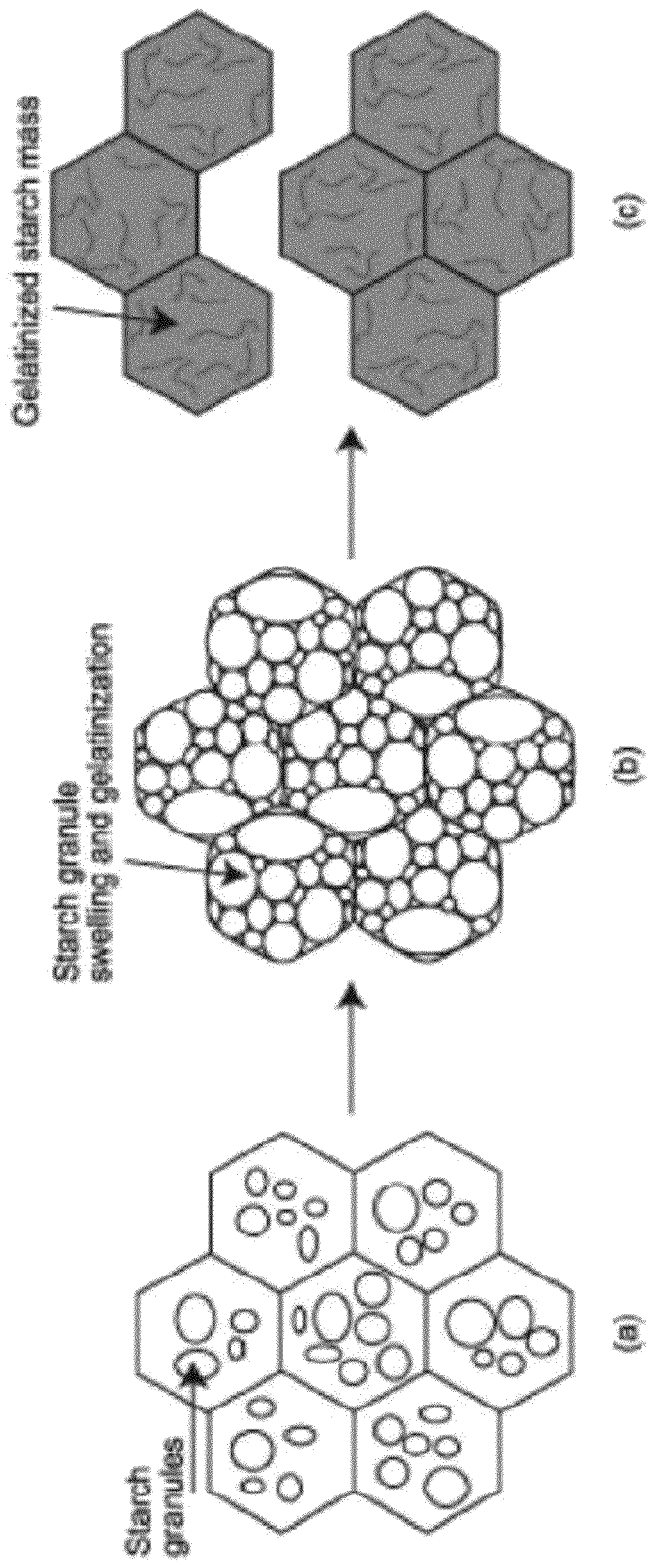
FIG. 2. Within potato tissue, (a) ungelatinized starch granules within parenchyma cells, (b) undergo swelling and gelatinization during heating to exert a temporary "swelling pressure" on surrounding cell walls. With further heating, starch granules (c) lose both granule and molecular order to form a gelatinized starch mass, which is readily degraded by amylolytic enzymes (BeMiller and Huber, 2008).

Upon heat processing (i.e., cooking), significant changes in potato texture take place that modify tissue structure and composition. Pectic substances are hydrolyzed and solubilized compared to other cell wall polymers, which changes contribute to the softening of potato texture upon heating (Van Marle et al., 1997). Pre-cooking in the presence of shear causes separation of individual parenchyma cells comprising the tissue due to hydrolysis and solubilization of the pectic middle lamellae (Hadziyev and Steele, 1979). At the same time, starch granules within parenchyma cells become swollen and gelatinized during precooking and subsequent steam-cooking steps, bringing about a loss of starch molecular order due to the melting of starch crystallites (FIG. 2). This starch thermal transition during heating is sufficient to convert potatoes from a low to a high GI category, as starch following gelatinization may be readily attacked by digestive enzymes (Englyst et al., 1992; Susan and Englyst, 1993). It is true that some retrogradation of starch takes place during subsequent cooling processing steps, in which amylose molecules and linear chain segments within potato cells re-associate (Potter, 1954; Harrington et al., 1959). However, levels of retrogradation are not sufficient and/or stable enough to reduce the overall digestibility of a cooked mashed potato product, which falls into a high glycemic index category.

According to some embodiments, there is provided a method for reducing the glycemic response values of a whole-tissue potato product comprising contacting a whole-tissue potato substrate with an aqueous solution of an etherifying agent at a temperature between 22° C. and 70° C., thereby reducing the glycemic response value of the potato product.

According to some embodiments, there is provided a method for reducing the glycemic response values of a whole-tissue potato product comprising contacting a whole-tissue potato substrate with an esterifying agent, thereby reducing the glycemic response value of the potato product.

According to some embodiments, there is provided a method for reducing the glycemic response values of a whole-tissue potato product comprising: contacting a whole-tissue potato substrate with an aqueous solution of an etherifying agent at a temperature between 22° C. and 70° C.; and/or contacting the potato substrate with an esterifying agent, thereby reducing the glycemic response value of the potato product.

In some embodiments, the glycemic response value for the whole-tissue potato product produced by the present invention is reduced by at least 5 points (e.g., at least 5 points, at least 10 points, at least 15 points, at least 20 points, at least 25 points, at least 30 points, at least 6 points, at least 7 points, at least 8 points, at least 9 points, at least 12 points, at least 18 points, at least 22 points).

In some embodiments, the glycemic response value for the whole-tissue potato product produced by the present invention is below 70. This includes glycemic response values below 69, below 68, below 67, below 66, below 65, below 64, below 63, below 62, below 61, below 60, below 59, below 58, below 57, below 56, below 55, below 54, below 53, below 52, below 51, below 50, or below 45).

In some the glycemic response value for the whole-tissue potato product produced by the present invention is between 40 and 70 (e.g., between 40 and 70, between 40 and 65, between 40 and 60, between 40 and 55, between 40 and 50, between 40 and 45, between 45 and 70, between 45 and 65, between 45 and 60, between 45 and 55, between 45 and 50, between 50 and 70, between 50 and 65, between 50 and 60, between 50 and 55, between 55 and 70, between 55 and 65, between 55 and 60, between 50 and 64, between 50 and 63, between 50 and 62, between 50 and 61, between 50 and 59, between 50 and 58, between 50 and 57, between 50 and 56, between 50 and 54, between 52 and 64, between 52 and 63, between 52 and 62, between 52 and 61, between 52 and 59, between 52 and 58, between 52 and 57, between 52 and 56, between 52 and 54, between 54 and 64, between 54 and 63, between 54 and 62, between 54 and 61, between 54 and 59, between 54 and 58, between 54 and 57, between 54 and 56, between 56 and 64, between 56 and 63, between 56 and 62, between 56 and 61, between 56 and 59, and between 56 and 58).

Methods of Preparing Whole-Tissue Potato Products

According to some embodiments, there is provided a method of preparing potato products with enhanced resistant starch (RS) content comprising contacting a whole-tissue potato substrate with an aqueous solution of an etherifying agent at a temperature between 22° C. and 70° C., thereby increasing the RS content of the potato product.

According to some embodiments, there is provided a method of preparing potato products with enhanced resistant starch (RS) content comprising contacting a whole-tissue potato substrate with an esterifying agent, thereby increasing the RS content of the potato product.

According to some embodiments, there is provided a method of preparing potato products with enhanced resistant starch (RS) content comprising: contacting a whole-tissue potato substrate with an aqueous solution of an etherifying agent at a temperature between 22° C. and 70° C.; and/or contacting the potato substrate with an esterifying agent, thereby increasing the RS content of the potato product.

According to some embodiments, there is provided a method of modifying potato cell wall constituents and/or starch within intact potato cells, to increase the enhanced resistant starch (RS) therein, comprising: contacting a whole-tissue potato substrate with an aqueous solution of an etherifying agent at a temperature between 22° C. and 70° C. thereby modifying the potato cell wall constituents and/or starch within intact potato cells.

According to some embodiments, there is provided a method of modifying potato cell wall constituents and/or starch within intact potato cells, to increase the enhanced resistant starch (RS) therein, comprising: contacting a whole-tissue potato substrate with an esterifying agent, thereby modifying the potato cell wall constituents and/or starch within intact potato cells.

According to some embodiments, there is provided a method of modifying potato cell wall constituents and/or starch within intact potato cells, to increase the enhanced resistant starch (RS) therein, comprising: contacting a whole-tissue potato substrate with an aqueous solution of an etherifying agent at a temperature between 22° C. and 70° C.; and contacting the potato substrate with an esterifying agent, thereby modifying the potato cell wall constituents and/or starch within intact potato cells.

According to some embodiments, there is provided a method of increasing resistance of modified potato products to starch retrogradation comprising: contacting a whole-tissue potato substrate with an aqueous solution of an etherifying agent at a temperature between 22° C. and 70° C., thereby increasing the resistance of modified potato products to starch retrogradation.

According to some embodiments, there is provided a method of increasing resistance of modified potato products to starch retrogradation comprising: contacting a whole-tissue potato substrate with an esterifying agent, thereby increasing the resistance of modified potato products to starch retrogradation.

According to some embodiments, there is provided a method of increasing resistance of modified potato products to starch retrogradation comprising contacting a whole-tissue potato substrate with an aqueous solution of an etherifying agent at a temperature between 22° C. and 70° C.; and/or contacting the potato substrate with an esterifying agent, thereby increasing the resistance of modified potato products to starch retrogradation.

According to some embodiments, there is provided a potato product with enhanced resistant starch (RS) content comprising a potato ingredient made by the process of contacting a whole-tissue potato substrate with an aqueous solution of an etherifying agent at a temperature between 22° C. and 70° C.

According to some embodiments, there is provided a potato product with enhanced resistant starch (RS) content comprising a potato ingredient made by the process of contacting a whole-tissue potato substrate with an esterifying agent.

According to some embodiments, there is provided a potato product with enhanced resistant starch (RS) content comprising a potato ingredient made by the process of contacting a whole-tissue potato substrate with an aqueous solution of an etherifying agent at a temperature between 22° C. and 70° C. and/or contacting the potato substrate with an esterifying agent.

The potato products of the present embodiments may have a RS content of between 5% to 70%. This includes, but is not limited to, a RS content of between 5% to 70%, between 10% to 70%, between 15% to 70%, between 20% to 70%, between 25% to 70%, between 30% to 70%, between 35% to 70%, between 40% to 70%, between 45% to 70%, between 50% to 70%, between 55% to 70%, between 60% to 70%, between 65% to 70%, between 5% to 60%, between 10% to 60%, between 15% to 60%, between 20% to 60%, between 25% to 60%, between 30% to 60%, between 35% to 60%, between 40% to 60%, between 45% to 60%, between 50% to 60%, between 55% to 60%, between 5% to 50%, between 10% to 50%, between 15% to 50%, between 20% to 50%, between 25% to 50%, between 30% to 50%, between 35% to 50%, between 40% to 50%, between 45% to 50%, between 5% to 40%, between 10% to 40%, between 15% to 40%, between 20% to 40%, between 25% to 40%, between 30% to 40%, between 35% to 40%, between 5% to 30%, between 10% to 30%, between 15% to 30%, between 20% to 30%, between 25% to 30%, between 5% to 20%, between 10% to 20%, and between 15% to 20%.

Aqueous Solutions

In some embodiments, the etherifying and/or esterifying steps are performed by contacting a whole-tissue potato substrate with an aqueous alcohol solution thereby forming a suspension or slurry. The etherifying and/or esterifying steps may be performed under acidic, neutral or basic conditions at a temperature between 22° C. and 70° C. The alcohol may be one or more of an alkyl alcohol including, but not limited to, methanol, ethanol, propanol, isopropanol, and butanol. Preferably, the alcohol is present at a level between 25% and 100% [v/v] (e.g., between 30%, 40%, 50%, 60%, 70%, 80%, or 90% to 100%).

Temperature

In some embodiments, the temperature of the etherifying step and/or the esterifying is between 22° C. and 70° C. This includes, but is not limited to, 22° C., 25° C., 30° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., and 55° C. In some embodiments, the temperature of the etherifying step and/or the esterifying is between 22° C. and 30° C., between 22° C. and 35° C., between 22° C. and 40° C., between 22° C. and 45° C., between 22° C. and 50° C., between 22° C. and 55° C., between 22° C. and 60° C., between 22° C. and 65° C., between 22° C. and 70° C., between 25° C. and 30° C., between 25° C. and 35° C., between 25° C. and 40° C., between 25° C. and 45° C., between 25° C. and 50° C., between 25° C. and 55° C., between 25° C. and 60° C., between 25° C. and 65° C., between 25° C. and 70° C., between 30° C. and 35° C., between 30° C. and 40° C., between 30° C. and 45° C., between 30° C. and 50° C., between 30° C. and 55° C., between 30° C. and 60° C., between 30° C. and 65° C., between 30° C. and 70° C., between 35° C. and 40° C., between 35° C. and 45° C., between 35° C. and 50° C., between 35° C. and 55° C., between 35° C. and 60° C., between 35° C. and 65° C., between 35° C. and 70° C., between 40° C. and 45° C., between 40° C. and 50° C., between 40° C. and 55° C., between 40° C. and 60° C., between 40° C. and 65° C., between 40° C. and 70° C., between 42° C. and 45° C., between 42° C. and 50° C., between 42° C. and 55° C., between 42° C. and 60° C., between 42° C. and 65° C., between 42° C. and 70° C., between 45° C. and 50° C., between 45° C. and 55° C., between 45° C. and 60° C., between 45° C. and 65° C., between 45° C. and 70° C., between 50° C. and 70° C., between 60° C. and 70° C., between 50° C. and 60° C., between 47° C. and 50° C., between 47° C. and 55° C., between 45° C. and 52° C., between 47° C. and 52° C., between 48° C. and 52° C., or between 48° C. and 55° C.

Potato Substrate

According to some embodiments, the starting material for the methods of the present invention is a whole-tissue potato substrate. A whole-tissue potato substrate material is produced from the flesh of the potato. In some embodiments, the whole-tissue substrate material comprises the majority of native dry solids contained in a native potato. Native dry solids contains the lipid, protein, carbohydrate (e.g., starch, fiber, and sugars), and ash of the native potato. In some embodiments, the potato substrate is a potato product/ingredient that contains at least 20% of the dry solids of a native potato (e.g. at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 97%, or at least 98% of the dry solids of a native potato). A whole-tissue potato substrate is distinct from an isolated starch product.

In some embodiments, the whole-tissue potato substrate comprises existing commercial potato product (e.g. potato granules) that exhibits an intact parenchyma cell wall structure for use as a starting material for development of the potato products/ingredients of the present invention.

In some embodiments, the whole-tissue potato substrate comprises potato flakes, potato granules, or potato flours for use as a starting material for development of the potato products/ingredients of the present invention.

In some embodiments, the whole-tissue potato substrate is a dehydrated whole-tissue potato product. In other embodiments, the whole-tissue potato product may be in the form of peeled potatoes, potato slices, potato cubes, potato dices, potato shreds, potato wedges, or potato sticks, which may or may not be dehydrated.

In some embodiments, the potato substrate is a potato product/ingredient that contains at least 20% intact parenchyma cells (e.g. at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 97%, or at least 98%).

Etherifying Agent

The etherifying agent may be any agent known to be capable of producing starch ethers. In some embodiments, the etherifying agent is one or more of propylene oxide, acrolein, epichlorohydrin, epichlorohydrin and propylene oxide, epichlorhydrin and acetic anhydride, and epichlorohydrin and succinic anhydride, including all mixtures and combinations of these agents.

The amount of etherifying agent used may be between 0.5% and 35% [w/w] based on potato substrate dry weight. The amount of etherifying agent used may be between 0.5% and 35% [w/w], between 0.5% and 30% [w/w], between 0.5% and 28% [w/w], between 0.5% and 25% [w/w], between 0.5% and 22% [w/w], between 0.5% and 20% [w/w], between 0.5% and 18% [w/w], between 0.5% and 15% [w/w], between 0.5% and 12% [w/w], between 0.5% and 10% [w/w], between 0.5% and 8% [w/w], between 0.5% and 6% [w/w], between 0.5% and 4% [w/w], between 1% and 35% [w/w], between 1% and 30% [w/w], between 1% and 28% [w/w], between 1% and 25% [w/w], between 1% and 22% [w/w], between 1% and 20% [w/w], between 1% and 18% [w/w], between 1% and 15% [w/w], between 1% and 12% [w/w], between 1% and 10% [w/w], between 1% and 8% [w/w], between 1% and 6% [w/w], between 1% and 4% [w/w], between 2% and 35% [w/w], between 2% and 30% [w/w], between 2% and 28% [w/w], between 2% and 25% [w/w], between 2% and 22% [w/w], between 2% and 20% [w/w], between 2% and 18% [w/w], between 2% and 15% [w/w], between 2% and 12% [w/w], between 2% and 10% [w/w], between 2% and 8% [w/w], between 2% and 6% [w/w], between 2% and 4% [w/w], between 4% and 35% [w/w], between 4% and 30% [w/w], between 4% and 28% [w/w], between 4% and 25% [w/w], between 4% and 22% [w/w], between 4% and 20% [w/w], between 4% and 18% [w/w], between 4% and 15% [w/w], between 4% and 12% [w/w], between 4% and 10% [w/w], between 4% and 8% [w/w], between 4% and 6% [w/w], between 8% and 35% [w/w], between 8% and 30% [w/w], between 8% and 28% [w/w], between 8% and 25% [w/w], between 8% and 22% [w/w], between 8% and 20% [w/w], between 8% and 18% [w/w], between 8% and 15% [w/w], between 8% and 12% [w/w], between 8% and 10% [w/w], between 10% and 35% [w/w], between 10% and 30% [w/w], between 10% and 28% [w/w], between 10% and 25% [w/w], between 10% and 22% [w/w], between 10% and 20% [w/w], between 10% and 18% [w/w], between 10% and 15% [w/w], between 10% and 12% [w/w], between 12% and 35% [w/w], between 12% and 30% [w/w], between 12% and 28% [w/w], between 12% and 25% [w/w], between 12% and 22% [w/w], between 12% and 20% [w/w], between 12% and 18% [w/w], between 12% and 15% [w/w], between 15% and 35% [w/w], between 15% and 30% [w/w], between 15% and 28% [w/w], between 15% and 25% [w/w], between 15% and 22% [w/w], between 15% and 20% [w/w], between 15% and 18% [w/w], between 20% and 35% [w/w], between 20% and 30% [w/w], between 20% and 28% [w/w], between 20% and 25% [w/w], between 20% and 22% [w/w], between 22% and 35% [w/w], between 22% and 30% [w/w], between 22% and 28% [w/w], between 22% and 25% [w/w], between 25% and 35% [w/w], or between 30% and 35% [w/w] based on potato substrate dry weight.

The etherifying step may be performed under acidic, neutral or basic conditions at a temperature between 22° C. and 70° C. In some embodiments, is performed under basic condition such as at a pH greater than or equal to 8 (e.g., a pH between 8 and 14). This includes a pH above pH 8.5, above pH 9, above pH 9.5, above pH 10, above pH 10.5, above pH 11, above pH 11.5, above pH 12, above pH 12.5, above pH 13.5, or above pH 13.5. In some embodiments, the pH is between 10 and 14 (e.g. between 11 and 14, between 12 and 14, between 13 and 14).

Esterifying Agent

The esterifying agent may be any agent known to be capable of producing starch esters. In some embodiments, the esterifying agent is one or more of trimetaphosphate (STMP), sodium tripolyphosphate (STPP), phosphorous oxychloride, and epichlorohydrin, including all mixtures and combinations of these agents. In some embodiments, the esterifying agent is one or more acetic anhydride, adipic anhydride, adipic anhydride and acetic anhydride, vinyl acetate, monosodium orthophosphate, 1-octenyl succinic anhydride, succinic anhydride, phosphorus oxychloride, phosphorus oxychloride and vinyl acetate, phosphorus oxychloride and acetic anhydride, sodium trimetaphosphate and sodium tripolyphosphate, sodium tripolyphosphate, and sodium trimetaphosphate, including all mixtures and combinations of these agents.

The amount of esterifying agent used may be between 0.5% and 35% [w/w] based on potato substrate dry weight. The amount of esterifying agent used may be between 0.5% and 35% [w/w], between 0.5% and 30% [w/w], between 0.5% and 28% [w/w], between 0.5% and 25% [w/w], between 0.5% and 22% [w/w], between 0.5% and 20% [w/w], between 0.5% and 18% [w/w], between 0.5% and 15% [w/w], between 0.5% and 12% [w/w], between 0.5% and 10% [w/w], between 0.5% and 8% [w/w], between 0.5% and 6% [w/w], between 0.5% and 4% [w/w], between 1% and 35% [w/w], between 1% and 30% [w/w], between 1% and 28% [w/w], between 1% and 25% [w/w], between 1% and 22% [w/w], between 1% and 20% [w/w], between 1% and 18% [w/w], between 1% and 15% [w/w], between 1% and 12% [w/w], between 1% and 10% [w/w], between 1% and 8% [w/w], between 1% and 6% [w/w], between 1% and 4% [w/w], between 2% and 35% [w/w], between 2% and 30% [w/w], between 2% and 28% [w/w], between 2% and 25% [w/w], between 2% and 22% [w/w], between 2% and 20% [w/w], between 2% and 18% [w/w], between 2% and 15% [w/w], between 2% and 12% [w/w], between 2% and 10% [w/w], between 2% and 8% [w/w], between 2% and 6% [w/w], between 2% and 4% [w/w], between 4% and 35% [w/w], between 4% and 30% [w/w], between 4% and 28% [w/w], between 4% and 25% [w/w], between 4% and 22% [w/w], between 4% and 20% [w/w], between 4% and 18% [w/w], between 4% and 15% [w/w], between 4% and 12% [w/w], between 4% and 10% [w/w], between 4% and 8% [w/w], between 4% and 6% [w/w], between 8% and 35% [w/w], between 8% and 30% [w/w], between 8% and 28% [w/w], between 8% and 25% [w/w], between 8% and 22% [w/w], between 8% and 20% [w/w], between 8% and 18% [w/w], between 8% and 15% [w/w], between 8% and 12% [w/w], between 8% and 10% [w/w], between 10% and 35% [w/w], between 10% and 30% [w/w], between 10% and 28% [w/w], between 10% and 25% [w/w], between 10% and 22% [w/w], between 10% and 20% [w/w], between 10% and 18% [w/w], between 10% and 15% [w/w], between 10% and 12% [w/w], between 12% and 35% [w/w], between 12% and 30% [w/w], between 12% and 28% [w/w], between 12% and 25% [w/w], between 12% and 22% [w/w], between 12% and 20% [w/w], between 12% and 18% [w/w], between 12% and 15% [w/w], between 15% and 35% [w/w], between 15% and 30% [w/w], between 15% and 28% [w/w], between 15% and 25% [w/w], between 15% and 22% [w/w], between 15% and 20% [w/w], between 15% and 18% [w/w], between 20% and 35% [w/w], between 20% and 30% [w/w], between 20% and 28% [w/w], between 20% and 25% [w/w], between 20% and 22%

[w/w], between 22% and 35% [w/w], between 22% and 30% [w/w], between 22% and 28% [w/w], between 22% and 25% [w/w], between 25% and 35% [w/w], or between 30% and 35% [w/w] based on potato substrate dry weight.

The esterifying step may be performed under acidic, neutral or basic conditions at a temperature between 22° C. and 70° C. In some embodiments, is performed under basic condition such as at a pH greater than or equal to 8 (e.g., a pH between 8 and 14). This includes a pH above pH 8.5, above pH 9, above pH 9.5, above pH 10, above pH 10.5, above pH 11, above pH 11.5, above pH 12, above pH 12.5, above pH 13.5, or above pH 13.5. In some embodiments, the pH is between 10 and 14 (e.g. between 11 and 14, between 12 and 14, between 13 and 14).

DEFINITIONS

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions, will control. In addition, the materials, methods, and examples are illustrative only not intended to be limiting. Other features and advantages of the invention will be apparent from the following detailed description and claims.

For the purposes of promoting an understanding of the embodiments described herein, reference will be made to preferred embodiments and specific language will be used to describe the same. The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a composition" includes a plurality of such compositions, as well as a single composition, and a reference to "a therapeutic agent" is a reference to one or more therapeutic and/or pharmaceutical agents and equivalents thereof known to those skilled in the art, and so forth.

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

EXAMPLES

It is understood that modifications which do not substantially affect the activity of the various embodiments of this invention are also provided within the definition of the invention provided herein. Accordingly, the disclosed examples are intended to illustrate but not limit the present invention. While the claimed invention has been described in detail and with reference to specific embodiments thereof, it will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

Example 1

To investigate modification with actual commercial food-grade reagents, commercial potato granules were substituted with propylene oxide (PO) using a factorial experimental design consisting of four PO addition levels (4.6%, 9.1%, 12.8% and 18.3% [w/w], based on potato granule dry weight) and two reaction temperatures (22 and 48° C.). Molar substitution (MS) values increased with both increasing PO addition levels and reaction temperatures. Enhancement of PO MS levels with increasing reaction temperature was attributed to a combination of possible factors including increased swelling of starch, a possible reduction of the Donnan potential, and/or a greater proportion of deprotonated starch alkoxide ions available for reaction. A positive correlation ($r=0.93$) between PO MS and RS levels indicated that incorporation of bulky hydroxypropyl groups onto starch molecules resulted in steric hindrance to the enzymic digestion, effectively promoting RS formation.

In contrast to RS, only low levels of slowly digestible starch (SDS) were achieved with potato granule chemical modification.

Example 2

In a second factorial experiment, the combined effects of PO substitution (0%, 10%, and 20% [w/w], based on potato granule dry weight), cross-linking with sodium trimetaphosphate (STMP) (0%, 1%, 2%, and 4% [w/w], based on potato granule dry weight), and reaction temperature (22, 34 and 48° C.) were investigated in regard to degrees of derivatization and RS formation. Both PO and STMP significantly contributed to RS formation, though the combined effects of two reagents were simply additive, rather than synergistic. The estimated Glycemic Index (eGI) for dual modified potato granules was significantly decreased by derivation (from 116.4 for unmodified granules to 59.7-65.9 for dual-modified granules), affecting both the rate and extent of starch hydrolysis by amylolytic enzymes. From a practical standpoint, the higher allowable reagent addition levels make PO a better choice than STMP for enhancement of RS content and reduction of the glycemic response within commercial potato granules.

As viewed by scanning electron microscopy (SEM), modified potato granules retained an intact parenchyma cell structure, but did exhibit a slightly shrunken appearance compared to commercial potato granules. In regard to proximate composition, modified potato granules exhibited both decreased protein and lipid contents (≥50% reductions), as well as slightly increased total carbohydrate, starch and ash contents, relative to commercial (unmodified) potato granules. Hydroxypropylation was observed to enhance the retrogradation stability of starch within modified potato granules relative to that within the commercial control. Thus, PO substitution has potential to improve the physical properties of potato granules for use in refrigerated and/or frozen foods systems.

In short, it was possible to enhance the RS content and decrease the eGI of commercial potato granules through chemical modification with PO and STMP reagents, achieving RS contents as high as 50% (i.e. potato granules with improved RS/glycemic characteristics).

Materials And Methods

Commercial Potato Granule and Starch Sources: Commercial potato granules provided by Basic American Foods (Blackfoot, Id.) were the primary substrate in all modification experiments. Native potato starch was obtained from AVEBE (Veendam, Netherlands) as a reference material for resistant starch assays.

Derivatization of Potato Granules with 5-(4,6-dichlorotriazinyl)aminofluorescein (DTAF)

Commercial potato granules were chemically modified with a fluorescent probe, 5-(4,6-dichlorotriazinyl)aminofluorescein (DTAF, Sigma-Aldrich Corp., St. Louis, Mo.) within a "model" reaction system to investigate the potential for starch molecules within potato parenchyma cells to react with a chemical reagent. Commercial potato granules (9.1 g, dry basis, db) were weighed into a 125 mL Erlenmeyer flask, followed by addition of excess deionized water (~70 mL). Potato granules were stirred at ambient temperature (30 min) to facilitate hydration, and were collected via centrifugation (1500×g, 20 min) after discarding the resulting supernatant. Hydrated potato granules were transferred to a 125 mL Erlenmeyer flask, followed by addition of triethylamine (18.5 mL). In a separate flask, DTAF reagent (0.003 g) was dispersed in chloroform (15.3 mL) in the dark to prevent photobleaching of the fluorescent probe. Both mixtures were stirred independently for 30 min, after which the chloroform/DTAF solution was transferred to the flask containing the potato granule/triethylamine suspension. The reaction slurry was allowed to stir 24 hr in the dark at ambient temperature. Following reaction, potato granules were recovered by centrifugation (1500×g, 20 min) after discarding the supernatant, and were then divided amongst three 50 mL polypropylene screw-cap centrifuge tubes (each containing 20 mL of absolute ethanol). Resultant tubes were covered with aluminum foil (to minimize exposure to ambient light), and placed on a wrist action shaker (Model 75, Burrell Corp., Pittsburg, Pa.) for two hr to remove unreacted reagent. After removal from the shaker, tubes were centrifuged (1500×g, 20 min) and the supernatant was discarded, after which recovered potato granules within each tube were re-suspended in fresh absolute ethanol (20 mL). This washing procedure was repeated multiple times until the ethanol wash medium following centrifugation was colorless, indicating removal of unreacted dye. Modified potato granules were collected on a Büchner funnel, and allowed to air-dry in the dark. A reaction control was prepared in the same manner, except that no DTAF reagent was added to the reaction system.

Chemical Modification of Commercial Potato Granules with Propylene Oxide

Commercial potato granules were modified with propylene oxide at four different reagent addition levels (4.6%, 9.1%, 12.8%, and 18.3% [w/w], based on potato granule dry weight) under two different temperature conditions (22° C. and 48° C.) to determine the effect of chemical modification on RS formation. Reaction system parameters for the factorial (4×2) experiment are provided in Table 2.

TABLE 2

Reaction System Parameters[1] for Substitution of Commercial Potato Granules with Propylene Oxide

| Reagent Addition Level | Isopropanol (mL) | 5.0M NaOH (mL) | Potato Granules (g, dry weight) | Propylene Oxide (mL)[2] |
|---|---|---|---|---|
| Control | 10.5 | 3.5 | 4.5 | 0.00 |
| PO-1 | 10.5 | 3.5 | 4.5 | 0.25 |
| PO-2 | 10.5 | 3.5 | 4.5 | 0.50 |
| PO-3 | 10.5 | 3.5 | 4.5 | 0.75 |
| PO-4 | 10.5 | 3.5 | 4.5 | 1.00 |

[1]Reactions were allowed to proceed 24 hours, and were conducted separately for the two different temperature conditions (22° C. and 48° C).
[2]Reagent addition levels for potato granule reactions (PO-1, PO-2, PO-3, PO-4) translated into 4.6%, 9.1%, 12.8%, and 18.3% (w/w) propylene oxide, respectively, based on potato granule dry weight.

For each reaction, potato granules (4.5 g, db) were transferred to a 100 mL round bottom flask, and suspended in isopropanol (11 mL) under constant mechanical stirring, after which 3.5 mL of NaOH (5.0 M) was gradually added to the flask in a drop-wise manner.

The suspension was to stirred (2 min) to disperse potato granules evenly within the reaction slurry. For modification, the reaction flask was transferred to an environmental incubator shaker (Model G24, New Brunswick Scientific Co., Edison, N.J.) to allow equilibration of the potato granule slurry to the desired reaction temperature (22° C. or 48° C.). To maintain consistent conditions for all reactions, stirring was standardized at 390 rpm using a Variomag (Model Poly 15, Daytona Beach, Fla.) large capacity magnetic stirrer mounted within the incubator, and utilized a ⅞"×³⁄₁₆" stir bar (Part No. 58947-106, VWR International, West Chester, Pa.). The appropriate amount of propylene oxide reagent was added to the reaction flask in accordance with the intended modification level (Table 1), and a glass stopper was placed on the reaction flask to prevent evaporation of reaction system components during derivatization. A reaction control was subjected to identical reaction conditions, except that it received no added reagent.

All reactions were allowed to proceed for 24 hr. After reaction, the potato granule slurry was neutralized with a solution of HCl (3.0 M) in absolute ethanol. Modified potato granules were recovered on a Büchner funnel, and washed on the filter with 45% (v/v) aqueous ethanol (150 mL) to remove salts and spent reagent. A final wash with absolute ethanol was conducted on the filter, after which the modified potato granules were collected and air-dried overnight.

Dual Chemical Modification of Commercial Potato Granules with Propylene Oxide and Sodium Trimetaphosphate (STMP)

Potato granules were modified with both propylene oxide and sodium trimetaphosphate (STMP) to investigate the effects of dual chemical modification on RS formation. A factorial design (3×4×3) utilizing three propylene oxide addition levels (0%, 10%, and 20% [w/w], based on potato granule dry weight), four levels of STMP addition (0%, 1.0%, 2.0%, and 4.0% [w/w], based on potato granule dry weight), and three reaction temperature conditions (22° C., 34° C., and 48° C.) was used for modification of potato granules.

Hydroxypropylation was conducted under conditions previously described, but in accordance with reagent addition levels and reaction temperatures specified in the previous paragraph. At the completion of the 24 hour hydroxypropylation reaction period, the glass stopper of each reaction flask was removed and the appropriate amount of STMP reagent (based on the intended modification level) was added to the reaction system. The glass stopper was replaced onto the reaction flask, and reaction with STMP was allowed to proceed for three additional hours. At the conclusion of the reaction period, modified potato granule products were washed and recovered as previously described for hydroxypropylated potato granules. A reaction control was subjected to identical reaction conditions, except that it received no propylene oxide or STMP reagent.

Molar Substitution (MS) Determination for Hydroxypropylated Potato Granules

Molar substitution (MS) values of modified potato granules were determined by the spectrophotometric procedure of Johnson (1969). Modified potato granule material (100 mg, db) was weighed into a 100 mL volumetric flask, after which 1.0 N sulfuric acid (25 mL) was added to the flask. A reaction control sample was prepared in like manner as a reference. Both flasks were placed in a boiling water bath and heated for three hr. Flask contents were cooled to ambient temperature, and diluted to a volume of 100 mL with deionized water. A 1 mL aliquot from each flask (modified and reference samples) was transferred to two separate 25 mL graduated test tubes. Also, aliquots (1 mL) of aqueous standard solutions (containing 10, 20, 30, 40 or 50 jig of propylene glycol per mL) were treated in like fashion for the purposes of creating a standard curve to assist with quantification of potato granule MS levels. With tubes immersed in cold water, concentrated sulfuric acid (8 mL) was added to each tube in drop-wise fashion. Tubes were capped, vortexed (5 sec), and placed in a boiling water bath (3 min), after which they were immediately chilled in an ice bath (30 min). Ninhydrin solution (0.6 mL, 3% [w/v] solution of 1,2,3-triketohydrindene crystals in 5% [w/v] aqueous sodium bisulfite) was added carefully to each tube, allowing it to run down the inner test tube walls. After shaking gently by hand (~4 sec), tubes were placed in a 25° C. water bath (100 min), after which the volume of each tube was adjusted to 25 mL with concentrated sulfuric acid, followed by subsequent mixing (inversion of the tubes multiple times). Solution representing both the modified and reference potato granule materials was immediately transferred to separate 10 mm cuvettes. After allowing cuvettes to stand (5 min), samples were analyzed on a spectrophotometer (UV160U, Shimadzu, Kyoto, Japan) at 590 nm using the prepared reaction control sample as the reference. A standard curve was prepared based on the analysis of aqueous standard solutions containing 10, 20, 30, 40 or 50 µg of propylene glycol per mL. The weight percent ratio (%) of hydroxypropyl groups per unit weight of potato granule sample was calculated according to equation (1) below:

$$\text{Hydroxypropyl group content } (C_3H_7O\%) = (C \times 0.7763 \times 10)/W \tag{1}$$

where C equals the concentration of propylene glycol equivalent groups present in the analyzed sample solution (g/mL, obtained from the standard curve). The coefficient of 0.7763 was used for conversion of the weight of a propylene glycol molecule to that of a hydroxypropyl group (HPG), while W represents the weight of the starch portion of the potato granule sample (mg) being analyzed. A net factor of 10 was included to collectively account for unit conversion [µg to mg], dilution factors, and percent ratio calculations. For simplicity (and as a conservative approach to calculating MS levels within the starch fraction), this calculation presumes all reagent groups to be located within the starch fraction. Using the value obtained from equation (1), starch MS values (average number of hydroxypropyl groups per anhydroglucose unit [AGU]) were obtained using equation (2), $$MS = (C_3H_7O\% \times 162)/((100-C_3H_7O\%) \times 59.08) \tag{2}$$

where the numbers 162 and 59.08 reflect the molecular weights of an AGU and a hydroxypropyl group, respectively (Lawal et al., 2008). In this analysis scheme, it was not possible to differentiate between propylene oxide groups attached to starch, cell wall polysaccharides, or other potentially reactive constituents. Thus, MS values reported here presume all propylene oxide groups to have reacted within the starch fraction (i.e., MS values are presented on a starch basis). Further, this analysis could only be utilized to determine MS values for hydroxypropylated granules that received no cross-linking, due to the fact that cross-linking substituent groups interfered with hydroxypropyl group MS determination.

Degree of Substitution (DS) Determination for Cross-Linked Potato Granules

Incorporated phosphorus was calculated by subtracting the indigenous phosphorus content (0.0032 g/g potato granule) of the reaction control from the total phosphate content of the modified potato granules. Phosphorus (P) levels in modified potato granules were determined by inductively coupled plasma-atomic emission spectroscopy (ICP-AES) according to the method of Anderson (1996). Similar to the MS calculation for hydroxypropylation, DS values were calculated under the presumption that incorporated phosphorus was located solely within the starch fraction of potato granules. The formula for calculating the degree of substitution (DS) of potato starch derivatized with STMP is outlined in equation (3):

$$DS = P \times 162/31 \tag{3}$$

In this equation, 162 represents the molecular weight of a starch AGU, 31 represents the molecular weight of phosphorus, and P reflects the weight equivalent of incorporated phosphorus (g/g starch) within modified potato granules.

In Vitro Determination of Starch Digestibility

In vitro hydrolysis of both modified and control and potato granules were analyzed according to the method described by Englyst et al. (1992) with minor modification.

Briefly, the various starch fractions (total starch [TS]; rapidly digestible starch [RDS]; slowly digestible starch [SDS]; resistant starch [RS]) were calculated based on the amounts of glucose (rapidly available glucose [RAG] or slowly available glucose [SAG]) released from potato granule or starch samples during incubation with invertase, pancreatin and amyloglucosidase. In general, incubation of starch-containing materials was conducted at 37° C. in capped tubes immersed within a shaking water batch. Though determination of the various starch fractions is described below on the basis of a single sample, in reality, it was possible to simultaneously analyze up to seven sample tubes at a time (including a reaction control and sample blank).

Enzyme Solution and Reagent Preparation

Enzyme solutions for the various analyses were prepared as follows. Amyloglucosidase solution was prepared by transferring 0.24 mL of enzyme (300 units/mL, Catalog No. A7095, Sigma-Aldrich Corp.) to a 5 mL glass beaker, which was diluted to 0.5 mL with deionized water, resulting in a final enzyme concentration of 140 units/mL. Pancreatin enzyme solution was prepared by diluting pancreatin (1.0 g, Catalog No. 7545, Sigma-Aldrich Corp.) in deionized water (6.7 mL) within a 50 mL polypropylene centrifuge tube. The solution was stirred (5 min) and centrifuged (1500×g, 10 min), after which the supernatant was retained. A portion of the resulting pancreatin solution supernatant (4.5 mL) was mixed with prepared amyloglucosidase solution (0.5 mL) and 0.5 mg of invertase (300 units/mg, Catalog No. I4504, Sigma-Aldrich Corp.) to produce the final enzyme solution used for all analyses. All enzyme solutions were prepared fresh just prior to use.

For preparing the buffer, 13.6 g of sodium acetate trihydrate was dissolved in saturated benzoic acid solution (250 mL), and diluted to 1.0 L with deionized water. Acetic acid (0.1 M) was used to adjust the buffer solution to pH 5.2, after which 1.0 M $CaCl_2$ solution (4 mL) was added to stabilize and activate the enzymes.

In Vitro Measurement of Rapidly Available Glucose (RAG) and Slowly Available Glucose (SAG)

Modified potato granule material or starch (600 mg db) was weighed into a 50 mL polypropylene centrifuge screw-cap tube, followed by addition of 0.1 M sodium acetate buffer solution (20 mL). A sample blank containing only acetate buffer (no potato granule or starch material) was prepared to correct for any glucose present in the amyloglucosidase solution. The tube containing potato granule or starch material was capped and vortexed vigorously (1 min).

For potato granule or starch samples to be analyzed "as eaten" (following a cooking step), the tube was placed in a boiling water bath for 30 min, after which it was cooled to ambient temperature. For potato granule or starch samples analyzed on an "as is" basis, this heating step was omitted.

The tube containing potato granule or starch material was equilibrated to 37° C. in a shaking water bath (Model 406015, American Optical, Buffalo, N.Y.). After reaching the target temperature, 5 mL of the final enzyme solution was added to the potato granule or starch suspension. The tube was then tightly capped and firmly secured to the shaking mechanism of the water bath in a horizontal manner (fully immersed), and the water bath was adjusted to 160 strokes per min. In addition, two additional tubes containing 66% (v/v) aqueous ethanol (20 mL) were prepared, and set aside for extraction of glucose from potato granule or starch samples subjected to enzyme digestion after 20 and 120 min, respectively.

After 20 min of incubation, 0.5 mL of the resulting hydrolyzate was removed from the original 25 mL suspension (dilution factor [D]=50 in equation (4)) and transferred to a previously prepared tube containing 66% aqueous ethanol (20 mL; test volume [Vt]=20.5 in equation (4)), representing the amount of glucose released from samples after 20 min of digestion (RAG; tube was designated G20). After sampling, the original tube containing potato granule or starch material was immediately returned to the shaking water bath for further incubation. After an additional 100 min of incubation (total of 120 min), a second 0.5 mL sample was again removed and transferred to a second tube containing 66% aqueous ethanol (representing the amount of glucose released from samples after 120 min of digestion [SAG]; tube was designated G120). The G20 and G120 tubes were both centrifuged (1500×g, 5 min) to yield clear supernatants (containing glucose) prior to further glucose analysis as described in the subsequent paragraph.

For generated supernatants (G20, G120) representing modified potato granules, 0.1 mL of each supernatant was pipetted into separate cuvettes. Glucose content was measured using a commercially available kit via the glucose oxidase/peroxidase enzymic reactions (Glucose Assay Kit [K-GLUC], Megazyme International Ireland Ltd., Wicklow, Ireland). Glucose oxidase/peroxidase reagent (GOPOD) and acetate buffer blank were prepared as directed by the kit manufacturer. GOPOD reagent (3.0 mL) was added to each cuvette (containing 0.1 mL of G20 or G120 solution), after which cuvettes were subsequently incubated at 45° C. (20 min). A tube containing 0.1 mL of glucose standard solution (1.0 mg/mL; designated AD-glucose standard in equation (4)) was treated in the same manner. Following incubation, cuvettes were analyzed on a spectrophotometer at 510 nm against an acetate buffer blank. Absorbance values of the experimental sample$_{(ASample)}$ and the known glucose standard (AD-glucose standard) were measured. Glucose content (%) was calculated according to equation (4) below:

$$\text{Glucose} = 100 * [1.0 \text{ (mg/ml)} * A\text{Sample}/AD\text{-glucose standard}] * Vt * D/Wt \quad (4)$$

Glucose detected in G20 supernatant was designated as G'20 and glucose detected in G120 samples was designated as G'120. Wt represents the total weight of potato granules or starch (mg). As noted earlier in this section, Vt represents the total volume of test solution (20.5 mL) and D represents the dilution factor (50). A factor of 100 was included to account for conversion of the unit ratio of glucose (mg/mg potato granules) to a percent ratio (%) of the potato granule weight.

Measurement of Total Glucose (TG) Content (Unmodified Reaction Control Potato Granules)

For determination of the total digestible glucose (TG) content within reaction control potato granule samples (and to estimate this value within modified potato granules), reaction control potato granule material was prepared/heated and subjected to enzymatic digestion similar to the protocol described above. However, the tube containing the potato granule reaction control material was digested only for 120 min (i.e., included no 20 min incubation period). After 120 min incubation, the tube containing the original 25 mL digestion volume was placed in a boiling water bath (30 min), vortexed (10 sec), and cooled in an ice water bath (20 min). Following cooling, 7.0 M KOH (10 mL) was transferred to the tube with mixing, and the tube was shaken in an ice water bath (30 min) at 120 stokes per minute. Resulting hydrolyzate (1 mL) was transferred to a 50 mL centrifuge tube containing 0.5 M acetic acid (10 mL) (dilution factor [D]=35 in equation (4)). Prepared amyloglucosidase solution (0.2 mL) was added to the tube, which was then incubated at 70° C. in a water bath (30 min). Following incubation, the tube was transferred to a boiling water bath (10 min), cooled to room temperature, and diluted to 50 mL with deionized water (50 mL; test volume [Vt]=50 in equation 4). The tube was then centrifuged (1500× g, 5 min) to remove any remaining insoluble material. Supernatant (0.1 mL) was pipetted into a cuvette along with GOPOD reagent (3 mL), and the total glucose content was determined as described above to provide a measure of the total glucose (i.e., starch) present in the potato granule reaction control material. Glucose content (TG) was calculated with equation (4) using the values Vt (50) and D (35).

Determination of Resistant, Slowly Digestible, Rapidly Digestible, and Total Starch RDS (rapidly digestible starch), SDS (slowly digestible starch), RS (resistant starch), and TS (total starch) were determined from G'20, G'120, and TG values using equations 5-8 below. A factor of 0.9 in these equations was used to convert glucose values to starch contents.

$$RDS = G'20 \times 0.9. \quad (5)$$

$$SDS = (G'120 - G'20) \times 0.9. \quad (6)$$

$$TS = TG \times 0.9. \quad (7)$$

$$RS = TS - (RDS + SDS) \quad (8)$$

In Vitro Starch Digestibility Index and Estimated Glycemic Index Determinations

The digestibility index of unmodified or modified potato granules was measured similar to the method described for determination of RAG and SAG. For this determination, potato granule hydrolyzate was prepared and incubated as previously outlined, but sampled at 30 min intervals over a total analysis period of 150 min, yielding G30, G60, G90, G120, G150 hydrolyzate solutions (corresponding to the hydrolzate collected for each respective digestion time). For each digestion time, hydrolyzate was centrifuged (1500×g, 5 min) to yield clear supernatant (containing glucose), which was assayed for glucose content via the glucose oxidase/peroxidase procedure described herein. Glucose released during the various digestion periods (designated as G'30, G'60, G'90, G'120, and G'150) was calculated using equation (4). The procedure of Goni et al. (1997) was used to measure the starch digestibility index, which is calculated by dividing the amount of starch digested after 90 min of incubation (HI90) by the total starch content of the reaction control, according to equation (9). The estimated glycemic index (eGI) was calculated according to equation (10) (Goni. et al., 1997).

$$HI90=((G'90\times0.9)/TS)\times100 \qquad (9)$$

$$eGI=39.21+0.803*(HI90) \qquad (10)$$

Proximate Composition of Modified Potato Granules

Proximate composition was determined for both modified and commercial potato granule products to assess the effect of modification on macronutrient content. Moisture content was measured using a vacuum oven method (Method 934.01; AOAC, 2000). Ash content was assessed using a muffle furnace (Method 923.03; AOAC, 2000), while lipid content was measured by Soxhlet extraction with petroleum ether (Method 920.39B; AOAC, 2000). Protein content was determined using a LECO Combustion Analyzer CNS-2000 (LECO Corporation, St. Joseph, Mich.) (Method 46-30, N×6.25; AACC, 2000). Protein, carbohydrate, lipid, and ash contents were all calculated on a dry weight basis. Total carbohydrate content was calculated by difference (Total Carbohydrate %=100%–[% ash+% fat+% protein])

Differential Scanning Calorimetry (DSC)

Thermal characteristics of select control and modified potato granules were analyzed using a differential scanning calorimeter (DSC, TA 2920, TA Instruments, Newcastle, Del.). Potato granules (10 mg, db) were weighed into stainless steel pans, and 20 µL of deionized water were added using a micro-syringe. Sample pans were hermetically sealed, equilibrated overnight at room temperature, and heated from 30 to 180° C. at a rate of 10° C./min; a sealed empty pan was used as the reference. Transition onset ($T_o$), peak ($T_p$), and conclusion ($T_c$) temperatures, as well as transition enthalpies ($\Delta R$), were recorded using TA Universal Analysis Software (version 3.6). Following initial heating, sample pans were subjected to various lengths of refrigerated storage at 4° C. (0, 7, 14 or 21 days), and were reheated to track levels of starch retrogradation within potato granules samples.

Microscope Imaging

Commercial potato granules were visually examined via light microscopy in regard to parenchyma cell structure and shape, while confirmation of the starch locale within parenchyma cells was aided by iodine staining ($I_2$/KI solution=0.05%/0.5%, w/v). All samples were visualized using a Nikon Eclipse E600 microscope (Nikon Instruments Inc., Melville, N.Y.) equipped with a digital camera (Q Imaging Micropublisher 3.3, Burnaby, BC, Canada).

Optical sections of potato granules derivatized with DTAF (fluorescent probe) were examined using a BioRad MRC 1024 confocal laser scanning microscope (CLSM) system (Carl Zeiss Microimaging, Thornwood, N.Y.) to probe the extent to which reagent was able to access starch molecules within parenchyma cells. Sample specimens were prepared by dusting a minute amount of DTAF-derivatized potato granules onto a microscope slide that had been previously lightly coated with wax. The slide was then passed quickly over a flame to affix granules to the glass via melting/hardening of the wax (Huber and BeMiller, 2000). Affixed granules were overlaid with immersion oil and a glass cover slip, and viewed by CLSM. Excitation was achieved with a Krypton/Argon Laser (10% power) using blue light (488 nm) illumination.

Electron micrographs of modified and unmodified commercial potato granules were obtained via scanning electron microscopy (SEM, Supra 35VP, LEO-32, Carl Zeiss Microimaging). Specimens were mounted onto aluminum stubs using double-sided carbon tape, coated with a 60/40 ratio of Au/Pd, and visualized at an accelerating voltage of 1.0 kV.

Experimental Design and Statistical Analysis

The factorial designs utilized within this study included full replications of all experiments. Each replicate data point was considered an individual experimental unit For each experimental unit, MS, starch digestibility (RDS, SDS, RS, and TS determinations), proximate composition (moisture, lipid, protein, carbohydrate, and ash contents) and thermal characteristics ($T_o$, $T_p$, $T_c$ and $\Delta R$) were analyzed in duplicate. Data were analyzed for statistical significance by Analysis of Variance (ANOVA) (<0.05), while differences among treatment mean values were identified using a least significant difference (LSD) test. Pearson's Correlation analysis was conducted to assess relationships between RS content and MS values. All statistical computations were conducted using SAS software (version 9.2, SAS Institute Inc., Cary, N.C.).

Results and Discussion

Reactivity of the Starch Fraction within Commercial Potato Granules

Figure 3:
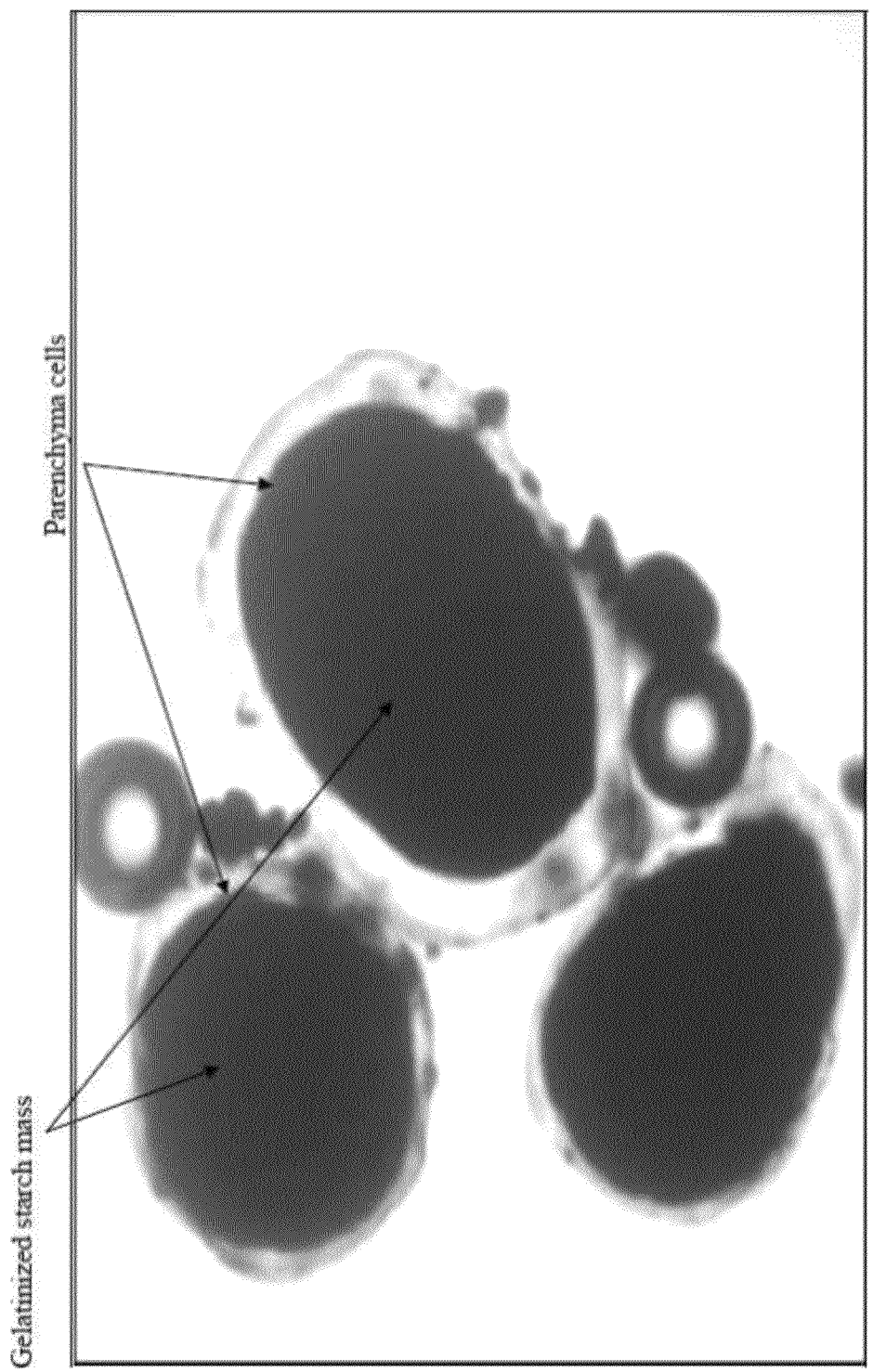
FIG. 3. Light micrograph of commercial potato granules consisting of intact potato parenchyma cells. Cell wall structures surround a mass of gelatinized starch (i.e., dark regions stained with iodine).

Potato granules are prepared commercially from precooked potatoes that have been subjected to mashing and drying processes to produce an instant mashed potato product in dehydrated form. Table 3 provides the chemical composition of commercial potato granules that were used as the starting material for this study. Commercial potato granules contained a considerable amount of carbohydrate (85.3%), predominantly in the form of starch (78.5%), but also possessed measurable amounts of other components (protein, lipid, ash). The difference between the carbohydrate and starch contents (6.8%) was most likely attributable to plant cell wall polysaccharides (cellulose, hemicellulose, pectin, etc.). Under the light microscope, commercial potato granules largely consisted of individual parenchyma cells, each exhibiting a reasonably intact primary cell wall encompassing a mass of gelatinized starch (dark regions stained by iodine solution) (FIG. 3). Based on microscopic observation, gelatinized starch within cells did not appear to retain any original granule structure or birefringence under plane polarized light (data not shown) and was, thus, anticipated to be readily available for modification by chemical agents.

TABLE 3

Mean[1,2] Chemical Composition of Commercial Potato Granules

| Material | Protein | Lipid | Carbohydrate[3] | Ash | Starch |
|---|---|---|---|---|---|
| Potato Granules | 8.8 ± 0.8 | 0.88 ± 0.02 | 85.3 ± 0.9 | 5.0 ± 0.5 | 78.5 ± 1.5 |

[1]Mean values ± standard deviations determined from duplicate measurements.
[2]g/100 g potato granules (dry weight basis).
[3]Determined by difference (potato granule dry weight minus protein, lipid, and ash).

Figure 4:
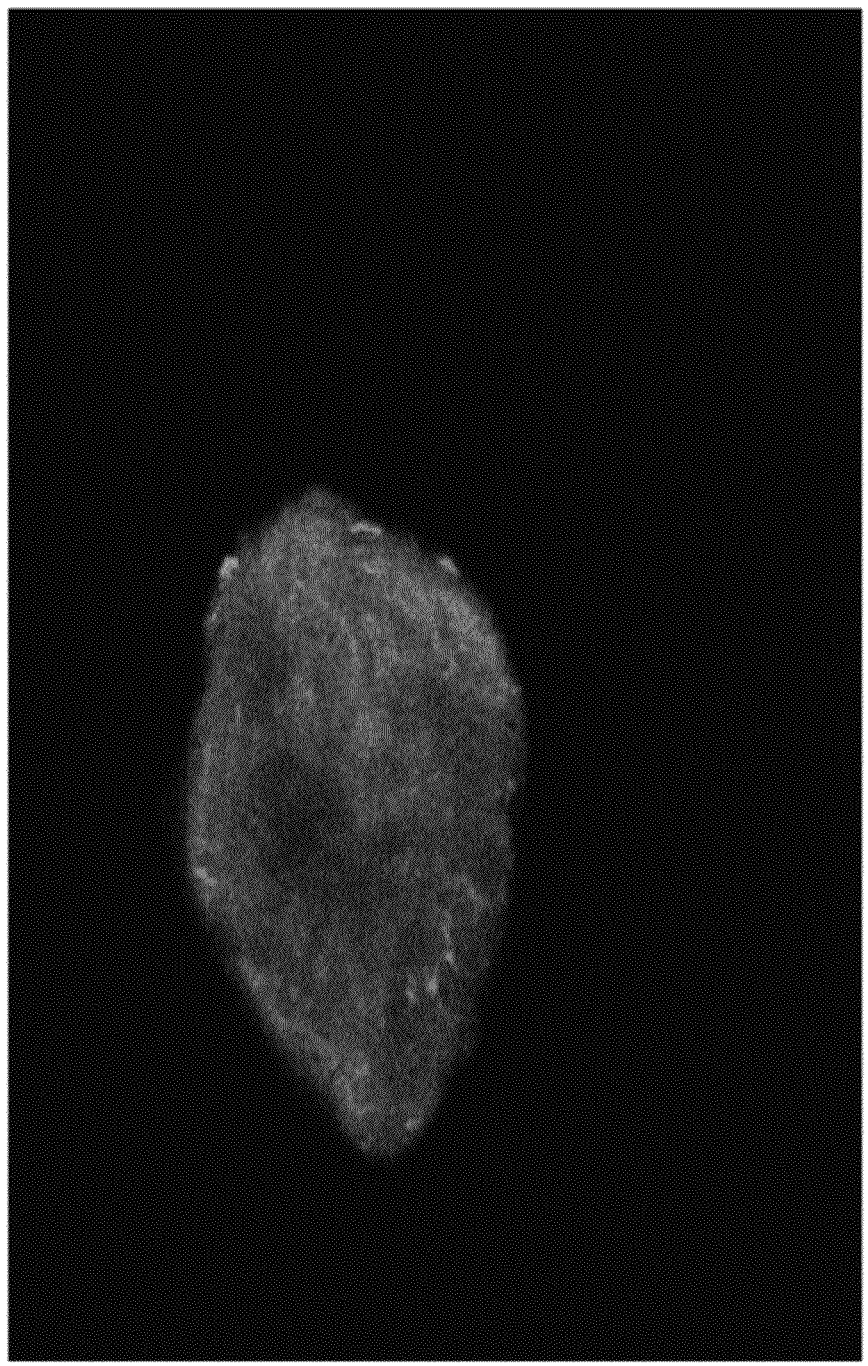
FIG. 4. Optical section of a commercial potato granule parenchyma cell after derivatization with a fluorescent probe (DTAF) as viewed by CLSM. The section, which depicts the approximate geometric center of the derivatized parenchyma cell, provides evidence for a reasonably homogeneous reaction pattern of gelatinized starch within the cell.

Derivatization of commercial potato granules with DTAF (fluorescent probe) within an alkaline (triethylamine) model system was conducted to gauge accessibility of starch molecules within parenchyma cells to reaction. After modification and removal of unreacted dye, optical sections of derivatized potato granules (at their approximate geometric centers) were visualized by CLSM. Parenchyma cell optical sections exhibited a uniform pattern of fluorescence (FIG. 4), implying successful penetration of parenchyma primary cell walls by reagent and a homogeneous reaction of starch within the cells. Control (unmodified) potato granules subjected to the same reaction conditions without addition of DTAF reagent did not exhibit any visible fluorescence (data not shown). The homogenous pattern of dye suggested that starch within parenchyma cells was uniformly reactive, and supported the fact that little if any native starch granule structure remained in commercial potato granules. Moreover, the even distribution of fluorescent dye provided convincing evidence that a similar reaction pattern could be achieved with traditional starch modification reagents. A homogeneous starch reaction pattern was desired, as it was hypothesized to provide the most effective impediment to hydrolysis of starch (to glucose) by amylolytic enzymes, by introducing bulky chemical groups evenly onto starch polymers to impart steric hindrance to enzyme action.

Validation of Resistant/Slowly Digestible Starch Determination Methods

Of the various in-vitro RS determination methods, the AOAC dietary fiber determination (Method 985.29; AOAC, 1997) and the Englyst et al. (1992) procedures have been widely acknowledged for their good repeatability and reliability. The Englyst et al. (1992) in vitro method has also been designed and validated to simulate the human digestive process using a combination of enzymes (invertase, pancreatic-amylase and amyloglucosidase). In this study, commercial potato granules ('as is' and hydrated/heated) and potato starch (native/raw and hydrated/heated) were evaluated according to the method of Englyst et al. (1992) to verify proper determination of resistant starch (RS), slowly digestible starch (SDS), and rapidly digestible starch (RDS) values (Table 4). Of all samples evaluated, native/raw potato starch possessed the highest proportion of RS (78.1 g/100 g dry matter or 78.1%), which was in good agreement with other in vitro-derived values reported by Gormley and Walshe (1999) (74.4%), Champ et al. (1999) (77.7%), and McCleary and Monaghan (2002) (77.0%). Our value also compared favorably to the in vivo RS value (78.8%) determined for raw potato starch by Champ et al. (2003). In contrast, hydrated/heated (gelatinized) potato starch exhibited only low levels of RS (1.8%), due to loss of the native starch granule structure upon heating. For commercial potato granules ('as is'), low levels of RS were observed (5.7%), though these initial values were reduced to negligible levels by simple heating (hydrated/heated, 0.3%). Overall, these results were reasonably consistent with those published by Susan and Englyst (1993), who reported a RS value of 1% for commercial instant potato granules ('as is') based on an in vitro method. The slight variance between reports might not only originate from differing experimental conditions, but also from varying processing conditions employed by potato granule manufacturers that could induce differing degrees of starch retrogradation within potato cells. In regard to SDS, native/raw potato starch exhibited a value of 16.6%, which was in very close approximation to that obtained by Englyst et al. (1992) (16.0%) using the same method applied in our study. In contrast, after heating, the SDS value for hydrated/heated potato starch decreased markedly (from 16.6% to 1.0%), while both 'as is' and hydrated/heated instant potato granules contained very similar, but relatively low, SDS levels (2.3% and 2.5% respectively), neither of which appeared to be influenced by heating/boiling.

TABLE 4

Mean Values[1,2] of Total Starch (TS), Rapidly Digestible Starch (RDS), Slowly Digestible Starch (SDS), and Resistant Starch (RS) for Commercial Potato Granules and Potato Starch

| Samples | TS | RDS | SDS | RS |
|---|---|---|---|---|
| Potato Granules ('as is') | 78.9$^a$ ± 3.5 | 70.9$^b$ ± 2.1 | 2.3$^a$ ± 0.8 | 5.7$^b$ ± 1.0 |
| Potato Granules (rehydrated/heated) | 78.8$^a$ ± 3.8 | 76.0$^c$ ± 1.9 | 2.5$^a$ ± 1.2 | 0.3$^a$ ± 0.4 |
| Potato Starch (raw/native) | 99.6$^b$ ± 2.8 | 4.9$^a$ ± 1.6 | 16.6$^b$ ± 2.8 | 78.1$^c$ ± 1.6 |
| Potato Starch (rehydrated/heated) | 101.5$^b$ ± 3.0 | 98.7$^d$ ± 0.2 | 1.0$^a$ ± 0.4 | 1.8$^a$ ± 0.5 |

[1]Mean values ± standard deviations determined from duplicate measurements. Values within a column sharing a common letter are not significantly different (p < 0.05).
[2]g/100 g dry matter (Englyst et al. 1992); RS = TS − (RDS + SDS).

The greatest reduction in both RS and SDS occurred with the initial heating/gelatinization of raw starch, coinciding with the destruction of the native starch granule structure (RS2). Commercial potato granules ('as is'), which have already been cooked/heated (above the starch gelatinization temperature) during industrial processing, possessed low RS levels that were easily reduced to negligible values upon heating at boiling temperature. Thus, low levels of RS present in commercial potato granules ('as is') were likely a result of amylopectin retrogradation incurred during industrial processing, which structures are known to be disrupted by boiling. SDS levels within commercial potato granules ('as is' and hydrated/heated) were relatively insignificant, and were not largely affected or reduced by heating at boiling temperature. The experimental RS/SDS values generated in this work appear to be relevant and valid in relation to values reported in the literature.

Effect of Substitution of Potato Granules on Starch MS, RS, and SDS Levels

Based on preliminary experiments, it was established that an aqueous alcohol reaction medium afforded conditions suitable for chemical modification (i.e., substitution) of commercial potato granules. Without inclusion of alcohol, the reaction slurry was subject to excessive swelling and water uptake (particularly at alkali levels needed to catalyze the reaction) due to the fact that starch within parenchyma cells had already been gelatinized during commercial processing. The excessive viscosity of the reaction medium made it extremely difficult to handle and stir, and necessitated excessive dilution with water that compromised reaction efficiency (reagent is also reactive to water hydroxyl groups). By incorporating isopropanol into the reaction medium, the swelling of gelatinized starch was minimized, and the potato granule slurry remained stirrable over the course of reaction.

Effect of Reaction Conditions on Starch Molar Substitution (MS) Levels

To investigate conditions needed to promote effective reaction of starch, a factorial experimental design was used to investigate the effects of reagent (propylene oxide) level and reaction temperature on both molar substitution (MS) and RS values of modified potato granules. Two reaction temperatures (22° C. and 48° C.) and four propylene oxide addition levels (Table 2) were incorporated into the design, which facilitated investigation of the relationship between MS and RS levels.

Figure 5:
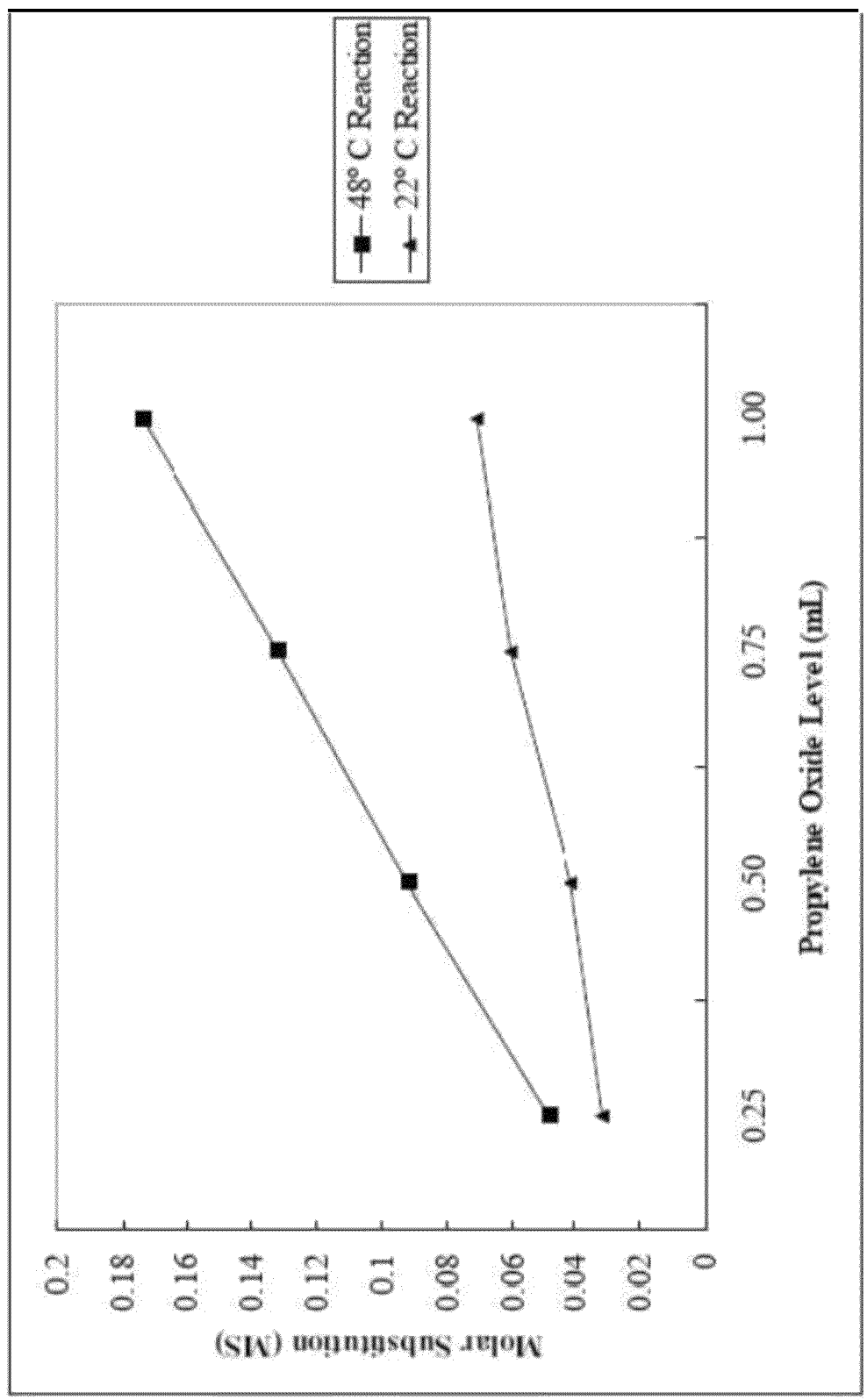
FIG. 5. Plot depicting the significant interaction between propylene oxide addition level and reaction temperature in relation to potato granule molar substitution (MS).

Table 5 depicts ANOVA results for the factorial experiment in regard to potato granule MS levels. Both propylene oxide level and reaction temperature main effects significantly influenced potato granule MS values ($p<0.05$). However, there was a significant two-way interaction between the two main effects. This interaction was plotted to aid interpretation of the data (FIG. 5). Overall, MS values increased in approximate linear fashion with an increasing reagent addition level for both reaction temperature conditions evaluated. The linear relationship between propylene addition levels and reaction MS observed here is in good agreement with previous reports for both gelatinized and granular starch reactions (Kishida et al., 2001; Shao, 2001; Han and BeMiller, 2005). Since it was demonstrated that reagent (i.e., fluorescent probe) was able to readily penetrate parenchyma cell walls and react rather homogeneously with starch within the cells, it makes sense that starch MS levels would be proportional to the amount of propylene oxide reagent added (assuming isothermal reaction conditions). However, the rate of MS increase as a function of increasing reagent level differed according to reaction temperature (48° C.>22° C.), with the greatest magnitude difference in MS observed at the highest level of reagent addition. Based on the noted interaction, experimental data were statistically reanalyzed (ANOVA) by reaction temperature (Table 6). Within each temperature condition, individual propylene oxide addition levels were clearly differentiated according to reaction MS levels. In comparing MS levels of the two reaction temperatures for like levels of reagent addition, a reaction temperature of 48° C. generally produced MS levels that were 1.5-2.4 fold higher than those achieved at 22° C. While MS levels within a given reaction temperature condition appeared to be proportional to the amount of propylene oxide added, reaction temperature itself represented a critical means of enhancing MS levels within modified potato granules. Previous investigations have also observed temperature to enhance substitution reactions for both gelatinized and granular starch substrates (Shao, 2001; Han and BeMiller, 2005). The observed effect of temperature on MS levels might be explained by several different scenarios, each of which is discussed below.

TABLE 5

Two-way Analysis of Variance (ANOVA) and Level of Significance for the Effects Propylene Oxide Addition Level and Reaction Temperature on Modified Potato Granule Molar Substitution (MS) Levels

| Source | df | Sum of Squares | Mean Square | F-Value | Significance Level |
| --- | --- | --- | --- | --- | --- |
| Propylene Oxide Addition Level (PO)[1] | 3 | 0.015 | 0.005 | 5806.3 | <0.0001 |
| Reaction Temperature (Temp.)[2] | 1 | 0.015 | 0.015 | 16594.6 | <0.0001 |
| PO × Temp. | 3 | 0.004 | 0.001 | 1472.9 | <0.0001 |

[1]Reagent addition levels for potato granule reactions (PO-1, PO-2, PO-3, PO-4) were 4.6%, 9.1%, 12.8%, and 18.3% (w/w) propylene oxide, respectively, based on potato granule dry weight.
[2]Reaction temperatures evaluated: 22° C. and 48° C.

TABLE 6

Mean[1] Molar Substitution (MS) Values for Hydroxypropylated Potato Granules according to Reagent Addition Level and Reaction Temperature

| Reagent Addition Level[2] | Molar Substitution (MS) Level[3] | |
| --- | --- | --- |
|  | 22° C. Reaction | 48° C. Reaction |
| PO-1 | 0.031 $^a$ ± 0.0007 | 0.049 $^a$ ± 0.0007 |
| PO-2 | 0.042 $^b$ ± 0.0007 | 0.092 $^b$ ± 0.0014 |
| PO-3 | 0.061 $^c$ ± 0.0007 | 0.132 $^c$ ± 0.0007 |
| PO-4 | 0.071 $^d$ ± 0.0014 | 0.174 $^d$ ± 0.0007 |

[1]Mean values ± standard deviations determined from two replicate experiments. Values within a column sharing a common letter are not significantly different ($p < 0.05$).
[2]Reagent addition levels for potato granule reactions (PO-1, PO-2, PO-3, PO-4) were 4.6%, 9.1%, 12.8%, and 18.3% (w/w) propylene oxide, respectively, based on potato granule dry weight.
[3]MS values for reaction control samples were non-detectable.

First, an elevated reaction temperature might induce a higher degree of starch swelling, making starch molecules within the gelatinized starch mass more accessible to reagent. A similar hypothesis has been suggested for granular starch (Donovan, 1979; Gray and BeMiller, 2005). In our reaction system, starch within potato parenchyma cells had already been gelatinized during industrial processing, and was prone to excessive swelling in water, even at room temperature. Isopropanol was incorporated into the reaction system to minimize starch swelling and control the viscosity of the reaction medium. Elevated temperature reaction conditions (i.e., 48° C.) likely enhanced starch swelling in a slight, but significant, manner, while the isopropanol kept the reaction slurry stirrable. Beyond swelling, an elevated reaction temperature might have been sufficient to destabilize (melt) crystallites associated with starch retrogradation within commercial potato granules. It would be anticipated that some degree of crystalline structure would exist in commercial potato granules due to the heating-cooling cycles utilized during industrial processing. This hypothesis was supported by DSC analysis, which detected a small starch retrogradation peak ($\Delta H=0.6$ J/g) with a melting range of 53° C.-71° C. in commercial potato granules (Table 22). Though the melting range of the starch retrogradation peak occurred above the highest reaction temperature (48° C.) of the study, it is probable that the alkaline conditions of the reaction system and progressive substitution with propylene oxide contributed a destabilizing effect that allowed disruption of retrograded starch within potato granules to occur at a relatively reduced temperature. High pH conditions (electrostatic repulsion) and substitution reactions (Gray and BeMiller, 2005) have been shown to exhibit a destabilizing effect on starch structure. In support of this possibility, potato granules after modification no longer exhibited a discernable peak indicative of starch retrogradation (Table 22). Thus, it is possible that starch swelling and/or melting of retrograded starch induced by the higher reaction temperature (48° C.) resulted in relatively higher starch MS levels by increasing the accessibility of starch to reaction.

TABLE 22

Endothermic Transitions within Hydrated Commercial (unmodified) and Hydroxypropylated Potato Granules following Extended Storage at 4° C., denoting Relative Extents of Starch Retrogradation

| Sample | Storage (Days) | $T_o$ (° C.)[1] | $T_p$ (° C.)[1] | $T_c$ (° C.)[1] | $\Delta H$ (J/g)[2] |
|---|---|---|---|---|---|
| Commercial | 0 | 53.4$^a$ ± 0.8 | 63.8$^a$ ± 1.4 | 71.4$^a$ ± 1.6 | 0.6$^a$ ± 0.0 |
| | 7 | 55.7$^a$ ± 1.1 | 66.9$^b$ ± 1.7 | 77.0$^b$ ± 2.1 | 1.0$^b$ ± 0.1 |
| | 14 | 53.3$^a$ ± 2.3 | 66.1$^{ab}$ ± 1.4 | 78.2$^b$ ± 1.2 | 2.1$^c$ ± 0.1 |
| | 21 | 54.0$^a$ ± 1.2 | 64.9$^{ab}$ ± 0.5 | 77.8$^b$ ± 2.3 | 2.7$^d$ ± 0.2 |
| PO-1[3] | 0 | | No peak | | |
| | 7 | | No peak | | |
| | 14 | | No peak | | |
| | 21 | | No peak | | |

[1]$T_o$, $T_p$, and $T_c$ denote the onset, peak, and conclusion transition temperatures, respectively.
[2]$\Delta H$ = transition enthalpy.
[3]Reagent addition level (PO-1) for modified potato granule sample was 10.0% (w/w) propylene oxide, based on potato granule dry weight.

Secondly, the temperature effect could be related to a Donnan potential phenomenon. Oosten (1982) suggested that the entrance of hydroxide anions into starch granules is diminished by Donnan effects. The basis for development of a Donnan potential has to do with the possible existence of differing internal and external pH environments of parenchyma cells. Water inside cells is in equilibrium with starch hydroxyl groups (pK=12.5), while the water phase outside the cells (free water) exhibits a standard pK of 14. The net effect would be a pH differential between the environment inside parenchyma cells and the surrounding extracellular environment, with a relatively lower pH (greater concentration of hydrogen ions) present within parenchyma cells. In order to reach equilibrium (between intracellular and extracellular environments), there would need to be a flow of hydrogen ions from within cells to the external environment (and a concurrent flow of $Na^+$ cations into cells to form starch salts), resulting in a relatively greater negative charge associated with intracellular regions compared to the external environment (salt form inside cells is comparatively more readily dissociated than the H-form outside of cells). The existence of a Donnan potential (greater negative charge associated with parenchyma cells) would create a potential charge barrier for hydroxide anions to enter parenchyma cells and catalyze starch reactions. However, an increased temperature diminishes the Donnan potential effect, and would be expected to overcome potential repulsive charges within parenchyma cells to allow more hydroxide ions internal access to catalyze starch reactions. This phenomenon could also explain in part the differential reactivity observed for the two reaction temperatures of the study.

Lastly, Lammers et al. (1993) investigated the kinetics for hydroxypropylation of starch catalyzed by sodium hydroxide, and proposed the following equation to describe the effect of temperature on the pK of starch hydroxyl groups: pK=2174(1/T)+6.06 (T in degrees K). Based on this equation, an elevated temperature would tend to decrease the pK of starch hydroxyl groups, producing a greater proportion of deprotonated starch alkoxide ions for reaction with propylene oxide reagent. This theory would support the observed reaction temperature effect.

In summary, both increased temperature and reagent addition levels substantially increased potato granule MS values, though the two effects were not shown to act independently. An increased reaction temperature led to higher rates and extents of reaction, while increased reagent addition levels led to linear increases in starch MS values for a given reaction temperature condition. The temperature effect was potentially explained by a combination of phenomena (increased starch swelling/melting of retrograded starch, diminished Donnan effects, enhanced dissociation of starch hydroxyl groups, etc.). However, it is important to note that additional increases in reaction temperature (above 48° C.) did not necessarily translate into further increases in starch MS levels. A reaction temperature of 70° C. actually exhibited an adverse effect on starch MS values, and appeared to have a negative impact on other quality characteristics, including product color. Potential factors contributing to this phenomenon could include an increased volatility of propylene oxide and/or a dramatically increased viscosity of the reaction medium due to excessive starch swelling at higher reaction temperatures. In contrasting reaction temperatures of 44° C. and 54° C. for granular starch reactions, Han and BeMiller (2005) did not observe any beneficial effect of temperature on starch MS levels above this specific temperature range. Thus, there are both physicochemical and practical limits for enhancing potato granule reactivity through increasing reaction temperature.

Effect of Reaction Conditions on Resistant and Slowly Digestible Starch Levels

The same modified potato granule materials described in the previous section were further subjected to analysis by ANOVA to investigate the effect of reaction conditions on RS and SDS levels. Table 7 depicts the ANOVA results for the significance of temperature and reagent addition level on RS values. Similar to what was observed for MS results in the previous section, both reaction temperature and reagent level main effects significantly impacted RS values. However, no significant interaction was noted between the two main effects (Table 7 and FIG. 6), which result differed from that noted for the main effects in relation to MS values. The lack of an interaction could be due in part to the fact that there was a higher degree of experimental error associated with RS determinations compared to MS determinations. Despite the lack of significant interaction, the effect of reagent addition level on RS values was analyzed for each reaction temperature (Table 8) to coincide with the data previously presented for MS levels (Table 6). For each reaction temperature, there was generally a stepwise increase in RS values with an increasing level of reagent addition, though statistical differences in RS values were not always distinguishable for all reagent addition levels. Similar to observations for MS levels, reaction temperature had a dramatic influence on potato granule RS levels, with the material reacted at 48° C. exhibiting at least a 2-fold higher RS content than that reacted at 22° C. for like levels of reagent addition. The highest RS value in the experiment (40.1%) was achieved by reacting potato granules with the highest level of reagent (18.3% based on potato granule weight) at the highest temperature (48° C.). Relationships between potato granule MS and RS levels will be explored in greater detail in the next section.

TABLE 7

Two-way Analysis of Variance (ANOVA) and Level of Significance for the Effects Propylene Oxide Addition Level and Reaction Temperature on Modified Potato Granule Resistant Starch (RS) Levels

| Source | df | Sum of Squares | Mean Square | F-Value | Significance Level |
|---|---|---|---|---|---|
| Propylene Oxide Addition Level (PO)[1] | 3 | 734.3 | 244.8 | 21.1 | 0.0004 |

TABLE 7-continued

Two-way Analysis of Variance (ANOVA) and Level of
Significance for the Effects Propylene Oxide Addition
Level and Reaction Temperature on Modified Potato
Granule Resistant Starch (RS) Levels

| Source | df | Sum of Squares | Mean Square | F-Value | Significance Level |
|---|---|---|---|---|---|
| Reaction Temperature (Temp.)[2] | 1 | 1162.8 | 1162.8 | 100.2 | <0.0001 |
| PO × Temp. | 3 | 38.5 | 12.8 | 1.1 | 0.4014 |

[1]Reagent addition levels for potato granule reactions (PO-1, PO-2, PO-3, PO-4) were 4.6%, 9.1%, 12.8%, and 18.3% (w/w) propylene oxide, respectively, based on potato granule dry weight.
[2]Reaction temperatures evaluated: 22° C. and 48° C.

TABLE 8

Mean[1] Resistant Starch (RS) Values for Hydroxypropylated
Potato Granules according to Reagent Addition
Level and Reaction Temperature

| Reagent Addition Level[2] | Resistant Starch (RS) Level[3] | |
|---|---|---|
| | 22° C. Reaction | 48° C. Reaction |
| PO-1 | $6.0^{a} \pm 2.62$ | $18.7^{a} \pm 2.26$ |
| PO-2 | $14.6^{ab} \pm 1.34$ | $30.1^{b} \pm 3.25$ |
| PO-3 | $18.2^{b} \pm 3.3$ | $37.5^{bc} \pm 3.32$ |
| PO-4 | $19.5^{b} \pm 5.5$ | $40.1^{c} \pm 3.95$ |

[1]Mean values ± standard deviations determined from two replicate experiments. Values within a column sharing a common letter are not significantly different ($p < 0.05$).
[2]Reagent addition levels for potato granule reactions (PO-1, PO-2, PO-3, PO-4) were 4.6%, 9.1%, 12.8%, and 18.3% (w/w) propylene oxide, respectively, based on potato granule dry weight.
[3]RS was not detected in reaction control samples.

In contrast, no significant reaction temperature or reagent level main effects were observed for potato granule SDS levels (Table 9). Only low levels of SDS (<8.3%) were detected regardless of the reaction conditions employed (Table 10), and no logical trend in SDS levels amongst reagent addition levels (for a specific reaction temperature condition) was observed. There was a high degree of variation associated with SDS determinations within modified potato granules. In comparison, observed SDS levels for granular starch after chemical modification have not been shown to exceed 9.0% in most studies (Wolf et al., 1999; Woo and Seib, 2002) with the exception of the report of Han and BeMiller (2007) (21% to 35% for potato and corn starches, respectively), in which SDS was detected by measurement of the glucose released from the test food as described by Englyst et al. (1999).

TABLE 9

Two-way Analysis of Variance (ANOVA) and Level of
Significance for the Effects of Propylene Oxide Addition
Level and Reaction Temperature on Modified Potato
Granule Slowly Digestible Starch (SDS) Levels

| Source | df | Sum of Squares | Mean Square | F | Significance Level |
|---|---|---|---|---|---|
| Propylene Oxide Addition Level (PO)[1] | 3 | 41.7 | 13.9 | 3.9 | 0.053 |
| Reaction Temperature (Temp.)[2] | 1 | 12.6 | 12.6 | 3.6 | 0.095 |
| PO × Temp. | 3 | 11.1 | 3.7 | 1.1 | 0.420 |

[1]Reagent addition levels for potato granule reactions (PO-1, PO-2, PO-3, PO-4) were 4.6%, 9.1%, 12.8%, and 18.3% (w/w) propylene oxide, respectively, based on potato granule dry weight.
[2]Reaction temperatures evaluated: 22° C. and 48° C.

TABLE 10

Mean[1] Slowly Digestible Starch (SDS) Values for
Hydroxypropylated Potato Granules according to
Reagent Addition Level and Reaction Temperature

| Reagent Addition Level[2] | Slowly Digestible Starch (SDS) | |
|---|---|---|
| | 22° C. Reaction | 48° C. Reaction |
| PO-1 | $8.3^{a} \pm 3.1$ | $4.3^{b} \pm 0.1$ |
| PO-2 | $2.8^{a} \pm 2.6$ | $1.2^{a} \pm 0.5$ |
| PO-3 | $4.2^{a} \pm 0.5$ | $4.8^{b} \pm 0.6$ |
| PO-4 | $4.1^{a} \pm 3.3$ | $2.0^{a} \pm 0.4$ |

[1]Mean values ± standard deviations determined from two replicate experiments. Values within a column sharing a common letter are not significantly different ($p < 0.05$).
[2]Reagent addition levels for potato granule reactions (PO-1, PO-2, PO-3, PO-4) were 4.6%, 9.1%, 12.8%, and 18.3% (w/w) propylene oxide, respectively, based on potato granule dry weight.

In summary, the formation of RS was successfully achieved by introduction of chemical substituent groups onto starch chains, while chemical modification seemed to have little effect on the rate of digestion (low SDS levels). Based on the low levels of SDS observed and the lack of reliability for SDS determinations, further discussion of SDS levels in these experiments is of little, if any, additional value. Remaining discussion will be focused strictly on RS effects.

Relationship Between Molar Substitution and Resistant Starch Levels

Correlation analysis was employed to further investigate the relationship between potato granule starch MS and RS values. A strong positive correlation between MS and RS ($r=0.93$) levels was observed. Overall, this finding is in agreement with the conclusions of Leegwater and Lutin (1971), based on in vivo digestibility of hydroxypropylated starch, and Kishida (2001), who reported similar findings while investigating the digestibility of dual modified (hydroxypropylated/cross-linked) tapioca starch in rat diets.

The high correlation between RS and MS can be explained by the introduction of bulky hydroxypropyl groups onto starch molecules at the O-2, O-3 or O-6 positions of the starch anhydroglucose unit (AGU). Although there is no doubt that hydroxypropylation increases steric hindrance, the specific position of substitution on the starch AGU remains a subject of debate (Richardson et al., 2000). Most studies have suggested that the hydroxypropyl substituent is most likely to be introduced at the O-2 position of the starch AGU (Xu and Seib, 1996; Merkus et al., 1977; Richardson et al., 2000). The presence of substituent groups along starch chains increases steric hindrance and decreases starch susceptibility to enzymatic hydrolysis.

Figure 6:
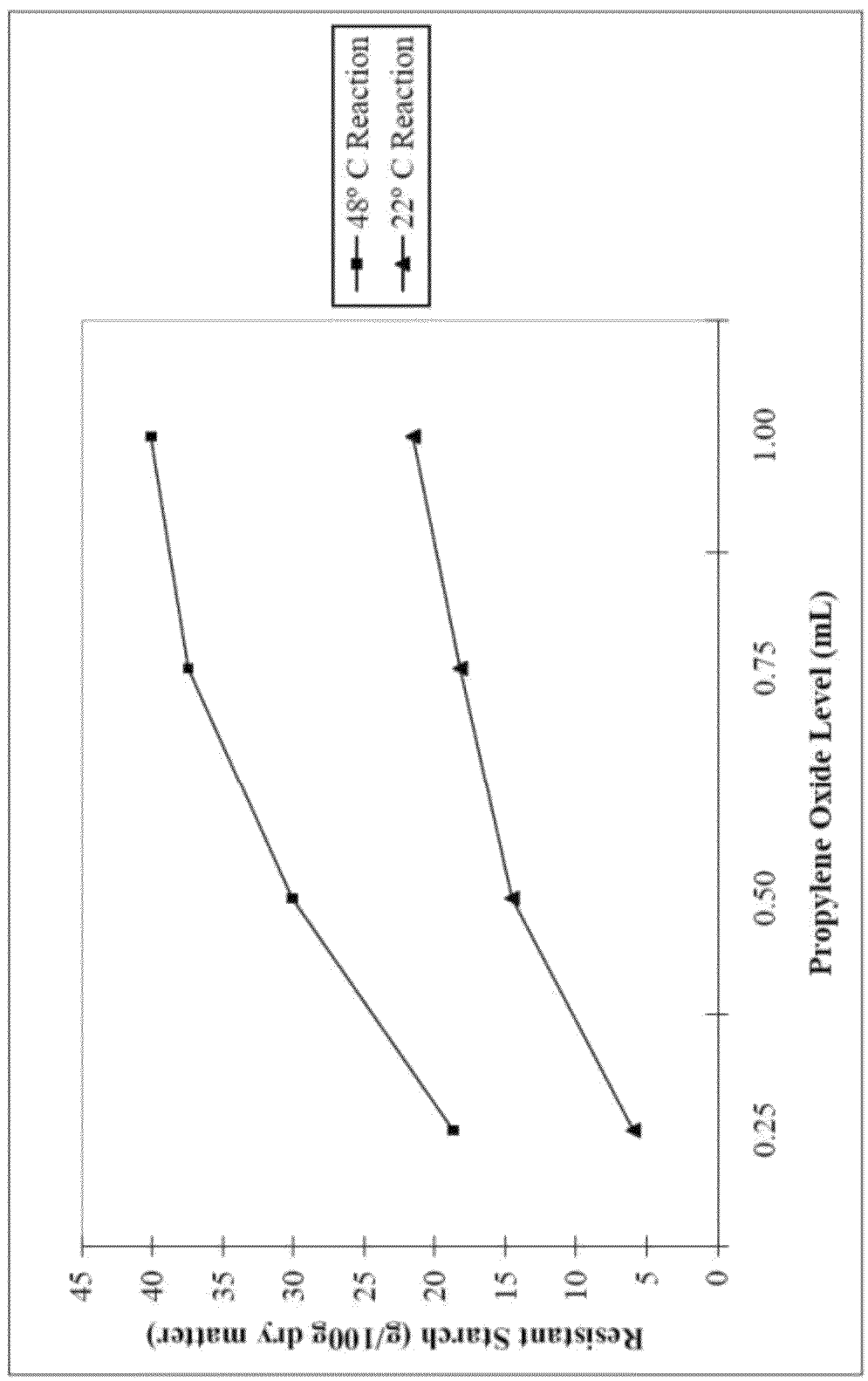
FIG. 6. Plot depicting the lack of interaction between propylene oxide addition level and reaction temperature in relation to potato granule resistant starch (RS) levels.
Figure 7:
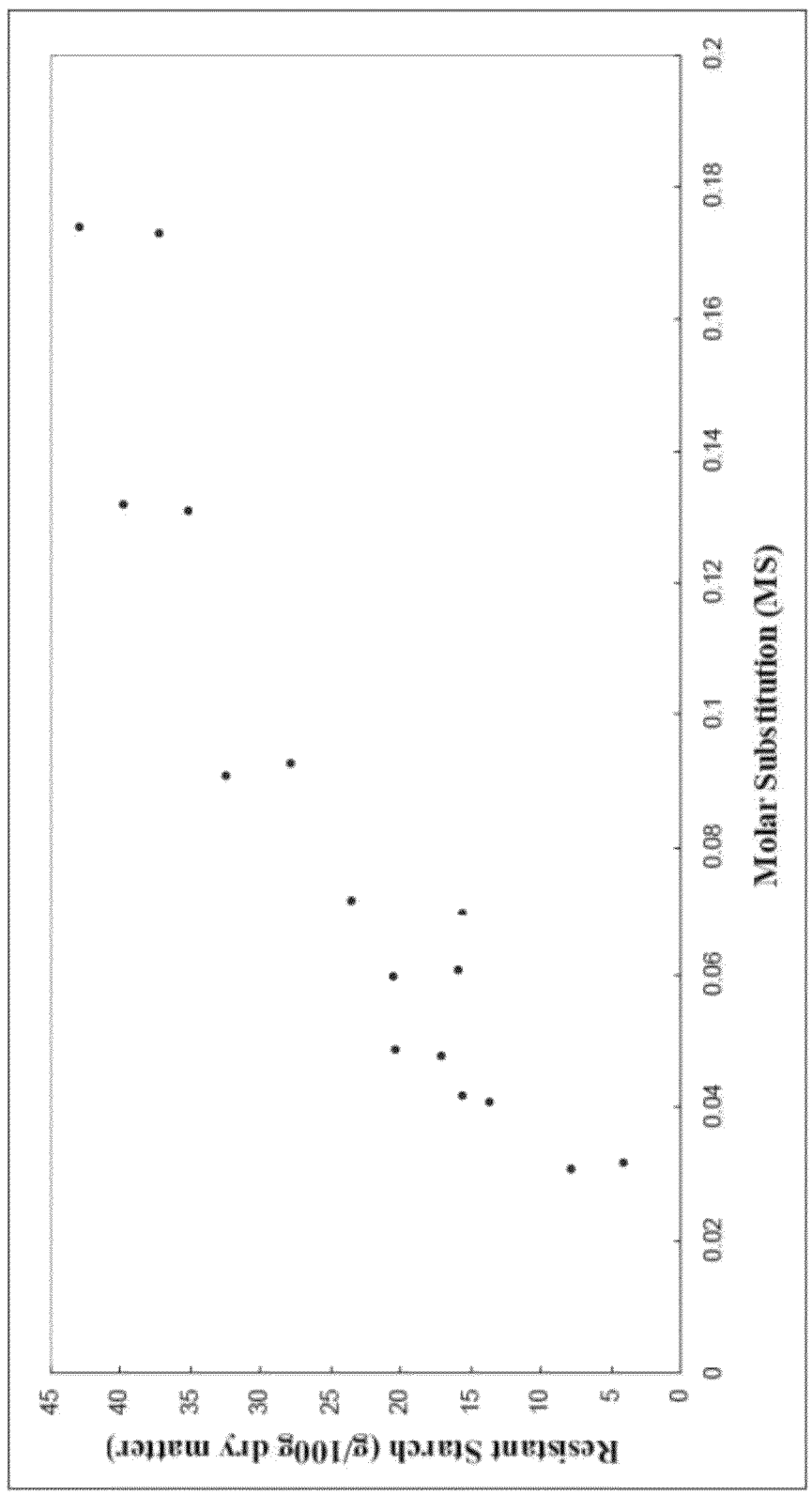
FIG. 7. Plot depicting the relationship between molar substitution (MS) and resistant starch (RS) content for hydroxypropylated potato granules across all reaction temperatures (r=0.93; n=16).

Based on digestion with pancreatin, Leegwater (1972) provided a statistical model to define the exponential decrease in reducing power for hydroxypropyl starch with increasing levels of MS. It was explained that for a random distribution of hydroxypropyl groups on starch molecules, reducing power was directly proportional to starch MS. The approximate linear relationship between MS and RS values for low levels of MS within this study imply a random distribution of substituent groups on starch chains (FIG. 7). However, there appeared to be a slight loss of linearity at the highest MS/RS levels (FIG. 6). This observation is likely explained by a less random distribution of substituent groups on starch chains at higher levels of substitution. The hydroxypropyl group itself possesses a hydroxyl group that is capable of further reaction with propylene oxide to form oligomeric and/or polymeric chains of substituents. Polysubstitution at multiple positions of the same starch AGU could have occurred (especially at high reagent addition levels), contributing to higher starch MS levels, while offering minimal further contribution to RS levels (multiple modification at a single site would be unlikely to impart further resistance to starch hydrolysis). Another potential explanation could be that potato granule MS levels in this study did not differentiate between substitution of starch and cell wall polysaccharides. It is possible that a higher proportion of cell wall polysaccharide molecules (as opposed to starch) were substituted at high MS levels, which reaction shift would not be expected to contribute to RS levels. While this latter possibility offers a hypothetical explanation for the lack of correlation between MS and RS levels at the highest levels of reagent addition of the study, there is no direct evidence provided here that this was actually the case.

For hydroxypropylated wheat starch (MS 0.04), Leegwater and Luten (1971) reported a slightly higher RS content (20%) compared to that (14.6%, Table 8) observed for a similar MS level (0.042, Table 6) in our study. However, there was little difference in the RS contents reported in our study (MS~0.049, Table 6; RS~18.7%, Table 8) and that of Kishida (2001) (gelatinized hydroxypropylated tapioca starch), both of which obtained approximately 20% of RS with an MS level of approximately 0.05. The slight variation between our findings and those of other studies is likely due to substrate differences (potato granules as compared to wheat and corn starches) and the use of varied methods for determining starch digestibility. However, together, these results indicate that chemical modification of starch with propylene oxide does decrease starch digestibility and generate significant levels of RS. The highest RS level of 40.1% (Table 8) in our study was achieved with a starch MS of 0.17 (Table 6) (6.04% hydroxypropyl group content, w/w) for potato granules, which is less than the maximum allowable amount for hydroxypropylated products defined by WHO (1972) (less than a 7% hydroxypropyl group content in starch, w/w).

Effect of Dual Modification on Starch MS and RS Levels

In the previous sections, it was demonstrated that both reaction temperature and propylene oxide addition level had significant impacts on potato granule RS values, though they had little influence in promoting SDS values. In other reports, the cross-linking reagent, sodium trimetaphosphate (STMP), has been used to generate RS/SDS in reactions with granular starch (Woo and Seib, 1997; Haynes et al., 2000). A second factorial experiment was conducted to investigate the combined effects of hydroxypropylation and cross-linking reactions on potato granule RS content. Three levels of reaction temperature (22° C., 34° C. and 48° C.), three propylene oxide addition levels (0%, 10% and 20% [w/w], based on potato granule dry weight), and four STMP addition levels (0%, 1%, 2% and 4% [w/w], based on potato granule dry weight) were included in this investigation. For preparation of dual-modified potato granule derivatives, substitution with propylene oxide was always performed first, followed by cross-linking (such is the case in industrial settings).

Effect of Reaction Conditions on Starch Molar Substitution (MS) Levels

Figure 8:
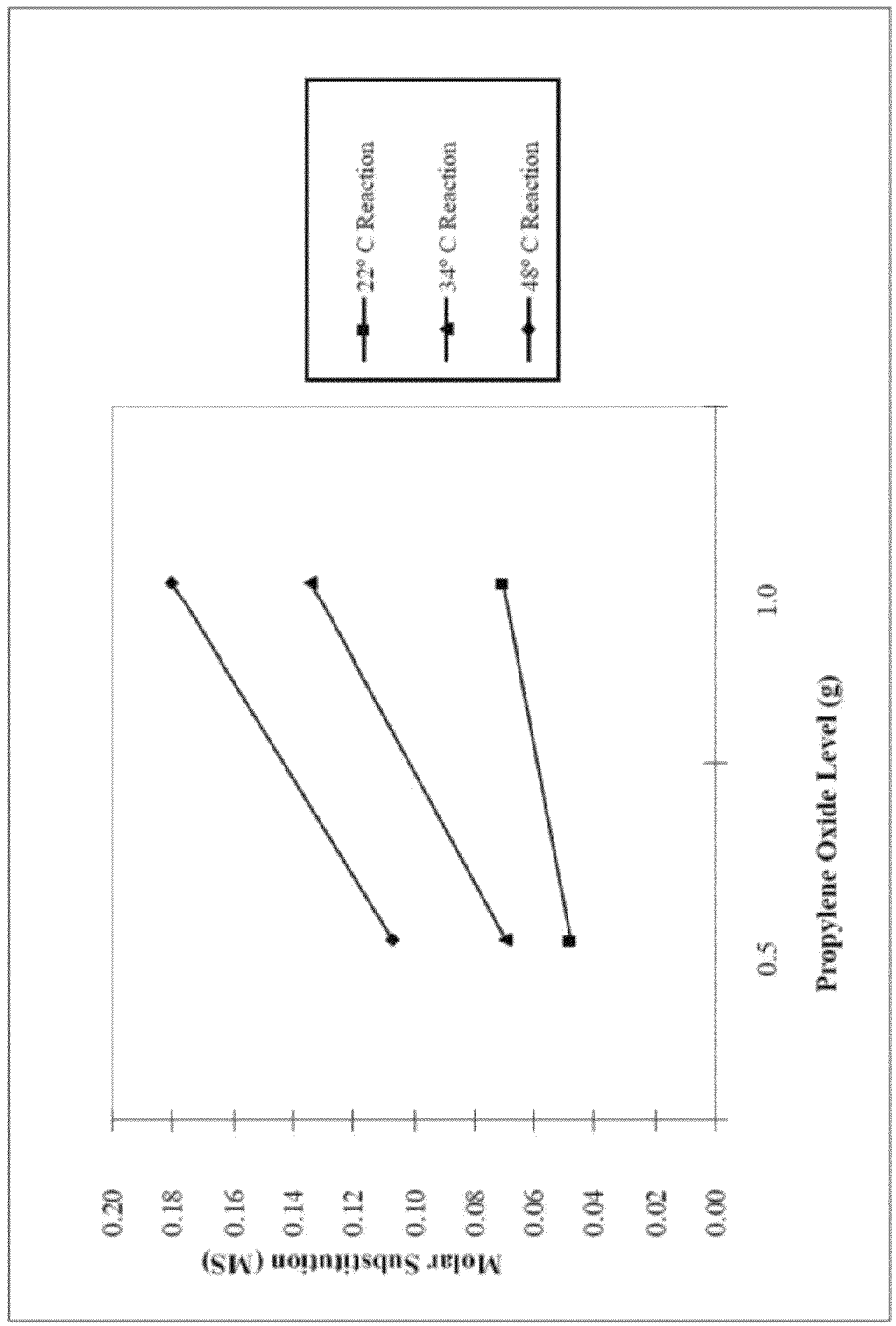
FIG. 8. Plot depicting the significant interaction between propylene oxide addition level and reaction temperature in relation to potato granule molar substitution (MS).

Table 11 provides a summary of MS (hydroxypropylation) and DS (cross-linking) values for all reagent combinations and reaction temperatures of the study. Due to the fact that cross-linking confounded determination of hydroxypropylation MS values, only hydroxypropylation MS values for potato granules derivatives that received no cross-linking reagent could be measured. Thus, in Table 11, hydroxypropylation MS values for dual-modified potato granules are noted as "not determined" (ND). However, it is anticipated that hydroxypropylation MS values of dual-modified potato granules were very similar, if not virtually identical (though not directly determined), to those determined for their respective non-cross-linked potato granule derivatives, based on the demonstrated repeatability of propylene oxide reactions. Because of this limitation, it was not possible to conduct a comprehensive statistical analysis to simultaneously evaluate all main effects and their interactions in regard to potato granule MS and DS values. Thus, a limited statistical analysis was first conducted for non-cross-linked, hydroxypropylated potato granules of this experiment to facilitate comparison with data obtained in the initial hydroxypropylation experiment (Tables 5 and 6). Table 12 depicts ANOVA results for two propylene oxide addition levels (excluding controls that received no PO reagent) and three reaction temperatures in relation to hydroxypropylation MS levels. Similar to what was found in the earlier experiment (Table 5), both PO level and temperature main effects, as well as their interaction, significantly influenced potato granule MS values ($p<0.05$) (Table 12). MS values for the initial and current experiments (Table 6 and 13, respectively) were comparable and consistent for similar combinations of reagent addition level and reaction temperature (for reaction temperatures of 22 and 48° C., PO-2 addition levels in Table 6 are comparable to PO-1 addition levels in Table 13, while PO-4 addition levels in Table 6 are comparable to PO-2 levels in Table 13). This observation provided further evidence for the repeatability of the PO reaction for modification of potato granules. The noted interaction between PO level and temperature (FIG. 8) was already discussed in detail for the initial experiment, and will not be further addressed here.

TABLE 11

Summary of Dual-Modified Potato Granule Hydroxypropyl Molar Substitution (MS) and Cross-linking Degree of Substitution (DS) Levels in regard to Propylene Oxide[1]/Sodium Trimetaphosphate[2] Addition Levels and Reaction Temperature[3]

| Treatment Combination | Molar Substitution (MS)[4]/Degree of Substitution (DS)[5] Values by Reaction Temperature | | |
|---|---|---|---|
| | 22° C. | 34° C. | 48° C. |
| PO-0/STMP-0 | 0.000/0.000 | 0.000/0.000 | 0.000/0.000 |
| PO-0/STMP-1 | ND[6]/0.002 ± 0.001 | ND[6]/0.003 ± 0.001 | ND[6]/0.002 ± 0.003 |
| PO-0/STMP-2 | ND[6]/0.004 ± 0.003 | ND[6]/0.004 ± 0.001 | ND[6]/0.004 ± 0.001 |
| PO-0/STMP-3 | ND[6]/0.052 ± 0.001 | ND[6]/0.048 ± 0.007 | ND[6]/0.052 ± 0.004 |
| PO-1/STMP-0 | 0.047 ± 0.001/0.000 | 0.069 ± 0.0007/0.000 | 0.105 ± 0.0035/0.000 |
| PO-1/STMP-1 | ND[6]/0.011 ± 0.002 | ND[6]/0.003 ± 0.004 | ND[6]/0.010 ± 0.001 |
| PO-1/STMP-2 | ND[6]/0.016 ± 0.004 | ND[6]/0.004 ± 0.003 | ND[6]/0.016 ± 0.002 |
| PO-1/STMP-3 | ND[6]/0.039 ± 0.007 | ND[6]/0.048 ± 0.004 | ND[6]/0.043 ± 0.003 |
| PO-2/STMP-0 | 0.069 ± 0.0014/0.000 | 0.133 ± 0.0021/0.000 | 0.179 ± 0.0014/0.000 |
| PO-2/STMP-1 | ND[6]/0.006 ± 0.001 | ND[6]/0.007 ± 0.003 | ND[6]/0.006 ± 0.007 |

TABLE 11-continued

Summary of Dual-Modified Potato Granule Hydroxypropyl Molar Substitution (MS) and Cross-linking Degree of Substitution (DS) Levels in regard to Propylene Oxide[1]/Sodium Trimetaphosphate[2] Addition Levels and Reaction Temperature[3]

| Treatment Combination | Molar Substitution (MS)[4]/Degree of Substitution (DS)[5] Values by Reaction Temperature | | |
|---|---|---|---|
| | 22° C. | 34° C. | 48° C. |
| PO-2/STMP-2 | ND[6]/0.008 ± 0.003 | ND[6]/0.008 ± 0.004 | ND[6]/0.012 ± 0.001 |
| PO-2/STMP-3 | ND[6]/0.041 ± 0.004 | ND[6]/0.045 ± 0.007 | ND[6]/0.049 ± 0.003 |

[1]Reagent addition levels for potato granule reactions (PO-0, PO-1, PO-2) were 0.0%, 10.0%, and 20.0% (w/w) propylene oxide, respectively, based on potato granule dry weight.
[2]Reagent addition levels for potato granule reactions (STMP-0, STMP-1, STMP-2, STMP-3) were 0.0%, 1.0%, 2.0% and 4.0% (w/w) sodium trimetaphosphate, respectively, based on potato granule dry weight.
[3]Reaction temperatures evaluated: 22° C., 34° C. and 48° C.
[4]Molar substitution (MS) values indicate the level of hydroxypropylation.
[5]Degree of substitution (DS) values indicate the level of STMP cross-linking.
[6]Due to the fact that cross-linking confounded determination of hydroxypropylation MS values, only hydroxypropylation MS values for potato granules derivatives that received no cross-linking reagent could be measured. MS values for dual-modified potato granules are noted as "not determined" (ND).

TABLE 12

Two-way Analysis of Variance (ANOVA) and Level of Significance for the Effects Propylene Oxide Addition Level and Reaction Temperature on Modified Potato Granule Molar Substitution (MS) Levels

| Source | df | Sum of Squares | Mean Square | F-Value | Significance Level |
|---|---|---|---|---|---|
| Reaction Temperature (Temp.)[1] | 2 | 0.014 | 0.007 | 1970.659 | <0.0001 |
| Propylene Oxide Addition Level (PO)[2] | 1 | 0.009 | 0.009 | 2327.273 | <0.0001 |
| PO × Temp. | 2 | 0.001 | 0.001 | 198.295 | <0.0001 |

[1]Reaction temperatures evaluated: 22° C., 34° C. and 43° C.
[2]Reagent addition levels for potato granule reactions (PO-1, PO-2) were 10% and 20% (w/w) propylene oxide, respectively, based on potato granule dry weight.

TABLE 13

Mean[1] Molar Substitution (MS) Values for Hydroxypropylated Potato Granules according to Reagent Addition Level and Reaction Temperature

| Reagent Addition Level[2] | Molar Substitution (MS) Level | | | |
|---|---|---|---|---|
| | 22° C. Reaction | 34° C. Reaction | 48° C. Reaction | Mean Values |
| PO-1 | 0.047 $^a$ ± 0.001 | 0.069 $^a$ ± 0.001 | 0.105 $^a$ ± 0.001 | 0.074 |
| PO-2 | 0.069 $^b$ ± 0.001 | 0.133 $^b$ ± 0.002 | 0.179 $^b$ ± 0.001 | 0.127 |
| Mean Values | 0.058 | 0.101 | 0.142 | 0.101 |

[1]Mean values ± standard deviations determined from two replicate experiments. Values within a column sharing a common letter are not significantly different (p < 0.05).
[2]Reagent addition levels for potato granule reactions (PO-1, PO-2) were 10.0%, 20.0% (w/w) propylene oxide, respectively, based on potato granule dry weight.

Effect of Reaction Conditions on Cross-Linking DS Levels

For cross-linking reactions, a further ANOVA analysis was conducted to investigate the effects of STMP reagent addition level, reaction temperature, and PO addition level (since PO substitution was always conducted prior to cross-linking) on cross-linking DS levels (Table 14). All two- and three-way interactions amongst the main effects were also considered. In stark contrast to PO reactions, cross-linking DS values were only dependent on STMP reagent addition level (p 0.030), and were not influenced by reaction temperature or PO addition level. Mean cross-linking DS values, pooled across PO addition levels according to reaction temperature, are depicted in Table 15. A similar lack of temperature effect in cross-linking reactions has been observed by others. In investigating STMP modification of corn starch, Yang et al. (2007) did not observe temperature to be a factor in cross-linking reactions, though both reagent addition level and pH did significantly impact reaction levels. In the presence of sufficient levels of alkalinity to drive the reaction, cross-linking DS levels in STMP reactions are essentially a function of reagent addition level.

TABLE 14

Three-way Analysis of Variance (ANOVA) and Level of Significance for the Effects of Sodium Trimetaphosphate Addition Level, Propylene Oxide Addition Level, and Reaction Temperature on Modified Potato Granule Degree of Substitution (DS) Levels

| Source | DF | Sum of squares | Mean squares | F | Pr > F |
|---|---|---|---|---|---|
| Sodium Trimetaphosphate (STMP)[1] | 3 | 0.011 | 0.004 | 606.783 | 0.030 |
| Reaction Temperature (Temp)[2] | 2 | 0.000 | 0.000 | 0.821 | 0.615 |
| Propylene Oxide (PO)[3] | 2 | 0.000 | 0.000 | 5.501 | 0.289 |
| Temp × STMP | 6 | 0.000 | 0.000 | 0.887 | 0.671 |
| Temp × PO | 4 | 0.000 | 0.000 | 0.821 | 0.668 |
| PO × STMP | 6 | 0.000 | 0.000 | 13.477 | 0.206 |
| Temp × STMP × PO | 11 | 0.000 | 0.000 | 0.283 | 0.913 |

[1]Reagent addition levels for potato granule reactions (STMP-0, STMP-1, STMP-2, STMP-3) were 0.0%, 1.0%, 2.0% and 4.0% (w/w) sodium trimetaphosphate, respectively, based on potato granule dry weight.
[2]Reaction temperatures evaluated: 22° C., 34° C. and 48° C.
[3]Reagent addition levels for potato granule reactions (PO-0, PO-1, PO-2) were 0.0%, 10.0%, and 20.0% (w/w) propylene oxide, respectively, based on potato granule dry weight.

TABLE 15

Mean[1] Degree of Substitution (DS) Values for Dual Modified Potato Granules according to Sodium Trimetaphosphate Addition Level[2] and Reaction Temperature[3]

| Reagent Addition Level | Degree of Cross-linking (DS) Level[4] | | | |
|---|---|---|---|---|
| | 22° C. Reaction | 34° C. Reaction | 48° C. Reaction | Mean Values |
| STMP-0 | 0.000 | 0.000 | 0.000 | 0.000 $^a$ |
| STMP-1 | 0.006 ± 0.001 | 0.004 ± 0.003 | 0.006 ± 0.003 | 0.005 $^b$ |
| STMP-2 | 0.009 ± 0.003 | 0.005 ± 0.003 | 0.011 ± 0.002 | 0.008 $^c$ |
| STMP-3 | 0.044 ± 0.003 | 0.047 ± 0.006 | 0.048 ± 0.003 | 0.046 $^d$ |
| Mean Values | 0.015 | 0.014 | 0.016 | 0.015 |

[1]Mean values ± standard deviations pooled across PO addition levels. Values within a column sharing a common letter are not significantly different (p < 0.05).
[2]Cross-linking reagent addition levels for potato granule reactions (STMP-0, STMP-1, STMP-2, STMP-3) were 0.0%, 1.0%, 2.0% and 4.0% (w/w) sodium trimetaphosphate, respectively, based on potato granule dry weight.
[3]Reaction temperatures evaluated: 22° C., 34° C. and 48° C.
[4]DS values were determined by assaying the phosphorus content incorporated due to cross-linking reactions, excluding the native phosphorus content in the reaction control samples.

Effect of Reaction Conditions on Resistant Starch (RS) Levels

Dual modified potato granules discussed in the previous section were further analyzed to assess resistant starch (RS) levels. Table 16 provides a summary of RS values obtained for modified potato granules representing all combinations of hydroxypropylation (0%, 10% and 20% PO levels), cross-linking (0%, 1%, 2% and 4% STMP levels) and reaction temperature (22 C, 34 C and 48 C). As anticipated, RS levels generally increased with increasing levels of hydroxypropylation, cross-linking, and reaction temperature. Data were subjected to three-way ANOVA analysis to investigate hydroxypropylation, cross-linking, and reaction temperature main effects, as well as potential interactions between the main effects, on potato granule RS values (Table 17). Reaction temperature, STMP addition level and propylene oxide addition level main effects all significantly influenced potato granule RS values (p<0.001), including noted significant two-way interactions (PO level×reaction temperature; STMP level×reaction temperature). A significant three-way interaction amongst all main effects was also observed. In contrast, the lack of a significant interaction between PO and STMP reagent addition levels indicated that the initial degree of hydroxypropylation did not impact of the subsequent effect of cross-linking in regard to potato granule RS values. Thus, PO and STMP reagents exhibited an additive, rather than a synergistic, effect on potato granule RS content.

TABLE 16

Summary of Dual Modified Potato Granule Resistant Starch (RS) Levels based on Propylene Oxide[1]/Sodium Trimetaphosphate[2] Addition Levels and Reaction Temperature[3]

| Treatment Combination | Resistant Starch (RS) Content | | |
|---|---|---|---|
| | 22° C. | 34° C. | 48° C. |
| PO-0/STMP-0 | 0.0 | 0.0 | 0.0 |
| PO-0/STMP-1 | 4.5 ± 0.6 | 2.4 ± 0.1 | 1.9 ± 2.5 |
| PO-0/STMP-2 | 0.7 ± 0.5 | 1.6 ± 1.1 | 6.2 ± 2.4 |
| PO-0/STMP-3 | 4.8 ± 1.1 | 5.5 ± 1.3 | 7.5 ± 4.2 |
| PO-1/STMP-0 | 7.8 ± 0.5 | 12.0 ± 0.1 | 34.5 ± 1.5 |
| PO-1/STMP-1 | 7.5 ± 3.4 | 11.4 ± 3.6 | 37.1 ± 1.4 |
| PO-1/STMP-2 | 15.6 ± 0.4 | 17.3 ± 1.0 | 33.5 ± 0.6 |
| PO-1/STMP-3 | 10.0 ± 0.6 | 24.3 ± 1.7 | 38.3 ± 1.3 |
| PO-2/STMP-0 | 21.7 ± 2.8 | 27.5 ± 1.1 | 45.1 ± 2.9 |
| PO-2/STMP-1 | 22.7 ± 0.8 | 31.7 ± 1.0 | 46.1 ± 2.1 |
| PO-2/STMP-2 | 20.2 ± 0.1 | 32.5 ± 1.3 | 50.0 ± 2.0 |
| PO-2/STMP-3 | 23.6 ± 0.5 | 33.8 ± 1.9 | 50.5 ± 2.7 |

[1]Reagent addition levels for potato granule reactions (PO-0, PO-1, PO-2) were 0.0%, 10.0%, and 20.0% (w/w) propylene oxide, respectively, based on potato granule dry weight.
[2]Reagent addition levels for potato granule reactions (STMP-0, STMP-1, STMP-2, STMP-3) were 0.0%, 1.0%, 2.0% and 4.0% (w/w) sodium trimetaphosphate, respectively, based on potato granule dry weight.
[3]Reaction temperatures evaluated: 22° C., 34° C. and 48° C.

TABLE 17

Three-way Analysis of Variance (ANOVA) and Level of Significance for the Effects Propylene Oxide Addition Level, Sodium Trimetaphosphate Addition Level, and Reaction Temperature on Modified Potato Granule Resistant Starch (RS) Levels

| Source | DF | Sum of squares | Mean squares | F | Pr > F |
|---|---|---|---|---|---|
| Propylene Oxide Addition Level (PO) [1] | 2 | 11511.195 | 5755.597 | 1770.65 | <0.0001 |
| Sodium Trimetaphosphate Addition Level (STMP) [2] | 3 | 287.891 | 95.963 | 29.52 | <0.0001 |
| Reaction Temperature (Temp) [3] | 2 | 3980.424 | 1990.212 | 612.27 | <0.0001 |
| Temp × PO | 4 | 1688.740 | 422.185 | 129.88 | <0.0001 |
| Temp × STMP | 6 | 12.626 | 6.313 | 2.53 | 0.0381 |
| PO × STMP | 6 | 49.320 | 8.220 | 1.509 | 0.2151 |
| Temp × PO × STMP | 12 | 210.298 | 17.525 | 5.390 | <0.0001 |

[1] Reagent addition levels for potato granule reactions (PO-0, PO-1, PO-2) were 0.0%, 10.0%, and 20.0% (w/w) propylene oxide, respectively, based on potato granule dry weight.
[2] Reagent addition levels for potato granule reactions (STMP-0, STMP-1, STMP-2, STMP-3) were 0.0%, 1.0%, 2.0% and 4.0% (w/w) sodium trimetaphosphate, respectively, based on potato granule dry weight.
[3] Reaction temperatures evaluated: 22° C., 34° C. and 48° C.

Figure 9:
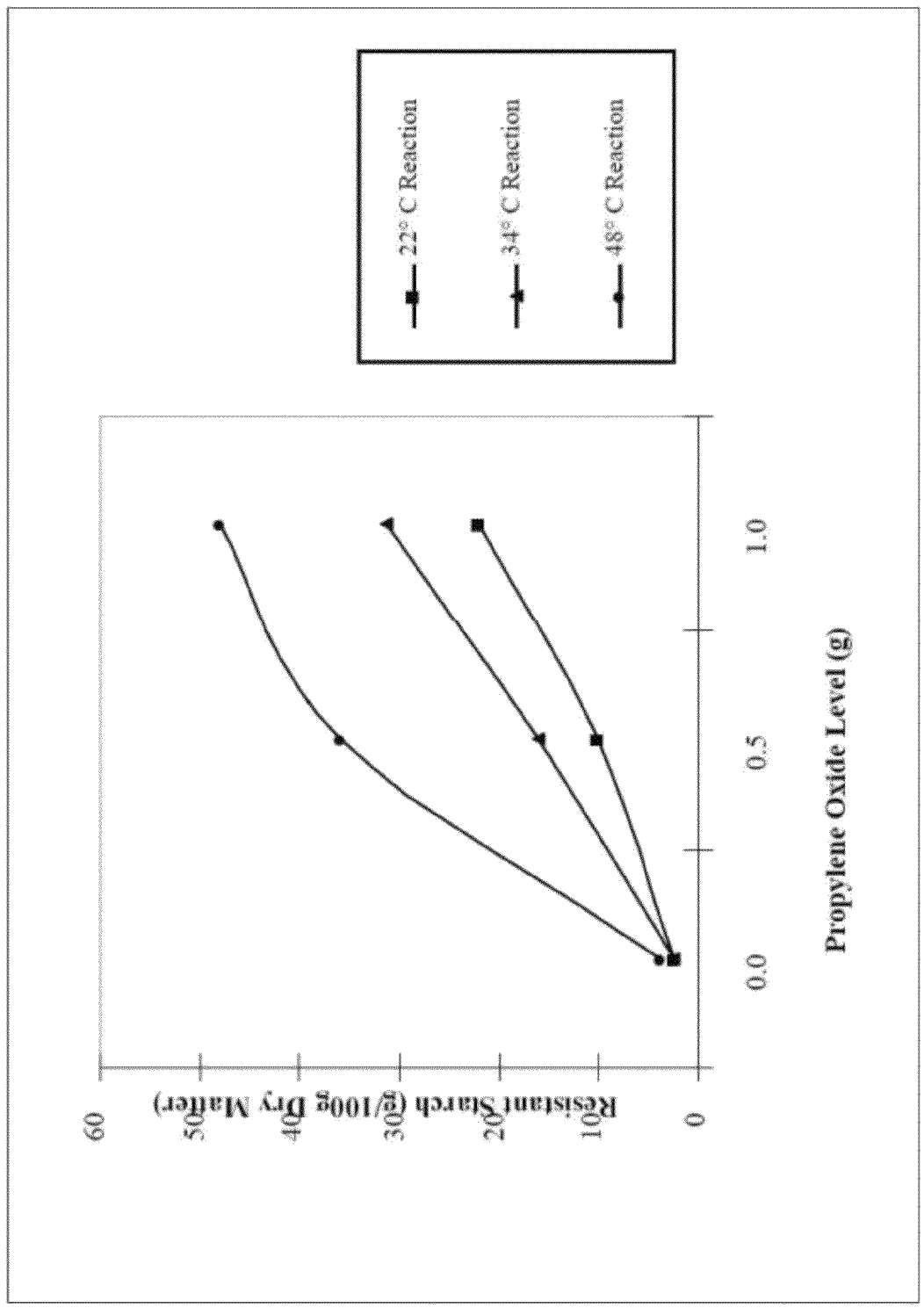
FIG. 9. Plot depicting the significant interaction between propylene oxide addition level and reaction temperature in relation to potato granule resistant starch (RS) levels.

The significant interaction between PO addition level and reaction temperature was plotted to aid the interpretation of the data (FIG. 9). Overall, RS values tended to increase with increasing levels of PO addition within each level of reaction temperature. However, the rate of increase in RS as a function of PO reagent addition level increased as reaction temperature increased. Thus, the greatest RS values were achieved with the highest levels of PO addition reacted at the highest reaction temperature (48 C). The trend in RS in response to PO addition level and reaction temperature parallels that previously observed for PO MS values (FIGS. 5 and 8), indicating that a higher reaction temperature induced a greater degree hydroxypropylation within potato granules, which in turn led to a higher RS values. This phenomenon is in agreement with the strong positive correlation (r=0.933) observed between MS and RS values in the initial experiment (FIG. 7), though no significant interaction between PO reagent addition level and reaction temperature was detected in the initial experiment. Based on reactions with granular starch (as opposed to gelatinized starch used in this study), Kishida et al. (2001) likewise observed PO addition level to significantly enhance RS values within modified starch products.

The effect of PO reagent addition level on RS values was determined for each reaction temperature (Table 18) to facilitate comparison with data obtained in the initial experiment (Table 8). RS values depicted in Table 18 are similar to those shown in Table 8 for comparable reaction temperatures and PO levels (for reaction temperatures of 22 and 48° C., PO-2 addition levels in Table 8 are comparable to PO-1 addition levels in Table 18, while PO-4 addition levels in Table 8 are comparable to PO-2 levels in Table 18). On average (mean values in Table 18), a reaction temperature of 48° C. produced a 2.5 fold higher RS value (29.3) than that achieved at 22° C. (11.6), reinforcing the fact that reaction temperature itself is critical for enhancing the RS content of modified potato granules.

Figure 10:
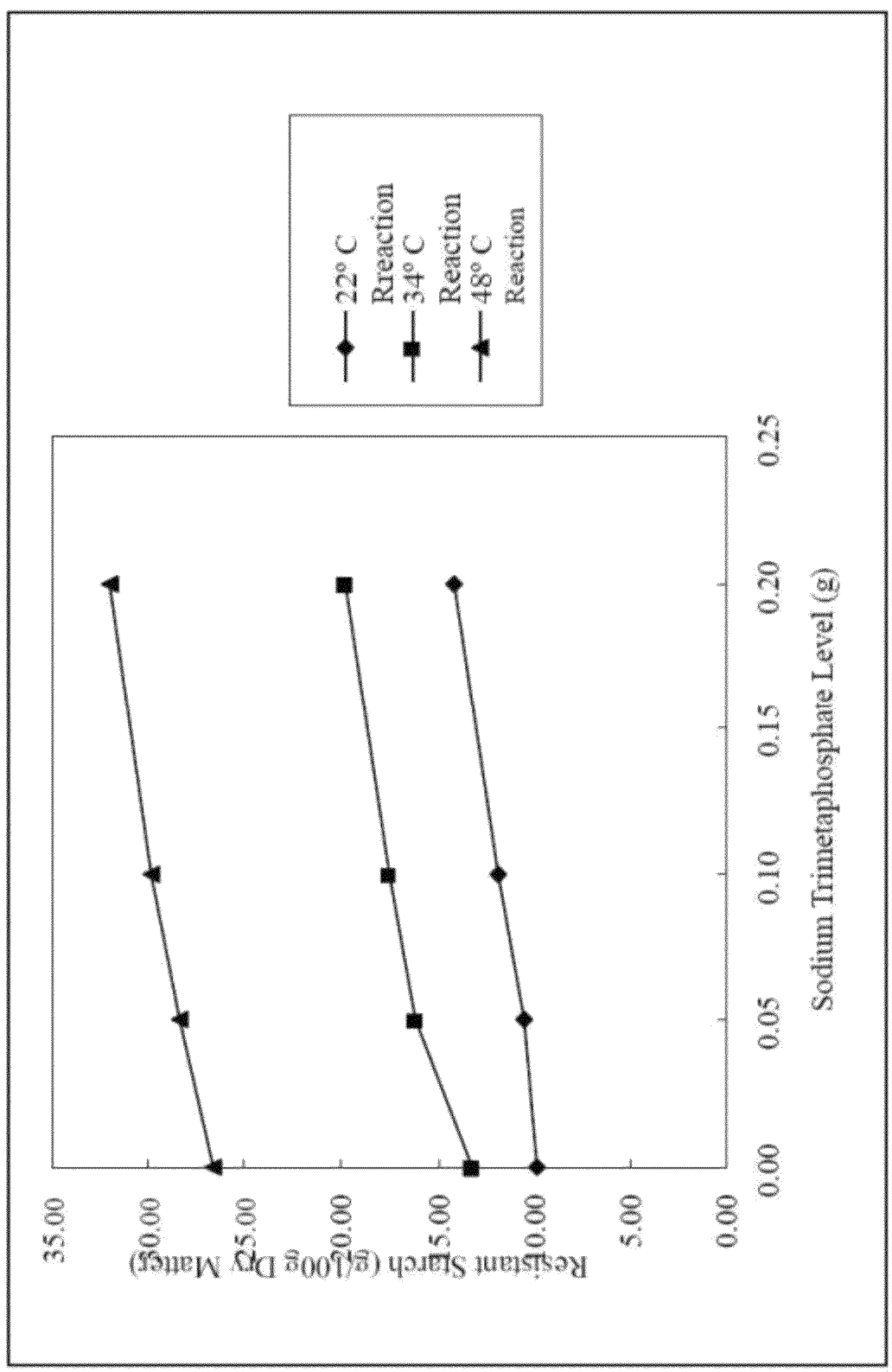
FIG. 10. Plot depicting the significant (but non-severe) interaction between propylene oxide addition level and reaction temperature in relation to potato granule resistant starch (RS) levels.

Although a significant interaction between STMP addition level and reaction temperature was observed in regard to RS values (Table 17), the interaction was shown to be non-severe and of no practical significance (FIG. 10). As noted previously, there was also no meaningful interaction observed between STMP addition level and reaction temperature in regard to potato granule DS levels; thus, it is not surprising that a practical interaction was not noted in regard to RS values. Table 19 depicts RS values for each STMP reagent addition level according to reaction temperature. The overall impact of cross-linking on RS content was statistically differentiated for each reagent addition level (mean values pooled across PO addition levels), as RS values exhibited a stepwise increase with each increase in STMP addition level. In contrast to PO reactions, reaction temperature had no real impact on RS levels generated in STMP cross-linking reactions (Table 19). The three-way interaction between PO addition level, STMP addition level, and reaction temperature main effects (Table 17) was a result of the two-way interaction between PO addition level and reaction temperature.

TABLE 18

Mean[1] Resistant Starch (RS) Values for Dual Modified Potato Granules according to Propylene Oxide Reagent Addition Level[2] and Reaction Temperature[3]

| Reagent Addition Level | Resistant Starch (RS) Level[4] | | | |
|---|---|---|---|---|
| | 22° C. Reaction | 34° C. Reaction | 48° C. Reaction | Mean Values |
| PO-0 | 2.5 [a] ± 0.7 | 2.4 [a] ± 0.8 | 3.9 [a] ± 1.2 | 2.9 |
| PO-1 | 10.2 [b] ± 1.4 | 16.2 [b] ± 1.6 | 36.0 [b] ± 1.1 | 20.8 |
| PO-2 | 22.0 [c] ± 1.5 | 31.4 [c] ± 1.2 | 47.9 [c] ± 2.3 | 33.8 |
| Mean Values | 11.6 | 16.6 | 29.3 | 19.2 |

[1]Mean values ± standard deviations determined from two replicate experiments. Values within a column sharing a common letter are not significantly different (p < 0.0001).
[2]Reagent addition levels for potato granule reactions (PO-0, PO-1, PO-2) were 0.0%, 10.0%, and 20.0% (w/w) propylene oxide, respectively, based on potato granule dry weight.
[3]Reaction temperatures evaluated: 22° C., 34° C. and 48° C.
[4]g/100 g dry starch content (Englyst et al., 1992); RS = TS − (RDS + SDS).

To directly contrast the contributions of PO with STMP reagents toward generation of RS, modified potato granules exhibiting similar MS and DS levels, respectively, were compared in regard to RS content. A hydroxypropylation MS level of 0.047 possessing no cross-linking (PO-1/22° C. reaction; Table 11) produced a RS value of 7.8 (Table 16). In comparison, STMP cross-linking (DS value of 0.048; STMP-3/34C reaction; Table (11)) in the absence of hydroxypropylation exhibited an RS value of 5.5 (Table 16). Thus, at low levels of modification, hydroxypropylation produces at least comparable (or slightly higher) amounts of RS in modified potato granules than cross-linking with STMP, though it is not known whether this observation can be extrapolated to higher modification levels.

TABLE 19

Mean[1] Resistant Starch (RS) Values for Dual Modified Potato Granules according to Sodium Trimetaphosphate Reagent Addition Level[2] and Reaction Temperature[3]

| Reagent Addition Level | Resistant Starch (RS) Level[4] | | | |
|---|---|---|---|---|
| | 22° C. Reaction | 34° C. Reaction | 48° C. Reaction | Mean Values |
| STMP-0 | 9.8 ± 1.1 | 13.1 ± 0.7 | 26.7 ± 1.4 | 16.5 [a] |
| STMP-1 | 11.6 ± 1.6 | 15.2 ± 1.9 | 28.4 ± 2.0 | 18.4 [b] |
| STMP-2 | 12.1 ± 0.3 | 17.2 ± 1.1 | 29.9 ± 1.6 | 19.7 [c] |
| STMP-3 | 12.8 ± 0.7 | 21.2 ± 1.6 | 32.1 ± 3.7 | 22.0 [d] |
| Mean Values | 11.6 | 16.7 | 29.3 | 19.2 |

[1]Mean values ± standard deviations determined from two replicate experiments across other variables. Values within a column sharing a common letter are not significantly different (p < 0.05).
[2]Reagent addition levels for potato granule reactions (STMP-0, STMP-1, STMP-2 and STMP-3) were 0.0%, 1.0%, 2.0% and 4.0% (w/w) sodium trimetaphosphate respectively, based on potato granule dry weight.
[3]Reaction temperatures evaluated: 22° C., 34° C. and 48° C.
[4]g/100 g dry starch content matter (Englyst et al., 1992); RS = TS − (RDS + SDS).

In Vitro Estimated Glycemic Index (eGI) Determination

In previous sections, it was demonstrated that both hydroxypropylation and cross-linking effectively enhanced RS levels. Many studies have indicated that the presence of RS reduces glycemic index (GI) values by moderating the starch digestion rate (Raben et al., 1994; Reader et al., 1997; Goni et al., 1996; Sajilata et al., 2006). Thus, the estimated glycemic index (eGI), which represents an in vitro estimation of the actual GI, was established for select dual modified potato granule materials of this study based on the procedure and empirical equation established by Goni et al. (1997). In this procedure, the percentage of the total starch hydrolyzed in 90 min (HI90) was measured and extrapolated to yield an eGI value, based on an established correlation between HI90 and in vivo glycemic index determinations (r=0.952, p<0.05).

Table 20 provides a summary of the two-way ANOVA analysis used to investigate the effects of both treatment and digestion time on the digested starch content of select modified potato granule products of the study. Both treatment and digestion time main effects independently impacted digested starch content values, as no significant interaction was observed between the two main effects (Table 20). Table 21 depicts the corresponding mean values for the digested starch contents (HI90) and eGI values, as well as the designated GI categories, for all evaluated modified potato granule products. The commercial potato granule product, which received no chemical modification treatment (control, treatment 5), possessed the highest HI90 (71.6) and in vitro eGI (116.4) values of all potato granule products evaluated, causing it to be categorized as a high GI product. In contrast, the lowest HI90 (25.0-27.4) and in vitro eGI (59.7-65.9) values were obtained for modified potato granule products (treatments 1, 2, and 3) that received the highest level of PO addition (PO-2); these granule products fell within the medium glycemic category. Treatments 1, 2, and 3; which differed only in their STMP addition levels (STMP-3, STMP-2, and STMP-0, respectively), were not statistically differentiated by their HI90 or eGI values. Thus, STMP cross-linking at levels investigated in this study did not appear to impact or improve HI90 or eGI values of modified potato granules. While the potato granule product exhibiting a low level of PO addition (PO-1, treatment 4) was statistically differentiated from the unmodified commercial control (treatment 5) on the basis of HI90 or eGI values, it was still considered a high glycemic product. In short, it appears that a relatively high PO level is needed to impact the glycemic response characteristics of potato granule products.

TABLE 20

Two-way Analysis of Variance (ANOVA) and Level of Significance for the Effects of Modification Type/Level (Treatment) and Starch Digestion Time on Modified Potato Granule Degree of Starch Digestion

| Source | df | Sum of Squares | Mean Square | F-Value | Significance Level |
|---|---|---|---|---|---|
| Treatment [1] | 4 | 17095.840 | 4273.960 | 1230.70 | <0.0001 |
| Digestion Time [2] | 4 | 7.599 | 19.150 | 5.51 | 0.0025 |
| Treatment × Digestion Time | 16 | 74.463 | 4.654 | 1.34 | 0.249 |

[1] Treatments are defined by their combination of propylene oxide and STMP reagent addition levels (defined as a percentage of potato granule dry weight):
Treatment 1—PO 20.0%, STMP 4.0%
Treatment 2—PO 20%, STMP 2.0%
Treatment 3—PO 20%, STMP 0.0%
Treatment 4—PO 10%, STMP 2.0%
Treatment 5—PO 0%, STMP 0%
[2] Degree of hydrolysis was determined at various points in time (30, 60, 90, 120, 150 minutes) over the course of starch digestion.

Figure 11:
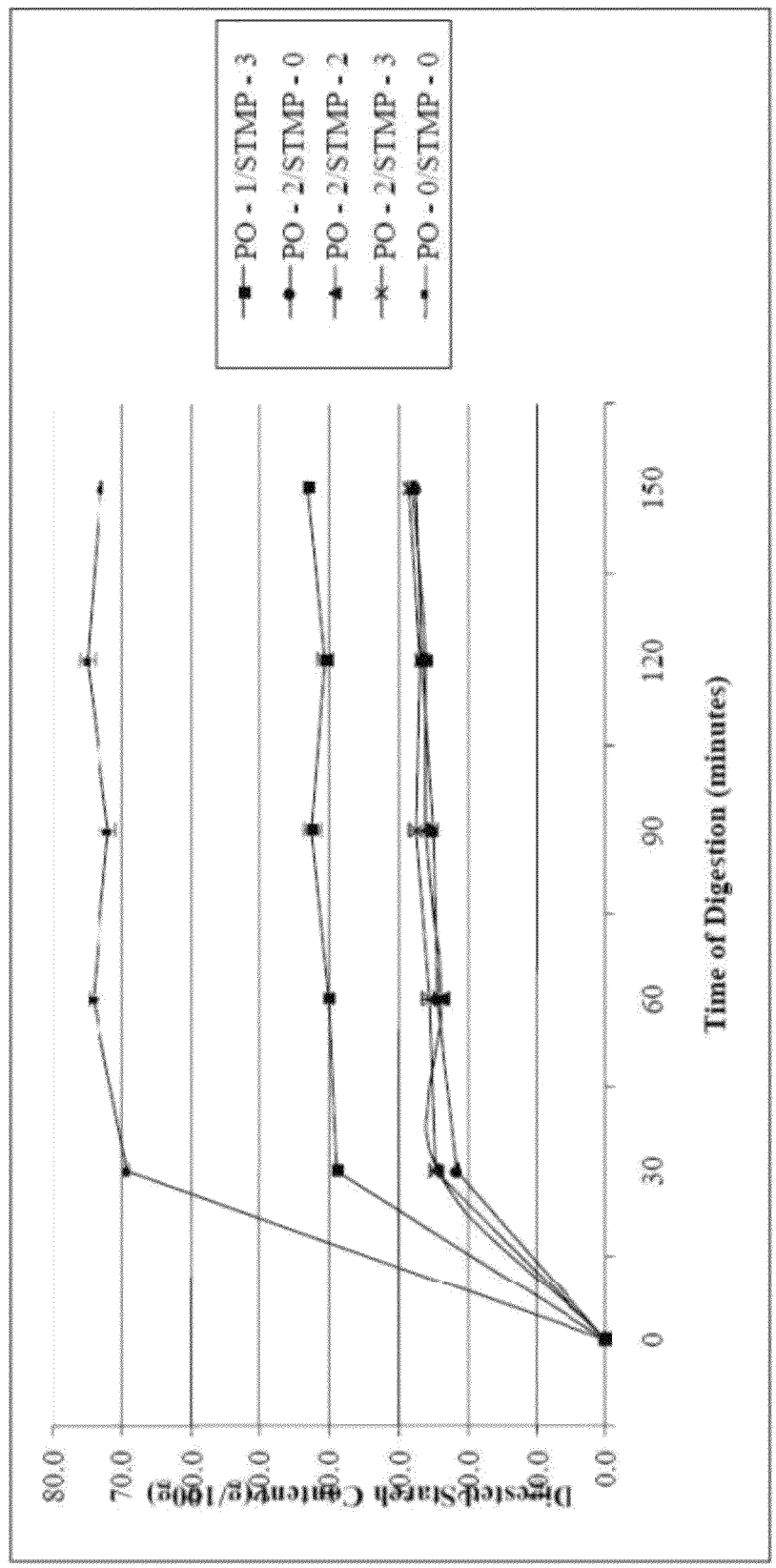
FIG. 11. Rates of enzymatic starch digestion for commercial (unmodified) and select combinations of chemically modified potato granules, expressed as a percentage of total starch hydrolyzed over the course of a 150 minute digestion period. Propylene oxide addition levels (0, 10, and 20% based on potato granule dry weight) and STMP addition levels (0, 1, 2, and 4% based on starch dry weight) for modified potato granule reactions are denoted as PO-0, PO-1, and PO-2 and STMP-0, STMP-1, STMP-2, and STMP-3, respectively.

A graphical depiction of the same data is provided in FIG. 11. For all samples, the greatest rate and proportion of starch digestion occurred within the first 30 minutes of the digestion period, beyond which time period very little additional starch was digested. The ability to produce low glycemic products via chemical modification requires the chemical treatment to limit the rate and extent of rapid digestion occurring in the early stages of starch hydrolysis.

TABLE 21

Digestibility Index and in vitro estimated Glycemic Index (eGI) Values for Modified Potato Granules

| Modification Treatments with Potato Granules[1] | PO Level[2] | STMP Level[3] | Digested Starch Content (HI90)[4] | In Vitro eGI[5] | GI Category[6] |
|---|---|---|---|---|---|
| Treatment 1 | 2 | 3 | 34.8$^a$ ± 1.3 | 59.7$^a$ ± 0.8 | Medium |
| Treatment 2 | 2 | 2 | 36.3$^a$ ± 0.4 | 63.5$^a$ ± 2.8 | Medium |
| Treatment 3 | 2 | 0 | 38.3$^a$ ± 4.2 | 65.9$^a$ ± 1.8 | Medium |
| Treatment 4 | 1 | 3 | 59.2$^b$ ± 3.3 | 84.7$^b$ ± 6.5 | High |
| Treatment 5 | 0 | 0 | 98.7$^c$ ± 3.5 | 116.4$^c$ ± 0.3 | High |

[1]Treatments are defined by their combination of propylene oxide (PO level) and sodium trimetaphosphate (STMP level) reagent addition levels.
[2]Propylene oxide (PO) reagent addition levels (PO-0, PO-1, PO-2) correspond to 0.0%, 10.0%, and 20.0% (w/w) propylene oxide, respectively, based on potato granule dry weight.
[3]Sodium trimetaphosphate (STMP) reagent addition levels (STMP-0, STMP-1, STMP-2, and STMP-3) correspond to 0.0%, 1.0%, 2.0%, and 4.0% (w/w) STMP, respectively, based on potato granule dry weight.
[4]Digestibility index (HI90) was determined by the amount of digested starch (i.e., glucose) expressed as a percentage (%) of the total starch content after 90 min of digestion.
[5]In vitro eGI was estimated by the equation GI = 39.21 + 0.803(H90) as proposed by Goni et al. (1997).
[6]GI categories are defined as follows: low GI = less than 55; medium GI = 55-69: high GI = greater than 69.

Scanning Electron Microscope Imaging of Modified and Control Potato Granules

Figure 12:
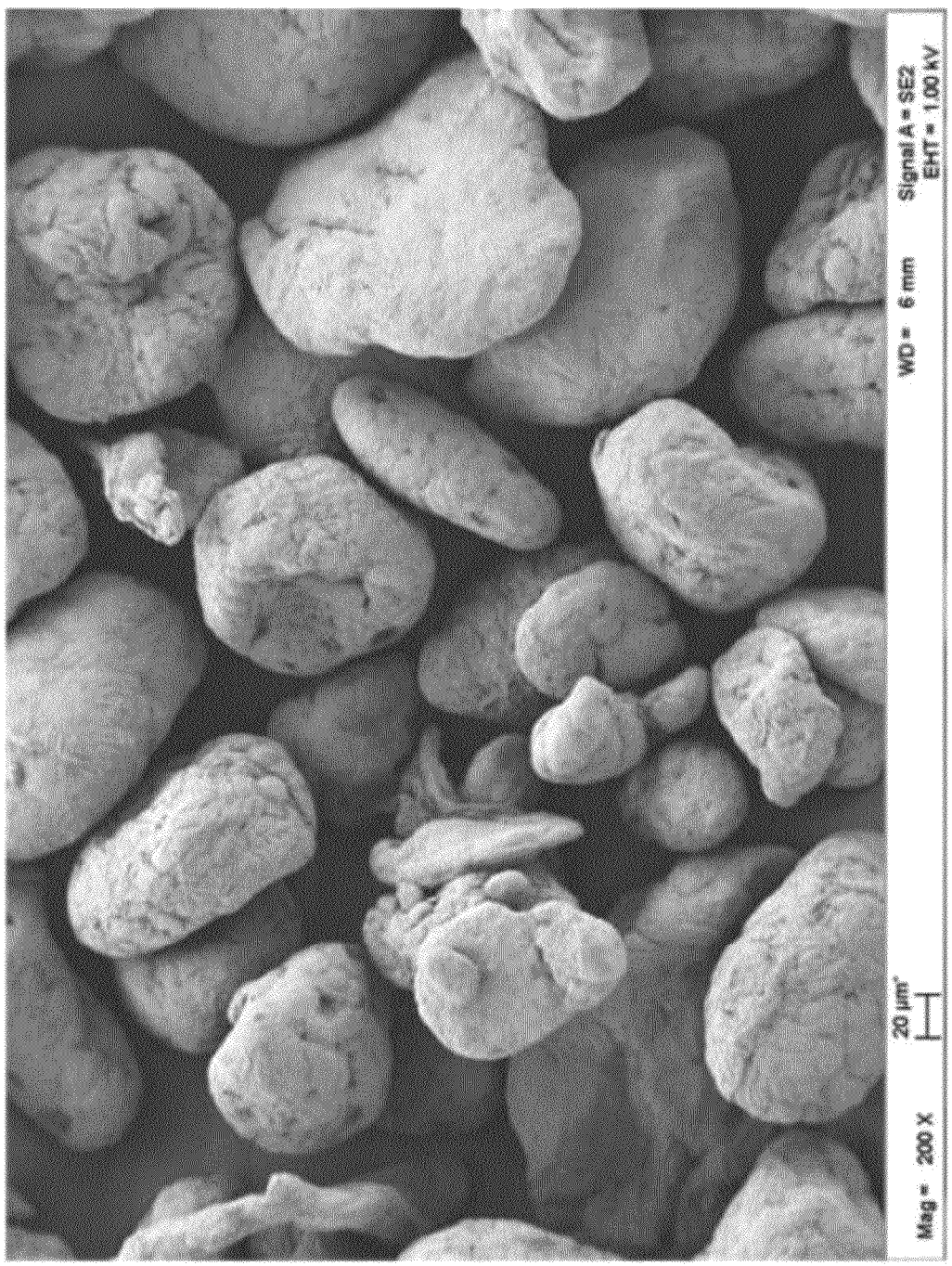
FIG. 12. Scanning electron micrograph of commercial (unmodified) potato granules (Magnification 200×).
Figure 13:
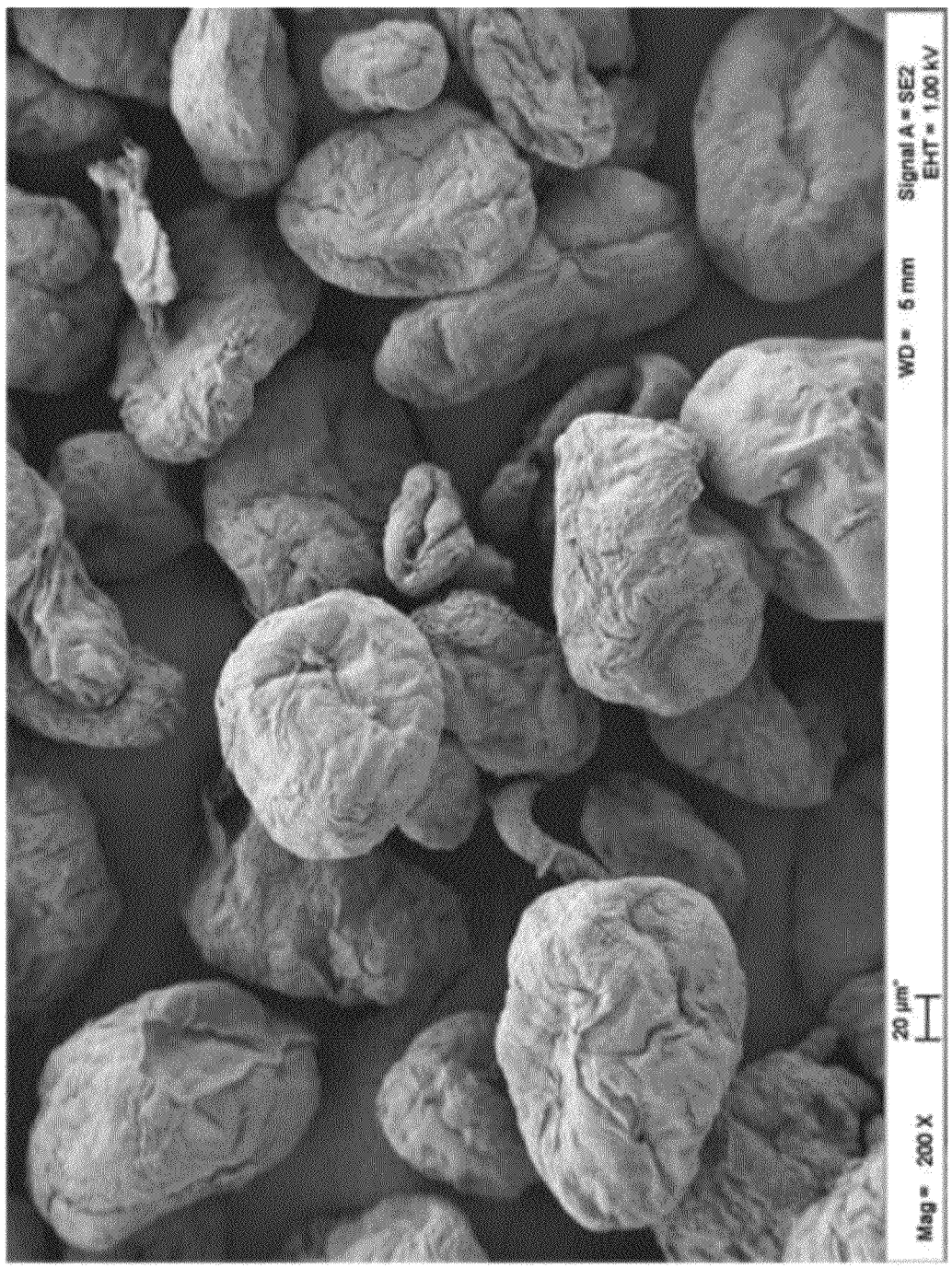
FIG. 13. Scanning electron micrograph of reaction control potato granules (PO-0) (Magnification 200×).
Figure 14:
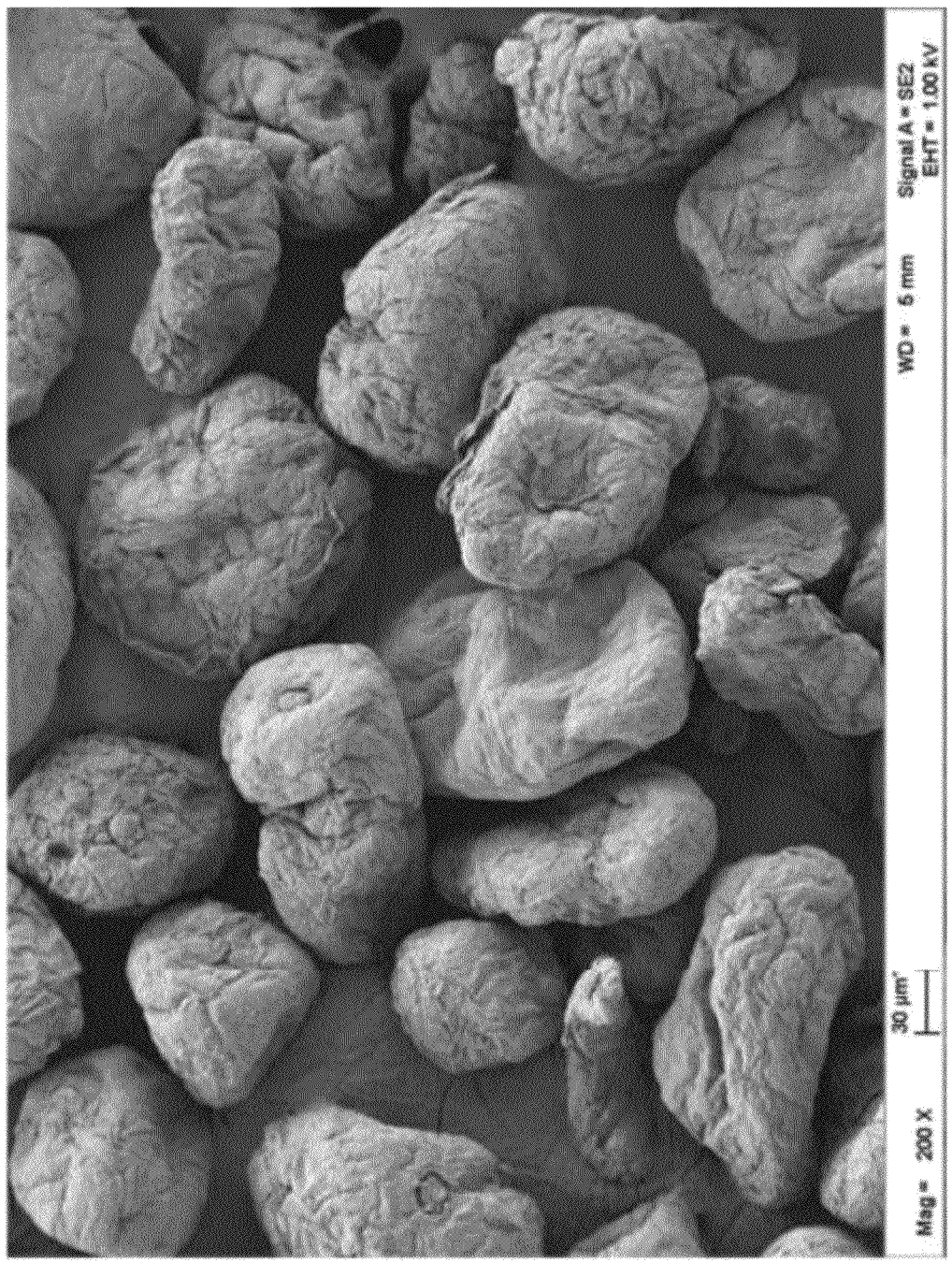
FIG. 14. Scanning electron micrograph of commercial modified potato granules (PO-1) (Magnification 200×).
Figure 15:
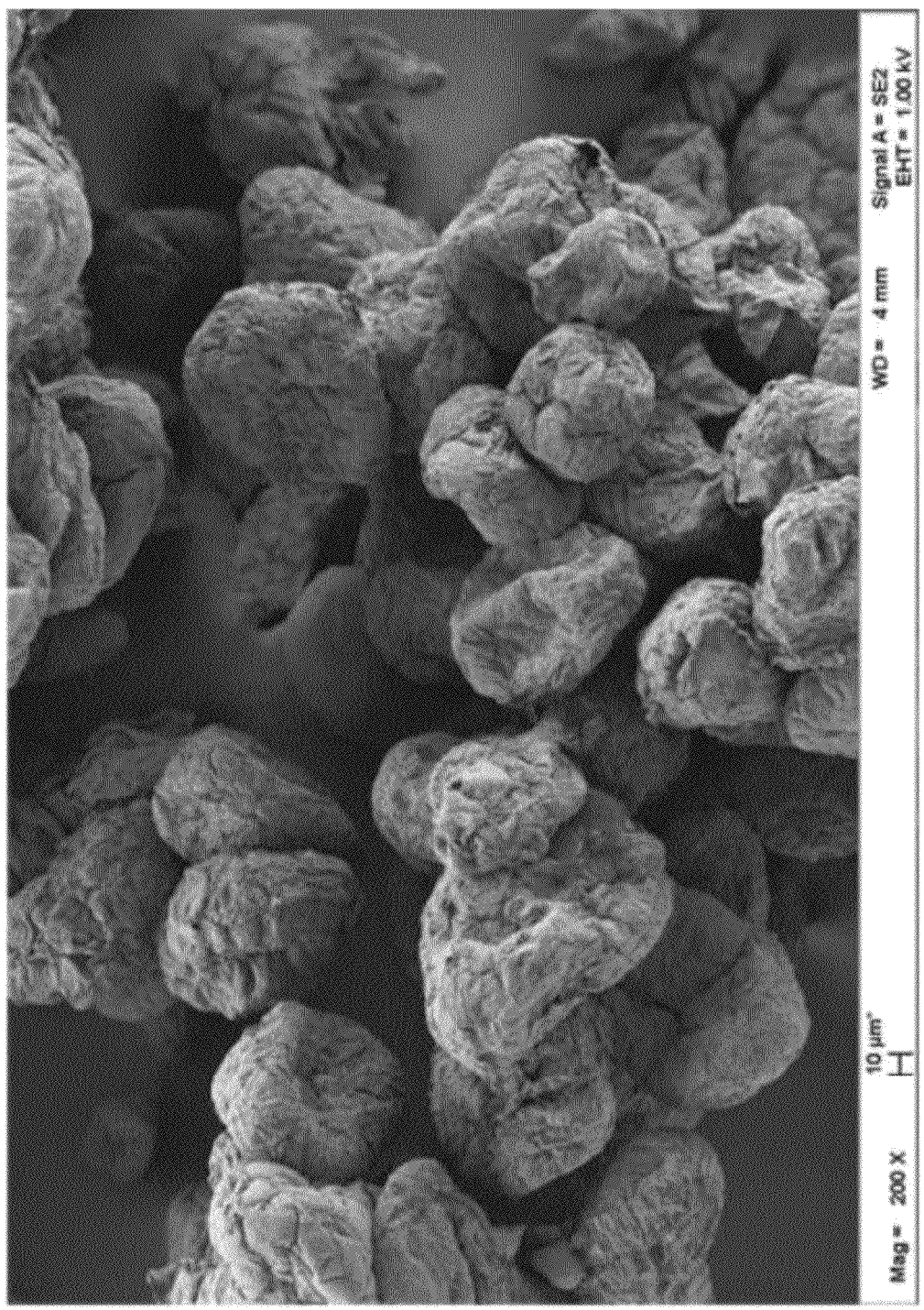
FIG. 15. Scanning electron micrograph of commercial modified potato granules (PO-2) (Magnification 200×).

Both modified and commercial (unmodified) potato granules were visualized by scanning electron microscopy (SEM) to better visualize and compare their physical characteristics. FIGS. 12 and 13 represent images of unmodified commercial potato granules and reaction control potato granules, respectively, while FIGS. 14 and 15 depict modified potato granules. Micrographs revealed that both commercial and modified granules consisted of discrete, parenchyma cell structures; thus, cells did not appear to have been ruptured by the derivatization procedure. Intact cells, which are considered a key determinant of mashed potato texture and quality, are important characteristics for commercial products. The parenchyma cells of the reaction control (unmodified) potato granules (FIG. 13) exhibited a slightly wrinkled or shrunken appearance relative to those of untreated commercial potato granules (FIG. 12). The shrunken appearance of the reaction control potato granule surfaces was likely due to the reaction system (alkaline aqueous alcohol reaction medium) and/or subsequent solvent drying of the granules following exposure to reaction conditions. The modified (hydroxypropylated) granules (FIGS. 14 and 15) not only exhibited a slightly wrinkled appearance (similar to the reaction control granules), but also a slightly rougher exterior surface. Beyond the noted differences in surface appearance, the modified granules did not appear to be drastically different from commercial unmodified potato granules in relation to size and morphology.

Retrogradation Stability of Modified Potato Granules

The approach to enhance the RS content of potato granules in this study not only lowers the eGI values as previously presented, but also contributes to the improvement of potato granule physical properties. Hydroxypropylation is often employed commercially to stabilize starches against retrogradation by introducing substituent groups along polymer chains to reduce excessive interchain associations, which otherwise leads to syneresis. Therefore, substituted starch pastes generally resist retrogradation, and can also withstand freezing and thawing processes without loss of water-holding capacity (Whistler and BeMiller, 1997). In this study, commercial (unmodified) potato granules were contrasted to hydroxypropylated potato granules via differential scanning calorimetry (DSC) for their ability to resist retrogradation over the course of 21 days of storage at refrigerated temperature (4° C.). For unmodified potato granules, transition temperatures for retrograded starch fell within the range of 53.4° C. to 77.9° C. for all samples evaluated over the course of the 21 day experiment (Table 22). This temperature range is consistent with the melting of recrystallized amylopectin (Sievert and Pomeranz, 1989), which occurs at a temperature below that of native starch gelatinization (Pravisani et al., 1985; Toshiko, 2000; Karlsson and Eliasson, 2003). The phase transition observed for commercial potato granules at 0 days refrigerated storage is likely attributable to the melting of retrograded starch chains, which are the result of processing (heating/cooling) conditions employed during their original manufacture. The onset transition temperature did not change significantly over the 21 day period of refrigerated storage, while the peak and completion transition temperatures increased slightly after 7 days of refrigerated storage. As anticipated, the melting enthalpy increased (0.6 to 2.7 J/g) with increasing lengths of refrigerated storage. The increase in enthalpy over the course of refrigerated storage reflected increased levels of retrogradation (molecular order), while the subtle increases peak/completion transition temperatures denoted increased crystallite perfection (Tester and Morrison, 1990). This observed endothermic pattern is typical of gelatinized native starches subjected to low temperature conditions. Overall, low temperature storage enhanced starch retrogradation by increasing nucleation, crystal growth, and the crystallite perfection (Tester and Morrison, 1990; Toshiko, 2000; Karlsson and Eliasson, 2003).

However, for hydroxypropylated potato granules (PO-1 level), no transition endotherm indicative of starch retrogradation was observed over the course of the 21 day experiment (Table 22), as the hydroxypropyl substituent groups attached to modified starch chains effectively hindered amylopectin recrystallization. Thus, hydroxypropylation effectively inhibited starch retrogradation within potato granules, thus improving their physical properties for use in refrigerated/frozen food systems.

Proximate Composition of Modified Potato Granules

Commercial (unmodified) and hydroxypropylated (PO-2) potato granules were evaluated for proximate composition (protein, carbohydrate, lipid, and ash), as well as sulfur and phosphorus levels, to assess whether chemical modification resulted in any changes to macronutrient composition (Table 23). Proximate analysis revealed slight reductions in protein, lipid, sulfur, and phosphorus contents for the modified relative to the commercial (control) potato granules. Approximately half of the protein content was lost during the modification process. The high alkaline conditions required for reaction likely hydrolyzed a portion of the protein to short peptides or amino acids, which became solubilized and lost with removal of the reaction medium. The concurrent reduction of sulfur was likely due to the loss of sulfur containing peptides or amino acids. Lipid esters, as well as native starch monophosphate esters, were also likely hydrolyzed by the strong alkaline conditions of the reaction medium and lost, accounting for the observed reductions in lipid and phosphorus contents within modified potato granules (Chen and Jane, 1994; Sang et al., 2010; Tester and Karkals, 2005). In contrast, carbohydrate, starch and ash contents were slightly increased (i.e., concentrated) within modified potato granules due to significant losses of protein and lipid. Future investigations should consider removal and recovery of protein from potato granules prior to reaction to facilitate post-reaction addition to modified potato granules.

TABLE 23

Mean Values[1,2] for Proximate Composition, Phosphorus, Sulfur, and Starch Contents of Commercial (unmodified) and Modified (hydroxypropylated) Potato Granules

| Material | Proximate Composition (%, w/w) | | | | Phosphorus (%, w/w) | Sulfur (%, w/w) | Starch (%, w/w) |
|---|---|---|---|---|---|---|---|
| | Protein | Lipid | Carbohydrate[3] | Ash | | | |
| Commercial Granules | $8.8^a \pm 0.7$ | $0.86^a \pm 0.02$ | $85.3^a \pm 0.3$ | $5.0^a \pm 0.5$ | $0.29^a \pm 0.04$ | $0.19^a \pm 0.01$ | $78.1^a \pm 1.5$ |
| PO - $2^4$ | $4.4^b \pm 0.8$ | $0.34^b \pm 0.05$ | $89.4^b \pm 0.1$ | $5.8^b \pm 0.5$ | $0.21^b \pm 0.01$ | $0.11^b \pm 0.001$ | $81.5^b \pm 2.0$ |

[1]Mean values ± standard deviations determined from duplicate measurements.
[2]g/100 g potato granules (dry weight basis).
[3]Determined by difference (potato granule dry weight minus protein, lipid, and ash).
[4]Reagent addition level for modified potato granule sample (PO-2) was 20.0% (w/w) propylene oxide, based on potato granule dry weight.

Summary

Hydroxypropylation and cross-linking (STMP) reactions proved to be effective means for enhancing the RS content, as well as moderating the estimated glycemic index, of commercial potato granules. Though chemical reactions were likely not solely limited to starch molecules (cell wall polysaccharides, proteins could also be modified in the same reactions), there is good evidence that starch molecules were predominantly derivatized in the modification process. First, a model reaction system, in which potato granules were modified with a fluorescent probe in the aqueous state, revealed the potential for reagent to penetrate the parenchyma cell wall and to react with the starch fraction within the cells. Secondly, starch within modified potato granules exhibited increased resistance to hydrolysis via an in vitro enzyme digestion system and also demonstrated enhanced stability toward retrogradation, both of which provide indirect evidence for successful derivatization of starch chains. Thirdly, for similar levels of reagent addition, hydroxypropylation MS levels within modified potato granules levels produced almost identical RS levels as reactions reported in the literature for pure starch. These observations, as well as the fact that starch represents approximately 85% of the parenchyma cell dry matter content, provide strong evidence that much of the starch within potato granule parenchyma cells was effectively derivatized in the modification process.

Regarding reaction conditions for modifying potato granules, isopropanol was a critical component of the reaction system, in addition to reagent and base, since it prevented excessive swelling of potato granules to maintain a concentrated and stirrable slurry. Both an increasing PO reagent level (4.6-20%, based on potato granule weight) and reaction temperature (22-48° C.) exhibited positive impacts on potato granule MS values. A reaction temperature of 48° C. enhanced PO substitution efficiency, though higher temperatures tested (>50 C) led to excessive swelling/viscosity of the reaction system medium and hampered overall reactivity. Enhanced reaction due to temperature (22-48° C.) was likely caused by a combination of phenomenon, including increased swelling of starch chains, diminished Donnan potential effects, and increased dissociation of starch hydroxyl groups. For cross-linking reactions, increasing STMP reagent levels (1-4%, based on potato granule weight) led to increased DS levels, though STMP reaction efficiency was not influenced by reaction temperature or PO level (PO reactions were always conducted prior to STMP cross-linking), indicating that DS values were primarily a function of reagent addition level.

A positive correlation between PO MS and RS values (r=0.933) for modified potato granules (pooled across all reaction temperatures, 22-48° C.) suggested that RS levels were primarily a function of PO MS level. Thus, increasing PO MS levels (0.31-0.174) generally produced greater potato granule RS contents (6.0-40.1%). Incorporation of hydroxypropyl groups onto starch molecules effectively increased the steric hindrance to enzyme digestion. As the highest RS levels were achieved using the greatest PO addition levels (18.3% [w/w] based on potato granule weight) and reaction temperatures (48° C.), the two main effects enhanced the RS content of modified potato granules by simply increasing MS values. In contrast to RS content, potato granules modified by PO reagent possessed only very low levels of SDS (1.2-8.3%), which were deemed to be insignificant. Similar to PO derivatization, STMP DS levels also exhibited a positive relationship with RS values. In potato granules dual-modified with both PO and STMP reagents, the two reagents exhibited largely an additive effect toward potato granule RS content, rather than a synergistic effect. While both PO with STMP reagents exhibited similar contributions toward RS generation, allowable derivatization levels for PO are much higher than those for STMP, making PO a more practical reagent for RS generation in potato granules.

The in vitro starch hydrolysis rates and eGI for modified potato granules were significantly influenced by the PO/STMP substitution levels. The lowest GI (59.7) was generated by modified potato granules reacted with the highest PO addition levels (STMP levels used in these experiments appeared to contribute very little to reduced hydrolysis rates). The presence of RS4 reduced the eGI of potato granules by moderating both the rate and extent of starch digestion.

From a microstructural standpoint, the size and shape of the parenchyma cells of modified potato granules were comparable to those of commercial granules as observed via SEM. Cell wall structures within modified granules appeared to remain intact, though modified cells exhibited a slightly shrunken appearance and a roughened surface structure compared to those of commercial (unmodified) potato granules. Hydroxypropylated potato granules exhibited complete stability to starch retrogradation over 21 days of refrigerated storage, while starch retrogradation levels within commercial (unmodified) potato granules progressively increased under the same storage conditions. Thus, modified potato granules possessed enhanced physical properties, making them ideal for use in refrigerated frozen food systems. The potential exists for other modifying agents to be used to create RS potato granule products with other functionalities.

Compositionally, approximately 50% of the protein within commercial potato granules was lost during the modification process, most likely due to hydrolysis under the strong alkaline conditions used for modification. Future research efforts could investigate the possibility of pre-modification protein removal and post-modification protein add-back to avoid significant net protein loss. In addition, a more focused nutritional analysis should be conducted to understand the impact of modification on traditional micronutrient (e.g., vitamin C) levels. While modification effectively enhanced the RS content and reduced the estimated glycemic index of potato granules, in vivo experiments should be conducted to validate these effects in animals and/or humans. Lastly, it will be important to characterize the physical and sensory properties of modified potato granules within various food systems to better understand their contributions to product functionality.

REFERENCES

The following references are incorporated by reference herein.

Amogh, V., Glen, F. and Wolever, M. S. 2005. Evaluation of a glucose meter for determining the glycemic responses of foods. International Journal of Clinical Chemistry, 356 (1-2):191-8.

AACC. 2000. Official Methods of the AACC. Saint Paul, Minn., American Association of Cereal Chemists. Method 46-30: Crude protein by combustion.

AOAC. 1997. Official Methods of Analysis: Association of Official Analytical Chemists. Official Method 985.29: Total dietary fibre in foods. AOAC International, Gaithersburg, Md.

AOAC. 2000. Official Methods of Analysis: Association of Official Analytical Chemists. Official Method 934.0: Loss on drying for feeds by vacuum oven. AOAC International, Gaithersburg, Md.

AOAC. 2000. Official Methods of Analysis: Association of Official Analytical Chemists. Official Method 923.03: Gravimetric determination of ash for animal feed. AOAC International, Gaithersburg, Md.

AOAC. 2000. Official Methods of Analysis: Association of Official Analytical Chemists. Official Method 920.39: Determination of fat by petroleum ether extraction. AOAC International, Gaithersburg, Md.

Anderson, K. A. 1996. Micro-digestion and ICP-AES analysis for the determination of macro and micro elements in plant tissues. Atomic Spectroscopy, January/February, 30-33.

Asp, N. G., van Amelsvoort, J. M. M. and Hautvast, J. G. A. J. 1996. Nutritional Implications of Resistant Starch. Nutrition Research Reviews, 9:1-31.

Asp, N. G. 2001. Resistant Starch—An update on its physiological effects. In: Dietary fiber (pp. 201-210), Kritchevsky, D. and Bonfield, C., editors. New York: Plenum Press.

Augustin, L. S., Dal Maso, L., La Vecchia, C., Parpinel, M., Negri, E. and Vaccarelle, S. 2001. Dietary glycemic index and glycemic load, and breast cancer risk: a case-control study. Annals of Oncology, 12:1533-1538.

Augustin, L. S., Franceschi, S., Jenkins, D. J. A., Kendall, C. W. C. and La Vecchia, C. 2002. Glycemic index in chronic disease: a review. European Journal of Clinical Nutrition, 56:1049-1071.

Augustin, L. S., Gallus, S., Bosetti, C., Levi, F., Negri, E. and Franceschi, S. 2003a. Glycemic index and glycemic load in endometrial cancer. International Journal of Cancer, 105: 404-407.

Augustin, L. S., Gallus, S., Franceschi, S., Negri, E., Jenkins, D. J. and Kendall, C. W. 2003b. Glycemic index and load and risk of upper aero-digestive tract neoplasms (Italy). Cancer Causes Control, 14:657-662.

Augustin, L. S., Polesel, J., Bosetti, C., Kendall, C. W., La Vecchia, C. and Parpinel, M. 2003c. Dietary glycemic index, glycemic load and ovarian cancer risk: a case-control study in Italy. Annals of Oncology, 14:78-84.

Baghurst, P. A., Baghurst, K. I. and Record, S. J. 1996. Dietary fiber, non-starch polysaccharides and resistant starch—a review. Food Australia, 48(3):S3.

Baley, D. E., Cox, G. E. and Morgarareidge, K. 1973. Report 140. Maspeth, N.Y.: Food and Drug Research Laboratories. Carcinogenesis, 23(5):713-719.

BeMiller, J. N., and Huber, K. C. 2008. Carbohydrates. In: Food Chemistry (4th Ed.), Damodaran, S., Parkin, K. L. and Fennema, O. R., editors. Taylor and Francis Group, LLC: Boca Raton.

Berry, C. S. 1986. Resistant starch formation and measurement of starch that survives exhaustive digestion with amylolytic enzymes during the determination of dietary fiber. Journal of Cereal Science, 4:301-14.

Bertoft, E. 2000. Analysis starch structure. In: Starch in food: structure, function and applications (pp. 60-74), Eliasson, A-C., editors. Cambridge: CRC Press.

Bjoerck, I., Gunnarsson, A. and Oestergaard, K. 1989. A study of native and chemically modified potato starch. Part II: Digestibility in the rat intestinal tract. Starch/Staerke, 41(4):128-34.

Brand-Miller, J. C., Holt, S. H., Pawlak, D. B. and McMillan, J. 2002. Glycemic index and obesity. America Journal of Clinical Nutrition, 76: 281-285.

Brown, I. L. 2004. Applications and Uses of Resistant Starch. J. AOAC. Int., 87 (3):727-732.

Brown, I. L., McNaught, K. J., Andrews, D. and Mortia, T. 2001. In: Resistant starch: plant breeding, applications, development and commercial uses, McCleary, B. V. and Prosky, L., editors. Advanced Dietary Fibre Technology. Iowa: Iowa State University Press.

Bryan, W., Bauer, B. and George, C. 1999. Effects of chemical modification on in vitro rate and extent of food starch digestion: an attempt to discover a slowly digested starch. Journal of Agricultural and Food Chemistry, 47:4718-4813.

Burkitt, D. P. and Trowell, H. C. 1977. Dietary fibre and western diseases. Irish Medical Journal, 70:272-7.

Camire, M. E., Kubow, S, and Donnelly, D. 2009. Potatoes and human health. Critical Reviews in Food Science and Nutrition, 49(10):823-840.

Champ, M., Martin, L., Noah, L. and Gratas, M. 1999. Analytical methods for resistant starch. In: Cho, S., Prosky L., Dreher M., editors. Complex carbohydrates in foods. Marcel Dekker, Inc., NY, USA, 169-187.

Champ, M., Langkilde, A. M. and Brouns, F. 2003. Advances in dietary fiber characterization. 2. Consumption, chemistry, physiology and measurement of resistant starch; implications for health and food labeling. Nutrition Research Review, 16:43-61.

Chaplin, M. 2010. Water structure and science. Website: www.lsbu.ac.uk/water/hysta, Retrieved 2006.

Chen, J. and Jane, J. 1994. Properties of Granular Cold-Water-Soluble Starches Prepared by Alcoholic-Alkaline Treatments. Cereal Chemistry, 71(6):623-626.

Cherbut, C. 1995. Effects of short-chain fatty acids on gastrointestinal motility. In: Physiological and clinical aspects of short-chain fatty acids, Cummings (pp. 191-207), J. H., Rombeau, J. L., Sakata, T., editors. Cambridge: Cambridge University Press.

Collier, G. R., Giudici, S, and Kalmusky, J. 1988. Low glycaemic index starchy foods improve glucose control and lower serum cholesterol in diabetic children. Diabetes, Nutrition and Metabolism, 1:11-19.

Conway, R. L. and Hood, L. F. 1976. Pancreatic alpha amylase hydrolysis products of modified and unmodified tapioca starches. Starch/Staerke, 28(10):341-3.

Coulston, A. M., Hollenbeck, C. and Reaven, G. M. 1984. Utility of studies measuring glucose and insulin responses to various carbohydrate containing foods. American Journal of Clinical Nutrition, 39:163-7.

Cummings, J. H. 1993. The effect of dietary fiber on fecal weight and constipation. In: CRC Handbook of dietary fiber in human nutrition, Spiller, G. A., editor. Boca Raton: CRC Press, pp. 263-349.

Donald, A. M. 2000. Starch gelatinization. In: Starch in food: structure, function and applications (pp. 169-174), Eliasson, A-C., editors. Cambridge: CRC Press.

Donovan, J. W. 1979. Phase transitions of the starch-water system. Biopolymers, 18:263.

Dunaif, G. and Schneeman, B. O. 1981. The effect of dietary fiber on human pancreatic enzyme activity in vitro. American Journal of Clinical Nutrition, 34:1034-1035.

Englyst, H. N., Wiggins, H. S. and Cummings, J. H. 1982. Determination of the non-starch polysaccharides in plant foods by gas-liquid chromatography of constituent sugars as alditol acetates. Analyst, 107:307-18.

Englyst, H. N. and Cummings, J. H. 1987. Digestion of polysaccharides of potato in the small intestine of man. American Journal of Clinical Nutrition, 45:423-431.

Englyst, H. N. and Kingman, S. M. 1990. Dietary fibre and resistant starch. A nutritional classification of plant polysaccharides. In Dietary Fiber (pp. 49-65), Kritchevsky, D., Bonfiled, C., Anderson, J. W., editors. New York: Plenum Press.

Englyst, H. N., Kingman, S. M. and Cummings, J. H.1992. Classification and measurement of some nutritionally important starch fractions. European Journal of Clinical Nutritition, 46:S33-S50.

Englyst, K. N., Englyst, H. N., Hudson, G. J., Cole, T. J. and Cummings J. H.1999. Rapid available glucose in foods: an in vitro measurement that reflects the glycemic response. America Journal of Clinical Nutrition, 69:448-454.

FAOSTAT. 1998. September (faostat.fao.org). Retrieved 2004 Oct. 12.

FAO/WHO. 1998. Carbohydrates in Human Nutrition: Report of a Joint FAO/WHO Expert Consultation, Apr. 14-18, 1997, Rome. FAO Food and Nutrition Paper No. 66.

Fernandes, G., Velangi, A. and Wolever, T. 2005. Glycemic index of potatoes commonly consumed in North America. Journal of the American Dietetic Association, 105(4):557-562.

Franceschi, S., Dal Maso, L., Augustin, L., Negri, E., Parpinel, M., Boyle, P., Jenkins, D. J. A. and Vecchia, C. La. 2001. Dietary glycemic load and colorectal cancer risk. Annals of Oncology, 12(2):173-8.

Fung, T. T., Hu, F. B. and Pereira, M. A. 2002. Whole-grain intake and the risk of type 2 diabetes: a prospective study in men. America Journal of Clinical Nutrition, 76: 535-540.

Gannon, M. and Nuttall, F. Q. 1987. Factors affecting interpretation of postprandial glucose and insulin areas. Diabetes Care, 10:759-63.

Gerald, M. 2000. Diet and Syndrome X. Current Atherosclerosis Reports, 2:503-507.

Gormley, R. and Walshe, T. 1999. Effects of boiling warm-holding, mashing and cooling on the levels of enzyme-resistant potato starch. International Journal of Food Science and Technology, 34:281-286.

Goni, I., Garcia-Alonso, A. and Saura-Calixto, F. 1997. A starch hydrolysis procedure to estimate glycemic index. Nutrition Research, 17(3):427-437.

Goni, I., Garcia-Diz, L., Manas, E. and Calixto, F. S. 1996. Analysis of resistant starch: a method for foods and food products. Food Chemistry, 56(4):445-449.

Gray, J. A. and BeMiller, J. N. 2005. Influence of reaction conditions on the location of reactions in waxy maize starch granules reacted with a propylene oxide analog at low substitution levels. Carbohydrate Polymers, 60:147-162.

Griffon, H. 1969. Continuous cooking followed by pulping of cooled mass. U.S. Pat. No. 3,425,849.

Hadziyev, D. and Steele, L. 1979. Dehydrated mashed potatoes-chemical and biochemical aspects. Advances in Food Research, 25:55-136.

Han, J. H. and BeMiller, J. N. 2005. Influence of reaction conditions on MS values and physical properties of waxy maize starch derivatized by reaction with propylene oxide. Carbohydrate Polymers, 64 (2):158-162.

Han, J. H. and BeMiller, J. N. 2007. Preparation and physical properties of slowly digesting modified food starches. Carbohydrate Polymers, 67:366-374.

Han, K. H., Fukushima, M., Kato, T., Kojima, M., Ohba, K., Shimada, K., Sekikawa, M., and Nakano, M. 2003. Enzyme-resistant fractions of beans lowered serum cholesterol and increased sterol excretions and hepatic mRNA levels in rats. Lipids, 38(9):919-24.

Haralampu, S. G. 2000. Resistant starch—a review of the physical properties and biological impact of RS3. Carbohydrate Polymers, 41: 285-292.

Harrington, W. O., Olson, R., Weston, W. J. and Belote, M. L. 1959. Effect of processing variables on potato granule production. America Potato, 36:241.

Haynes, L., Gimmler, N., Locke, J. P., Mee-Ra-Kweon, S. L., and Levine, H.2000. Process for making enzyme-resistant starch for reduced-calorie flour replacer. U.S. Pat. No. 6,013,299. Wilmington, Del.: Nabisco Technology Co.

Hodge, A. M., English, D. R., O'Dea, K. and Giles, G. G. 2004. Glycemic index and dietary fiber and the risk of type 2 diabetes. Diabetes Care, 27:2701-2706.

Huber, K. C. and BeMiller, J. N. 2000. Channels of maize and sorghum starch granules. Carbohydrate Polymers, 41:269-276.

Imberty, A., Buleon, A., Vinh. T. and Perez, S. 1991. Recent advances in knowledge on starch structure. Starch-Starke, 43:375-384. S. S. Kadam, editors. Marcel Decker Inc.

Janzen, G. L. 1969. Digestibility of starches and phosphatized starches by means of pancreatin. Starch, 38:231-237.

Jenkins, D. J, Wolever, T. M. and Buckley, G. 1988. Low glycemic index starchy foods in the diabetic diet. America Journal of Clinical Nutrition, 48:248-254.

Jenkins, D. J, Wolever, T. M. and Taylor, R. H. 1981. Glycemic index of foods: a physiological basis for carbohydrate exchange. America Journal of Clinical Nutrition, 34:362-6.

Jenkins, D. J, Wolever, T. M, Kalmusky, J, Giudici, S, Giordano, C, Wong, G. S., Bird, J. N., Patten, R., Hall, M. and Buckley, G. 1985. Low glycemic index carbohydrate foods in the management of hyperlipidemia. America Journal of Clinical Nutrition, 45:604-17.

Jenkins, D. J., Kendall, A., Cyril, W. C., Augustin, L. S. A. and Vuksan, V. 2002. High-complex carbohydrate or lente carbohydrate foods. American Journal of Medicine, 113(9B): 30S-37S.

Johnson, D. P. 1969. Spectrophotometric determination of the hydroxypropyl group in starch ethers. Analytical Chemistry, 41:859-860.

Johnson, I. T. and Gee, J. M. 1996. Resistant starch. Nutrition & Food Science, (1): 20.

Karlsson, M. E. and Eliasson, A-C. 2003. Gelatinization and retrogradation of potato (Solanum tuberosum) starch in situ as assessed by differential scanning calorimetry (DSC), Lebensmittel-Wissenschaft Und-Technologie, 36:735-741.

Kendall, C. W., Eman, A., Augustin, L. S., and Jenkins, D. J. 2004. Resistant starches and health. AOAC International, 87:769-774.

Kishida, T., Nakai, Y. and Ebihara, K. 2001. Hydroxypropyl-distarch phosphate from tapioca starch reduces zinc and iron absorption, but not calcium and magnesium absorption, in rats. Journal of Nutrition, 131:294-300.

Landin, K., Stigendal, L., Eriksson, E., Krotkiewski, M, Risberg, B., Tengborn, L. and Smith, U. 1990. Abdominal obesity is associated with an impaired fibrinolytic activity and elevated plasminogen activator inhibitor-1. Metabolism, 10: 1044-8.

Laine, D., Thomas, W., Levitt, M. and Bantle, J. 1987. Comparison of predictive capabilities of diabetic exchange lists and glycemic index of foods. Diabetes Care, 10:3387-94.

Lawal, O. S., Ogundiran, O. O., Awokoya, K., and Ogunkunle, A. O. 2008. The low substituted propylene oxide etherified plantain starch: Characterization and functional parameters. Carbohydrate Polymers, 74(3): 717-724.

Lammers, G. and Beenackers, A. A. C. M. 1993: Kinetics of the hydroxypropylation of potato starch in aqueous solution. Journal of Industrial & Engineering Chemistry., 32:835-912.

Lee, Y-H. and Oh, S-H. 2004. Effect of resistant starch on human glycemic response. Korean Journal of Community Nutrition, 9(4):528-535.

Leeds, A. R. 2002. Glycemic index and heart disease. 2002. America Journal of Clinical Nutrition, 76: 286-289.

Leegwater, D. C. 1972. A model for the structure of hydroxypropyl starch. Starch/Starke, 14.

Leegwater, D. C. and Luten, J. B. 1971. A study on the in vitro digestibility of hydroxypropyl starches by pancreatin. Starch/Starke, 23:430-432.

Liu, S., Willett, W. C. and Stampfer, M. J. 2000. A prospective study of dietary glycemic load, carbohydrate intake, and risk of coronary heart disease in US women. America Journal of Clinical Nutrition, 71:1455-61.

McCleary, B. V and Monaghan, D. A. 2002. Measurement of resistant starch. Journal of the Association of Official Analytical Chemists, 85:665-75.

McCleary, B. V. and Rossiter, P. 2004. Measurement of novel dietary fibres. Journal of the Association of Official Analytical Chemists, 87(3):707-17.

Merkus, H. G., Mourits, J. W., De Galan, L. and De Jong, W. A. 1977. Substituent distribution in hydroxyethyl starch. Starch/Staerke, 29(12):406-9.

Nugent, A. P. 2005. Health properties of resistant starch. British Journal of Nutrition, 30:27-54.

Ooraikul, B. 1977. Production of potato granules. U.S. Pat. No. 4,007,286.

Ooraikul, B. 1978. Some characteristics of the freeze-thaw process for potato granule production. America Potato, 55:171.

Oosten, B. J. 1982. Tentative hypothesis to explain how electrolytes affect the gelatinization temperature of starches in water. Starch/Starke, 34:233-239.

Otto, H., Bleyer, G., Pennartz, M., Sabin, G., Schauberger, G. and Spaethe, K. 1973. Carbohydrate exchange according to biological equivalents. Diatetik Bei Diabetes Mellitus, 1973:41-50.

Parker, C. C.; Parker, M. L.; Smith, A. C.; Waldron, K. W. 2001: Pectin distribution at the surface of potato parenchyma cells in relation to cell-cell adhesion Journal of Agricultural and Food Chemistry, 49(9): 4364-4371.

Pi-Sunyer, F. X. 2002. Glycemic index and disease. America Journal of Clinical Nutrition, 76 (suppl):290S-298S.

Pravisani, C. I., Califano, A. N. and Calvelo, A. 1985. Gelatinization kinetics of starch in potato. Journal of Food Science, 50:657.

Potter, A. L. 1954. Changes in physical properties of starch in potato granules during processing. Journal of Agricultural and Food Chemistry, 2:516.

Raben, A., Tagliabue, A., Christensen, N. J., Madsn, J., Holst, J. J. and Astrup, A. 1994. Resistant Starch: the effect on postprandial glycemia, hormonal response and satiety. Americal Journal of Clinical Nutrition, 60:544-51.

Read, N. W. and Eastwood, M. A. 1992. Gastro-intestinal physiology and function. In: Dietary fibre. A component of food, T. F. Schweizer, C. A. Edwards, editors. London: Springer-Verlag, 103-117.

Reader, D., Johnson, M. L., Hollander, P. and Franz, M. 1997. Response of resistant starch in a food bar vs. two commercially available bars in persons with type II diabetes mellitus. Diabetes, 46(1):254A.

Richardson, S., Nilsson, G. S., Bergquist, K., Gorton, L. and Mischnick, P. 2000. Characterization of the substituent distribution in hydroxypropylated potato amylopectin starch. Carbohydrate Research, 328:365-373.

Rutenberg, M. W. and Solarek, D. 1984. Starch derivatives: production and uses. In: Starch: Chemistry and Technology (pp. 312-388), Whistler, R. L., BeMiller, J. N. and Paschall, E. F., editors. London: Academic Press.

Sajilata, M. G., Singhal, R. and Kulkarni, P. 2006. Resistant Starch—A review. Institutes of Food Technolgy, 6:1-16.

Salmeron, J., Ascherio, A. and Rimm, E. B. 1997a. Dietary fiber, glycemic load, and risk of NIDDM in men. Diabetes Care, 20:545-50.

Salmeron, J., Manson, J. E., Stampfer, M. J., Colditz, G. A., Wing, A. L. and Willet, W. C. 1997b. Dietary fiber, glycemic load, and risk of non-insulin-dependent diabetes mellitus in women. The Journal of the American Medical Association, 277: 472-477.

Salvador, V. and Cherbut, C. 1992. Modulation of gastrointestinal transit time by dietary fibre (Regulation du transit digestif par les fibres alimentaires). Cahiers de nutrition et de dietetique, 27:290-297.

Sang, Y., Seib, P. A., Herrera, A. I., Prakash, O. and Shi, Y. C. 2010. Effects of alkaline treatment on the structure of phosphorylated wheat starch and its digestibility, Food Chemistry, 118:323-327.

Sharma, A. and Yadav, B. S. 2008. Resistant starch: physiological roles and food applications. Food reviews international. 24(2):193-234.

Shatila, M. A. and Terrell, R. M. 1976. Product and process for producing dehydrated granular potato product having high cold water adsorption. U.S. Pat. No. 3,968,260.

Shao, Y. Y. 2001. An aqueous alcoholic-alkaline process for preparation of hydroxypropyl starch. Taiwan Nongye Huaxue Yu Shipin Kexue, 9(3):223-230.

Sievert, D. and Pomeranz, Y. 1989. Enzyme-resistant starch. I. Characterization and evaluation by enzymatic, thermoanalytical, and microscopic methods. Cereal Chemistry, 66:342.

Shin, M., Song, J. Y. and Seib, P. A. 2004. In vitro digestibility of cross-linked starches—RS4 starch. Starch/Staerke, 56(10):478-483.

Slabber, M., Barnard, H. C., Kuyl, J. M., Dannhauser, A., and Schall, R. 1994. Effects of a low-insulin-response, energy-restricted diet on weight loss and plasma insulin concentrations in hyperinsulinemic obese females. America Journal of Clinical Nutrition, 60:48-53.

Slyper, A., Jurva, J., Pleuss, J., Hoffmann, R. and Gutterman, D. 2005. Influence of glycemic load on HDL cholesterol in youth. America Journal of Clinical Nutrition, 81:376-379.

Soh, N. L. and Brand-Miller, J. 1999. The glycemic index of potatoes: the effect of variety, cooking method and maturity. European Journal of Clinical Nutrition, 53:249-254.

Susan, M. K. and Englyst, H. N. 1993. The influence of food preparation methods on the in-vitro digestibility of starch in potatoes. Food Chemistry, 49:181-186.

Tahvonen, R., Hietanen, R. M., Sihvonen, J. and Salminen, E. 2006. Influence of different processing methods on the glycemic index of potato (Nicola). Journal of Food Composition and Analysis, In Press.

Tester, R. F. and Morrison, W. R. 1990. Swelling and gelatinization of cereal starches. II. Waxy rice starches. Cereal Chemistry, 67:558-563.

Tester, R. F. and Karkals, J. 2005. Starch. In: Polysaccharides and Polyamides in the Food Industry: Properties, Production and Patents (pp 423-430), Steinbuchel, A. and Rhee, S. K., editors. Wiley-VCH, Weinheim.

Tovar, J., Melito, C., Herrera, E., Laurentin, A. and Perez, E. 1999. Starch modification from a nutritional point of view. Agro-Food-Industry Hi-Tech, March/April:27-30.

Toshiko, S. 2000. Studies on retrogradation of potato starch by differential scanning calorimetry. Bulletin of Osaka Joshigakuen Junior College, (44):35-41.

USDA, 2008. Potatoes-Per Capita Availability: Economic Research Service. Retrieved 2010.

Vague, P. and Raccah, D. 1992. The syndrome of insulin resistance. Hormone Research, 38:28-32.

Van Marle, J. T. van., Recourt, K., Van Dijk, C., Schols, H. A. and Voragen, A. G. J. 1997. Structural features of cell walls from potato (*Solanum tuberosum* L.) cultivars Irene and Nicola. Journal of agricultural and food chemistry. 45(5): 1686-1693.

Van Munster, I. P., Tangerman, A. and Nagengast, F. M. 1994. Effect of resistant starch on colonic fermentation, bile acid metabolism, and mucosal profileration. Digestive Diseases and Sciences, 39(4):834-842.

Whistler, R. L. and BeMiller, J. N. 1997. Starch. In: Carbohydrate Chemistry for Food Scientists (pp 117-151). America Association of Cereal Chemists, St. Paul, Minn.

WHO. 1972. Food additives series, No. 1. Toxicological evaluation of some enzymes, modified starches and certain other substances.

Willard, M. J. 1966. Dehydrated mashed potato and process for making same. U.S. Pat. No. 3,275,458.

Willett, W., Manson, J. and Liu, S. 2002. Glycemic index, glycemic load, and risk of type 2 diabetes. American Journal of Clinical Nutrition, 76:274 S-80S.

Wolever, T. M. and Bolognesi, C. 1996. Prediction of glucose and insulin responses of normal subjects after consuming mixed meals varying in energy, protein, fat, carbohydrate and glycemic index. Journal of Nutrition, 126 (11):2807-12.

Wolever, T. M., Jenkins, D. J., Jenkins, A. L. and Josse, R. G. 1991. The glycemic index: methodology and clinical implications. American Journal of Clinical Nutrition, 54:846-54.

Wolf, B. W., Bauer, L. L. and Fahey, G. C. 1999. Effects of chemical modification on in vitro rate and extent of food starch digestion: an attempt to discover a slowly digested starch. Journal of Agricultural and Food Chemistry, 47:4178-4183.

Woo, K. S. and Seib, P. A. 1997. Cross-linking of wheat starch and hydroxypropylated wheat starch in alkaline slurry with sodium trimetaphosphate. Carbohydrate Polymers, 33:263.

Woo, K. S. and Seib, P. A. 2002. Cross-linked resistant starch: preparation and properties. Cereal Chemistry, 79:819-825.

Wu, H. C. and Sarko, A. 1978. The double helical molecular structure of crystalline amylase. Carbohydrate Research, 61:7.

Wurzburg, O. B. 1995. Modified starches. In: Food polysaccharides and their applications (pp. 68-97), Stephen, A. M., editors. New York: Marcel Dekker.

Xie, X. J., Liu, Q. and Cui, S. W. 2006. Studies on the granular structure of resistant starch (type 4) from normal, high amylase and waxy corn starch citrates. Food Research International, 39 (3): 332-341.

Xie, X. J. and Liu, Q. 2004. Development and physicochemical characterization of new resistant citrate starch from different corn starches. Starch/Starke, 56(8):364-370.

Xu, A. S. and Seib, P. A. 1996. Determination of the level and position of substitution in hydroxypropylated starch by high resolution 1H-nmr spectroscopy of alpha-limit dextrins. Journal of Cereal Science, 25:17-26.

Yang, G., Yang, B. and Qi D. J. 2007. Study on preparation and physical properties of sodium polyphosphate cross-linked starch. Science and Technology of Food Industry, 12:126-129.

Zhang, G. and Hamaker, B. R. 2009. Slowly digestible starch: concept, mechanism, and proposed extended glycemic index. Critical Review of Food Science and Nutrition, 49(10):852-67.

The invention claimed is:

1. A whole tissue potato food product, wherein the whole-tissue potato food product comprises:
   etherified or esterified starch within intact parenchymal cell walls,
   wherein the whole tissue potato food product is in a form selected from the group consisting of peeled potatoes, potato slices, potato cubes, potato dices, potato shreds, potato wedges, dehydrated granules, potato sticks, potato granules, potato flakes, and potato flour,
   wherein the whole tissue potato food product comprises at least 20% intact parenchyma cells; and
   wherein the whole tissue food product is by a process comprising contacting a whole-tissue potato substrate comprising starch within intact cell walls with an aqueous solution of an etherifying or esterifying agent at a temperature between 22° C. and 70° C. in a suspension or slurry.

2. The whole tissue potato food product of claim 1, wherein the whole tissue potato food product comprising etherified starch within intact parenchymal cell walls has an estimated glycemic index between 40 and 70.

3. The whole tissue potato food product of claim 1, wherein the whole tissue potato food product comprising etherified starch within intact parenchymal cell walls has an estimated glycemic index at least 5 points less than whole tissue potato food product that is not etherified.

4. The whole tissue potato food product of claim 1, wherein the whole tissue potato food product has a resistant starch (RS) content of between 5 and 70%.

5. The whole tissue potato product of claim 4, wherein the whole tissue potato food product has a RS content of between 5 and 50%.

6. The whole tissue potato food product of claim 1, wherein the whole tissue potato food product comprises etherified starch with a molar substitution greater than 0.047.

7. The whole tissue potato food product of claim 6, wherein the whole tissue potato food product comprises etherified starch with a molar substitution between 0.047 and 0.179.

8. The whole tissue potato food product of claim 1, wherein the whole tissue potato food product comprises etherified starch which has been etherified by an etherifying agent selected from the group consisting of propylene oxide, acrolein, epichlorohydrin and mixtures and combinations thereof.

9. The whole tissue potato food product of claim 1, wherein the whole tissue potato food product comprises etherified starch which has been etherified by propylene oxide.

10. The whole tissue potato food product of claim 1, further comprises esterified starch.

11. The whole tissue potato food product of claim 10, wherein the whole tissue potato food product comprises starch which has been esterified by an esterifying agent selected from the group consisting of acetic anhydride, adipic anhydride, vinyl acetate, monosodium orthophosphate, 1-octenyl succinic anhydride, succinic anhydride, phosphorus oxychloride, sodium trimetaphosphate (STMP), sodium tripolyphosphate and combinations and mixtures thereof.

12. The whole tissue potato food product of claim 11, wherein the esterifying agent is STMP.

13. The whole tissue potato food product of claim 1, wherein the whole tissue potato food product is a dehydrated potato product.

14. The whole tissue potato food product of claim 1, wherein the whole tissue potato food product is selected from the group consisting of a flake, potato granule and flour.

15. The whole tissue potato food product of claim 1, wherein the whole tissue potato food product is refrigerated or frozen.

16. The whole tissue potato food product of claim 1, wherein the whole tissue potato food product exhibits increased resistance to starch retrogradation relative to untreated whole tissue potato food product.

17. The whole tissue potato food product of claim 10, wherein the esterifying agent is phosphorus oxychloride.

18. The whole tissue potato product of claim 4, wherein the whole tissue potato food product has a RS content of between 10 and 70%.

19. The whole tissue potato product of claim 4, wherein the whole tissue potato food product has a RS content of between 10 and 50%.

* * * * *